(12) United States Patent
Zhu

(10) Patent No.: US 12,442,106 B2
(45) Date of Patent: Oct. 14, 2025

(54) SEQUENCE-BASED HIGH THROUGHPUT METHOD GENERATING CAMELIDS ANTIBODIES TO COVER BROAD EPITOPES WITH HIGH-RESOLUTION

(71) Applicant: Zhejiang NanomAb Technology Center Co. Ltd., Shaoxing (CN)

(72) Inventor: Weimin Zhu, Danville, CA (US)

(73) Assignee: Zhejiang NanomAb Technology Center Co. Ltd., Shaoxing (CN)

(*) Notice: Subject to any disclaimer, the term of this patent is extended or adjusted under 35 U.S.C. 154(b) by 0 days.

(21) Appl. No.: 17/434,722

(22) PCT Filed: Aug. 28, 2020

(86) PCT No.: PCT/US2020/020248
§ 371 (c)(1),
(2) Date: Aug. 27, 2021

(87) PCT Pub. No.: WO2020/176815
PCT Pub. Date: Sep. 3, 2020

(65) Prior Publication Data
US 2023/0002757 A1    Jan. 5, 2023

(51) Int. Cl.
*C40B 30/04* (2006.01)
*C12N 15/10* (2006.01)

(52) U.S. Cl.
CPC .......... *C40B 30/04* (2013.01); *C12N 15/1037* (2013.01); *C07K 2317/22* (2013.01); *C07K 2317/565* (2013.01); *C07K 2317/567* (2013.01); *C07K 2317/569* (2013.01)

(58) Field of Classification Search
None
See application file for complete search history.

(56) References Cited

U.S. PATENT DOCUMENTS

| | | | |
|---|---|---|---|
| 11,447,891 | B2 | 9/2022 | Rout |
| 2011/0065112 | A1 | 3/2011 | Yu |
| 2012/0093830 | A1 | 4/2012 | De Silva |
| 2017/0212130 | A1 | 7/2017 | Rout |
| 2018/0201900 | A1 | 7/2018 | Adam |
| 2019/0391159 | A1 | 12/2019 | Rout |

OTHER PUBLICATIONS

Deschaght et al. (2017) Frontiers in Immunology vol. 8 Article 420 pp. 1 to 11 (Year: 2017).*
Smith et al. (2017) Journal of Visualized Experiments vol. 120 article doi: 10.3791/55382 pp. 1 to 8 (Year: 2017).*
Arbabi-Ghahroudi et al. Frontiers in Immunology, vol. 8, 2017.
Basilico et al. The Journal of Clinical Investigation, vol. 124 No. 7 Jul. 2014.
Conrath et al. Dev Comp Immunol 2787-103, 2003.
Cortez-Retamozo et al. Int J Cancer. 98(3) 456-62, 2002.
Daley et al. Clin. Vaccine Immunol. 17239-46, 2010.

(Continued)

*Primary Examiner* — Christian C Boesen
(74) *Attorney, Agent, or Firm* — Wei Zhang; Intelink Law Group, P.C.

(57) ABSTRACT

A method for generating a plurality of diverse camelid antibodies to cover functional epitopes of the target with high-resolution. Also provided is a method for generating camelid antibodies.

9 Claims, 42 Drawing Sheets
Specification includes a Sequence Listing.

(56) References Cited

OTHER PUBLICATIONS

Deschacht et al. The Journal of Immunology. 184 (10) 5696-5704, May 2010.
Deschaght et al. Frontiers in Immunology, vol. 8, Article 420, 2017.
Griffin et al. Journal of Immunological Methods vol. 405, pp. 35-46, Mar. 2014.
Henry et al. Immunogenetics, 71, 307-320 (2019).
Igawa et al. mAbs 33, 243-252; 2011.
Klarenbeek et al. mAbs 74, 693-706; 2015.
Liu et al. Microb Cell Fact 16223, 2017.
Maass et al. J Immunol Methods. 324(1-2)13-25, 2007.
McCoy et al. J. Exp. Med. vol. 209 No. 6 1091-1103, 2012.
Mitchell et al. Proteins. 2018; 86:697-706.
Miyazaki et al. Journal of Biochemistry, vol. 158, No. 3, pp. 205-215, 2015.
Nguyen et al. Immunogenetics, 54:39-47, 2002.
Nguyen et al. The EMBO Journal vol. 19, No. 5, 2000.
Woninga et al. MABS, vol. 8, No. 6, 1126-1135, 2016.
CN202080031628.1—1st OA (2024) with EN translation.
CN202080031628.1—2nd OA (2024) with EN translation.
EP20763951.9—EPO Suppl Search Report (2023).
JP2021-549905—1st OA English translation (2024).
JP2021-549905—2nd OA English translation (2024).
WO2020176815—International Search Report & Written Opinion (2021).

\* cited by examiner

AB1927: SEQ ID NO. 119
AB1933: SEQ ID NO. 120
AB1934: SEQ ID NO. 121
AB1940: SEQ ID NO. 122
AB1941: SEQ ID NO. 123
AB1948: SEQ ID NO. 124

AB1954: SEQ ID NO. 125
AB1965: SEQ ID NO. 126
AB1966: SEQ ID NO. 127
AB1968: SEQ ID NO. 128
AB1979: SEQ ID NO. 129
503-BMK: SEQ ID NO. 130

PD-L1 antigen
PD-1 antigen

1: Loop sequence close to PD-L1: SFVLNWYRMSPSNQTDKLAA   SEQ ID NO. 138
2: Loop sequence close to PD-1: YLCGAISLAPKAQIKESLR   SEQ ID NO. 139

Overlapping of NBL507 sequences based on CDR3

| CDR3 | SEQ ID NOs |
|---|---|
| AIGAPDPFNYSGWRRNL | SEQ ID NO.99 |
| ALGAMREGVYSDL | SEQ ID NO.103 |
| NGAPWGDHAPLVAS | SEQ ID NO.145 |
| NGAPWGDIAPVAVS | SEQ ID NO.111 |
| QVGRYVSGVYYQP | SEQ ID NO.115 |
| VIGRGGYAMGDRRL | SEQ ID NO.116 |
| KAVIVGTYDTEY | SEQ ID NO.146 |
| KAVTVGDVDTEY | SEQ ID NO.147 |

VH、VHH2、VHH3 overlapped CDR3 sequences

Fig. 40

|  | 1182 | 1202 | 1734 | Keytruda | Opdivo |
|---|---|---|---|---|---|
| 1182 | - | NA | NA | + | + |
| 1202 | NA | - | NA | + | + |
| 1734 | NA | NA | - | + | + |
| Keytruda | - | - | + | - | + |
| Opdivo | - | - | - | + | - |

+: significant signal observed;
-: no/low/negative signal;
NA: result not available.

SEQUENCE-BASED HIGH THROUGHPUT METHOD GENERATING CAMELIDS ANTIBODIES TO COVER BROAD EPITOPES WITH HIGH-RESOLUTION

BACKGROUND OF THE INVENTION

Targeting functional epitopes of a disease target for therapeutics is a big challenge with current antibody technologies because each target has hundreds or thousands of epitopes and only a very limited number of epitopes among them are involved in the biological function, but current technologies are taking approaches to generate binders randomly and sporadically, thus, inadequate coverage of epitopes, redundant selection and low successful rate are the bottle-neck.

*Camelus dromedarius, bactrianus* belong to old world Camelidae and Lama, Alpaca belong to new world Camelidae. Only Camelidae (common name Camelid) have a dichotomous adaptive humoral immune system with both conventional and homodimeric antibodies (HcAb). In addition, HcAbs have evolved comprehensive paratope architecture as one of the driving factors for recognizing the very wide range of epitopes of the antigen, and IgG1 antibodies complement HcAb binding architecture for more diverse recognitions.

Camelidae have unique humoral immune system consisting of 2 types of HcAb, IgG2 and IgG3 with short and long length of hinge regions. Phylogenetic analyses have confirmed that HcAbs diverged from a conventional antibody, IgG1 as a result of recent adaptive changes. It was reported that IgG1 and IgG3 neutralize West Nile virus, whereas IgG2 seems less effective in an infected or vaccinated animal (Daley L P, Clin. Vaccine Immunol. 17:239-46, 2010). Furthermore, the range of epitopes sampled by HcAb and IgG1 can overlap, but HcAb can also reach sites inaccessible to IgG1. Understanding of the exact roles and functions of the various Camelids IgG isotypes is still in its infancy. However, the diverse paratope architecture such as prolate, convex, concave, protrude, and flat surfaces of HcAb (IgG2 and IgG3) offer a great opportunity to develop antibody to challenging targets, especially for diagnostic and therapeutic applications. The simplicity of HcAb without light chain pairing also makes gene cloning and antibody engineering much easier. Furthermore, the conventional IgG1 contributing to 25-50% of total IgG of Camelids play important role to expand an antigen-binding repertoire since the HcAb repertoire of an immunized dromedary or llama displays a recognition pattern different from that of conventional IgG1 (McCoy L E, J. Exp. Med. 2012), and certain unique epitopes or druggable target hotspots are accessible to IgG1 with high affinity and desired functionality (Cristina Basilico, The Journal of Clinical Investigation, Volume 124 Number 7 July, 2014; Basvan der Woninga, MABS, VOL. 8, NO. 6, 1126-1135, 2016). Camelids have two types of light chains (Vκ or Vλ pairing with VH[1] to form conventional IgG1 and their germline organizations have been revealed recently (Laura M. Griffin, Journal of Immunological Methods Volume 405, Pages 35-46, March 2014; Alex Klarenbeek, mAbs 7:4, 693-706; 2015).

Extensive somatic hypermutation and gene conversion are significantly higher among the VHHs than among the VHs (30% versus 1.5%) in the primary VHH B-cells repertoire, which supports further diversification of HcAb repertoire to compensate the lack of light chain. Equally importantly, VHH domain of HcAb enlarges overall antigen-binding repertoire, for example by creating prolate (rugby ball-shaped) structure with a convex paratope surface, which makes it extremely suitable to insert in cavities or clefts (such as active and allosteric sites) on the surface of the antigen. In contrast, the VH-VL domain of conventional IgG contains more flat or concave paratope surface. Following mechanisms of B-cell repertoire diversification largely contribute to the unique binding characteristics of VHH: (i) most of VHH contains the Framework Region 2 (FR2) with hydrophilic amino acid substitutions comparing to conventional FR2 (Val37→Phe/Tyr, Gly44→Glu, Leu45→Arg, and Trp47→Gly), which participates in the light chain binding (ii) extended CDR1 region with extensive somatic hypermutation in immune B-cells in residues 27-30 according to Kabat's numbering (iii) extra disulfide bonds between CDR1-CDR3 (Camels) or FR2-CDR3 (Lama and Alpaca) in large portion of VHH (iv) extra disulfide bonds within CDR1 and CDR3 in certain portion of VHH (v) longer CDR3 loop is also identified possibly due to additional non-templated nucleotide insertions in some VHH (Adhdi Arbabi-Ghahroudi, Frontiers in Immunology, Vol 8, 2017; Viet Khong Nguyen, The EMBO Journal Vol. 19 No. 5 2000; Mehdi Arbabi-Ghahroudi et al, Front. Immunol., 20 Nov. 2017; Nguyen V K, Immunogenetics 54:39-47, 2002; Conrath K E, Dev Comp Immunol 27:87-103, 2003). It was also found that there are sets of non-classical VHH (without FR2 hydrophilic amino acids) which are derived from the same gene locus, IGHV3 or IGHV4, D and J as conventional IgG1 do, and these heavy chain antibodies may recognize the same or similar epitopes as IgG1 since both category antibodies share the same or similar CDR3 which is responsible for epitope recognition (Conrath K E Dev Comp Immunol 27:87-103, 2003; Nick Deschacht, The Journal of Immunology. 184 (10) 5696-5704, 2010). The HcAb germline organization and VHH structure are illustrated in FIGS. 1. A and B.

Functional and physical-chemical advantages such as high affinity, specificity, simple gene cloning, high expression yield, ease of purification, highly soluble and stable single-domain fold provide the foundation for HcAb technology. In addition, the antigen-binding repertoire expanded by conventional IgG1 allow even broader epitopes coverage. Furthermore, the close homologies of VHH, VH, Vκ and Vλ to human counterparts offers a great advantage for humanization and therapeutics development. By taking the advantages of Camelids unique antibody organizations and NGS technology to capture entire B-cells antibody repertoire, a novel method is developed here to generate hundreds or thousands of diverse antibodies to cover broad epitopes of the target with high-resolution, which enables targeting these important and functional epitopes in systematic and rational manners.

SUMMARY OF THE INVENTION

This invention disclosed a high-throughput method generating a camelid antibody against an antigen, comprising: a) enriching and proliferating B-cells from immunized camelids specific to the antigen, b) generating antibody Next Generation Sequencing (NGS) libraries comprising VHH[2], VHH[3], and VH[1] chain sequences from the antigen-specific B-cells, c) grouping sequences of VHH[2], VHH[3], and VH[1] in the NGS libraries by lineages, d) ranking the lineages comprising the VHH heavy chain (VHH[2], VHH[3]) by one or more lineage priority factors, e) selecting a representative sequence from lineages of VHH heavy chain (VHH[2] and VHH[3]) with a top ranking in the NGS database library, and f) testing an antibody comprising the selected VHH heavy chain sequences to determine if the antibody binds to the antigen or portion thereof. In one embodiment, the antigen comprises a plurality of epitopes.

In one embodiment, minimal CDR3 distance of a specific CDR3 is equal or less than 1 among the group of CDR3s from a lineage, wherein minimal CDR3 distance of a specific CDR3 is the smallest hamming distance of this CDR3 comparing with all other CDR3 of the same length.

In some embodiments, the lineage priority factors are selected from a group consisting of lineages from high to low sequences abundancy, lineages from high to low amplification factor after in vitro B-cells enrichment and proliferation, lineages sequences abundancy change during immunization course, lineages sequences abundancy change before and after depleting certain unwanted B cells, lineages which share the same naïve B-cell origin between VHH and VH, avoidance of developability liability sequences, and a combination thereof.

In some embodiments, $VHH^2$ and/or $VHH^3$ lineages are chosen from the top 100 lineages in e).

In some embodiments, the method further comprises repeating e)-f) to generate camelid antibodies, wherein the representative sequences are selected from top 101-200, 201-300, 301-400, 401-500, 501-600, 601-700, 701-800, 801-900, 901-1000, 1001-1100,1101-1200, 1201-1300, 1301-1400, 1401-1500, 1501-1600, 1601-1700, 1701-1800, 1801-1900, or 1901-2000 ranking lineages. In some embodiments, the method further comprises repeating e)-f) to generate camelid antibodies, wherein the representative sequences are selected from top 2,000 to 10,000 ranking lineages.

In some embodiments, the testing antibody is expressed by prokaryotic or eukaryotic cells.

In a preferred embodiment, the method further comprises monitoring immune responses of IgG2, 3 (HcAb) and IgG1 (conventional IgG).

In some embodiments, the sequences within the same lineage group of the selected IgG2 or IgG3 heavy chain only antibodies can be chosen for optimization of the antibodies by repeating e)-f) of the method.

In some embodiments, the antigen or immunogen can be cells, a tissue, or a biofluid.

In some embodiments, the antigen can be a complex immunogen, and the method further include: using an antibody which has been determined in step (f) to bind with the complex immunogen to identify individual antigens included in the complex immunogen by protein array, cells/tissue antigen cDNA library, or mass spectrometry-based immunoprecipitation.

In one aspect of the invention, the method further comprises lineage subgrouping with certain VHH features selected from a group consisting of i) FR2 hydrophilic region; ii) extended CDR1; iii) extra disulfide bond between CDR1-CDR3 or FR2-CDR3; iv) extra disulfide bond within CDR3; v) long CDR3 ($\geq$15 aa); vi) extra disulfide bond within CDR1; vii) Non-classic VHH which have the same V and J germlines as conventional IgG1; viii) Non-classic VHH which have certain predetermined sequence signatures; ix) certain predetermined canonical binding loop structure; x) convergent motif or sequence signature among individual animals from the same immunization group; xi) CDR2 length; xii) CDR3 length; xiii) CDR3 length and identity; xiv) presence of 3 or more positive charges in CDR3 region; xv) the number of cysteines in the amino acid sequence; and xvi) 2-4 amino acid motifs found in the CDR regions. The motif is identified from the 3D structures of a ligand/receptor complex.

In another aspect of the invention, a method for high-throughput generating a camelid antibody against an antigen is provided, the method comprising: a) enriching and proliferating antigen-specific B-cells from immunized camelids; b) generating antibody NGS libraries comprising $VHH^2$, $VHH^3$, $VH^1$ and $VL^1$ chain sequences from said antigen-specific B-cells; c) grouping $VHH^2$, $VHH^3$, $VH^1$ and $VL^1$ NGS sequences by lineages; d) $VH^1/VL^1$ lineage pairing according to an anchor binder generated by single B-cell sorting and heterohybridoma approaches; e) ranking lineages and lineage pairs from step c) and step d) by lineage priority factors; f) selecting a representative sequence or sequence pair from lineages of $VHH^2$, $VHH^3$ and lineage pairs of $VH^1/VL^1$ with the top ranking in the NGS library; g) testing an antibody comprising the selected heavy chain/light chain sequence pair or heavy chain $VHH^2$, $VHH^3$ sequence to determine if the antibody binds to the antigen or portion thereof. In one embodiment, an antigen comprises a plurality of epitopes.

In one embodiment, minimal CDR3 distance of a specific CDR3 is equal or less than 1 among the group of CDR3s from a lineage, wherein minimal CDR3 distance of a specific CDR3 is the smallest hamming distance of this CDR3 comparing with all other CDR3 of the same length.

In one embodiment, the ranking of lineage pairs in step e) is based on lineage priority factors of $VH^1$ lineages of said lineage pairs.

In some embodiments, the lineage priority factors are selected from a group consisting of lineages from high to low sequences abundancy, lineages from high to low amplification factor after in vitro B-cells enrichment and proliferation, lineages sequences abundancy change during immunization course, lineages sequences abundancy change before and after depleting certain unwanted B cells, lineages which share the same naïve B-cell origin between VHH and VH, avoidance of developability liability sequences, and a combination thereof.

In some embodiments, anchors for IgG1 repertoire are generated with single B-cell sorting and heterohybridoma approaches.

In some embodiments, testing antibody is expressed by prokaryotic or eukaryotic cells.

In some embodiments, one representative sequence of VHH or one representative pair $VH^1/VL^1$ from each top 100 lineages or lineage pairs are selected. In some embodiments, 100 lineages/lineage-pairs include 95, 90, 85, 80, 75, 70, 65, 60, 55, 50, 45, 40, 35, 30, 25, 20, 15 or 10 VHHs lineage and 5, 10, 15, 20, 25, 30, 35, 40, 45, 50, 55, 60, 65, 70, 75, 80, 85, 90 or 95 $VH^1/VL^1$ lineage pairs respectively, wherein $VL^1$ comprises Vκ and Vλ.

In some embodiments, the method further comprises repeating f)-g) to generate camelid antibodies, wherein the representative sequences are selected from top 101-200, 201-300, 301-400, 401-500, 501-600, 601-700, 701-800, 801-900, 901-1000, 1001-1100,1101-1200, 1201-1300, 1301-1400, 1401-1500, 1501-1600, 1601-1700, 1701-1800, 1801-1900, or 1901-2000 ranking lineages. In some embodiments, the method further comprises repeating f)-g) to generate camelid antibodies, wherein the representative sequences are selected from top 2000 to 10,000 ranking lineages.

In some embodiments, the criteria for lineage ranking/selection are selected from a group consisting of lineages from high to low sequences abundancy, lineages from high to low amplification factor, lineages sequences abundancy change during immunization course, lineages sequences abundancy change before and after depleting certain unwanted B cells, Lineages which share the same naïve B-cell origin between VHH and VH¹, avoidance of developability liability sequences, and a combination thereof.

In some embodiments, the antigen or immunogen can be cells or tissue, and generated VHHs are used to identify individual corresponding antigens by protein array or cells/tissue antigen cDNA library or immunoprecipitation-based mass spectrometry method.

In another aspect of the invention, the method for high-throughput generating camelid antibody against a plurality of epitopes of a specific antigen further comprises subgrouping VHHs lineages having a feature selected from a group consisting of i) FR2 hydrophilic region; ii) extended CDR1; iii) extra disulfide bond within CDR1 or/and CDR3; iv) long CDR3 (≥15 aa); v) sequences sharing the same naïve B cells origin among VHH², VHH³ and VH¹; vi) sequence-based prediction for antigen-binding loops structure; x) convergent motif or sequence signature among individual animals from the same immunization group; xi) CDR2 length; xii) CDR3 length; xiii) CDR3 length and identity; xiv) presence of 3 or more positive charges in CDR3 region; xv) the number of cysteines in the amino acid sequence; and xvi) 2-4 amino acid motifs found in the CDR regions. The motif is identified from the 3D structures of a ligand/receptor complex.

In some embodiments, sequences within the same lineage group of tested antibodies in the first round can be chosen for optimization of the antibodies by repeating f)-g) in the second round.

In some embodiments, the method for high-throughput generating camelid antibodies against an antigen further comprises applying the selected VHH sequences to guide VH¹-VL¹ pair selection for these clones which share the same naïve B-cell origin, wherein the selection criteria comprise 1) CDR1 and CDR2 differences; 2) FR1, 2, 3 and 4 differences.

In another aspect of the invention, a method for generating humanized VHH antibody comprises a) enriching and proliferating antigen-specific B-cells from immunized camelids; b) generating antibody NGS libraries comprising VHH², VHH³, and VH¹ chain sequences from antigen-specific B-cells; c) grouping VHH², VHH³, and VH¹ NGS sequences by lineages; d) identifying a substitutable position in a parent VHH², VHH³ antibody or VH¹ sharing the same naïve B-cell origin by comparing its amino acid sequence to the amino acid sequences of a number of related antibodies that each bind to the same epitope as the parent antibody in the same lineage; e) substituting amino acids at one or more of the substitutable positions of the parental VHH² or VHH³ antibody by correspondingly positioned amino acids in the human antibody; f) testing an antibody comprising the substituted residues within the selected sequences to determine if the antibody binds to the antigen or portion thereof.

In one embodiment, the substituted position of humanized VHH antibody is in the FRs regions. In one embodiment, the substituted position of humanized VHH antibody is in the CDRs regions.

In one embodiment, the parent antibody is a camelid antibody. In one embodiment, the parent antibody is a humanized camelid antibody.

In another aspect of the invention, an isolated camelid antibody or antigen-binding portion comprising an antibody sequence generated by this invention.

In another aspect of the invention, a pharmaceutical composition comprising the camelid antibody of this invention and a pharmaceutically acceptable carrier.

BRIEF DESCRIPTION OF THE DRAWINGS

Exemplary embodiments are illustrated in referenced figures. It is intended that the embodiments and figures disclosed herein are to be considered illustrative rather than restrictive.

The resulting selected antibodies are expected to bind different epitopes of the target antigen, providing broad epitope coverage of the target antigen.

Figure 8:
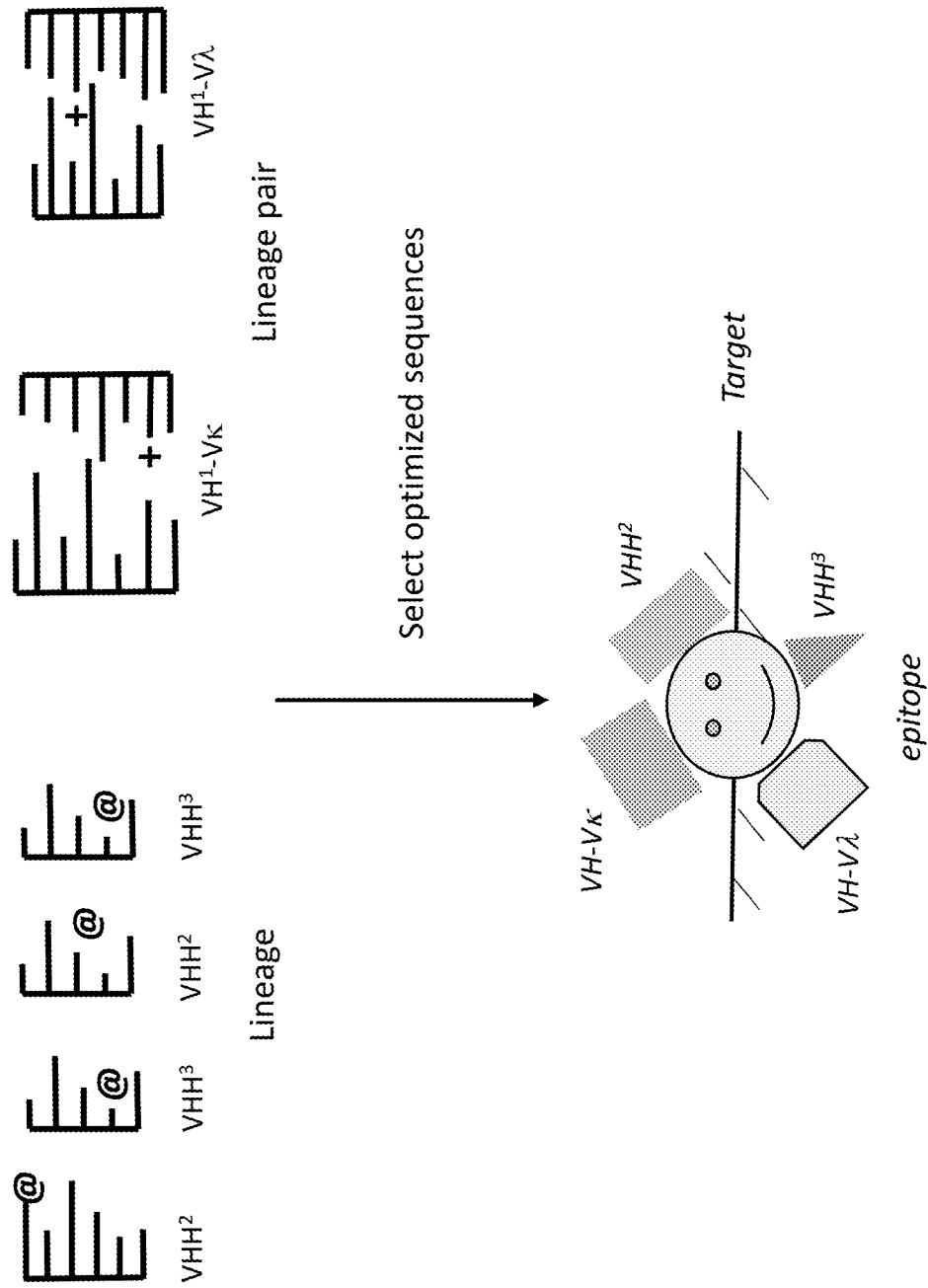

FIG. 8 shows optimization of the selected lead within the same lineage. Leads from the first round of selection are marked with @ and +. Criteria for selection of optimized sequences include:
1) CDR1 and/or CDR2 differences>2aa;
2) FR1 and/or 2 and/or 3 and/or 4 differences>2aa;
3) Sequences sharing the same naïve B-cell origin between VHH with conventional VH;
4) VH sequences which can pair with both Vκ and Vλ;
5) The same epitope recognized by various antibody formats with different characteristics.

Figure 9:
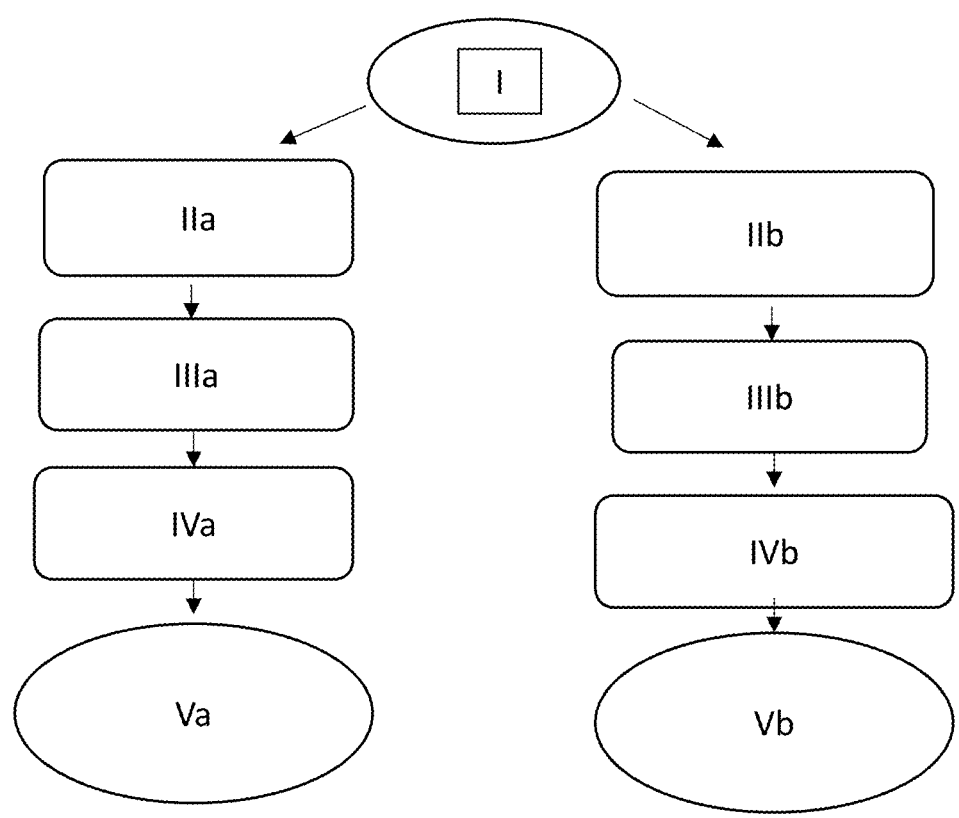

FIG. 9 shows workflow for humanization of VHH and VH-VL through lineage analysis. At I, Camilidae are immunized with an antigen; then two alternative screens are applied. At IIa, sequences of VHH that bind to antigen are obtained through NGS; at IIIa phylogenetically related groups (lineages) of antibodies are identified; at IVa substitutable positions within the same lineages of VHH are identified; at Va human amino acids at variation tolerant positions both on FRs and CDRs are substituted. In an alternative screening method, at IIb sequences of VH and Vκ or Vλ (conventional IgG) that bind to antigen are identified through NGS; at IIIb phylogenetically related groups (lineages) of antibodies are identified; at IVb substitutable positions within the same lineages of VH and Vκ or Vλ are identified; at Vb human amino acids at variation tolerant positions both on FRs and CDRs are substituted.

Figure 10:
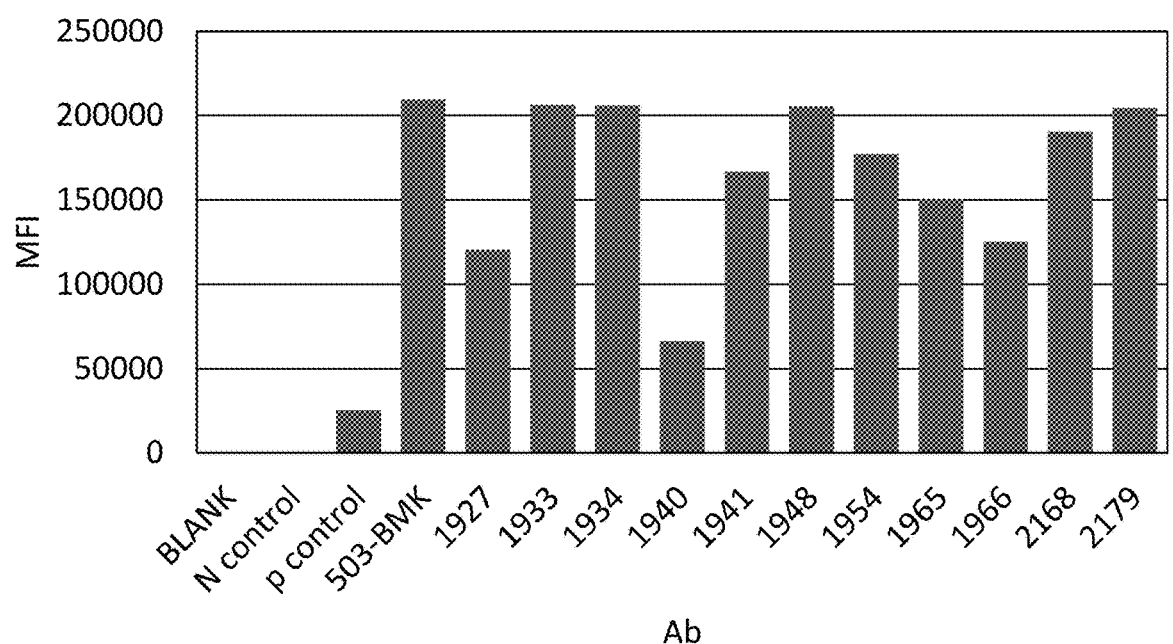

FIG. 10 shows the fluorescence signal from selected antibodies binding to EGFR.

Figure 11:
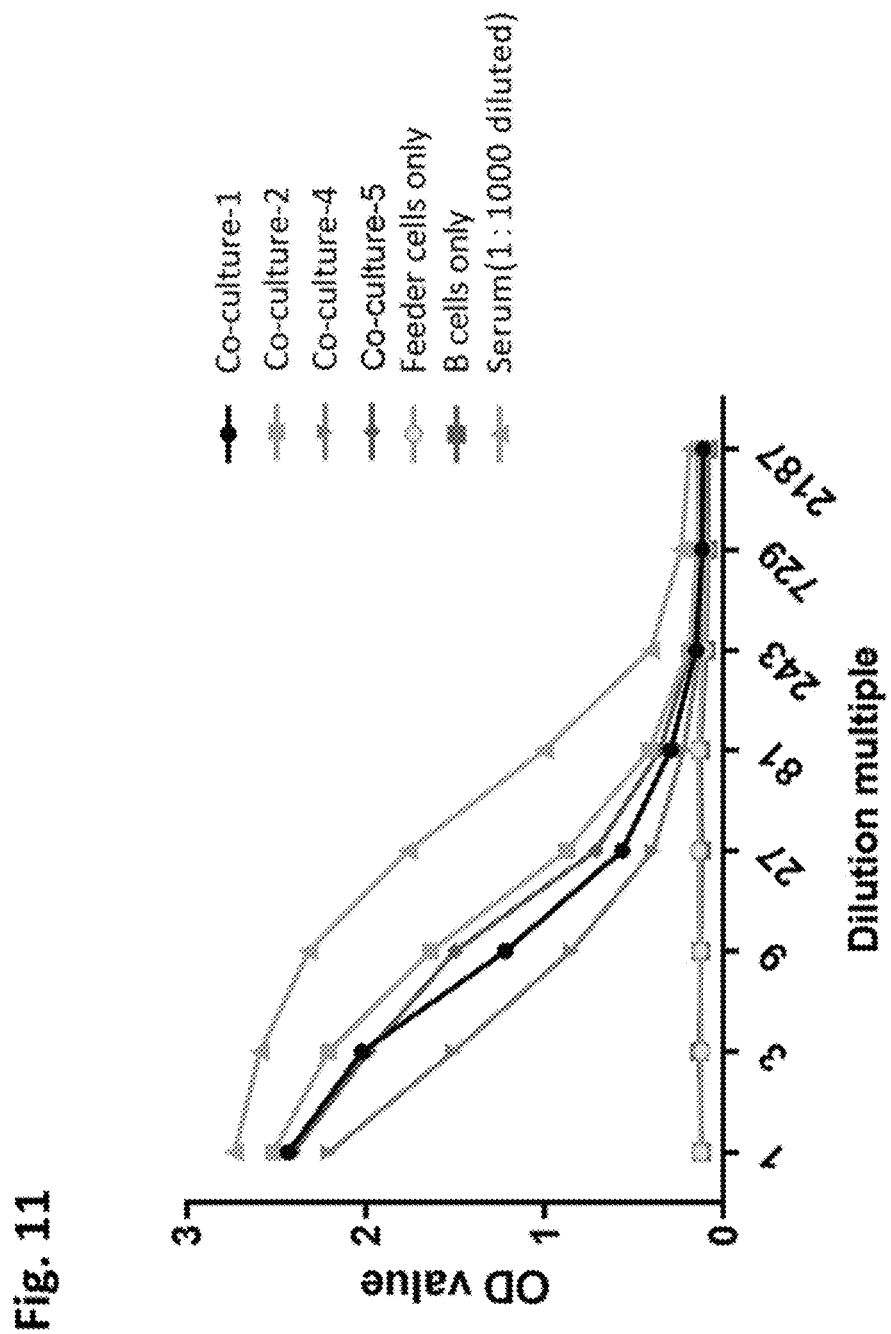

FIG. 11 shows ELISA assays of antibodies secreted from selected co-cultures of anti-KLH antibody-secreting B cells and alpaca feeder cells. The B-cells only without the feeder cells will not grow or amplify. It was used as a negative control. The immunized animal serum was diluted 1:1000 with the control media as a positive control for ELISA.

Figure 12:
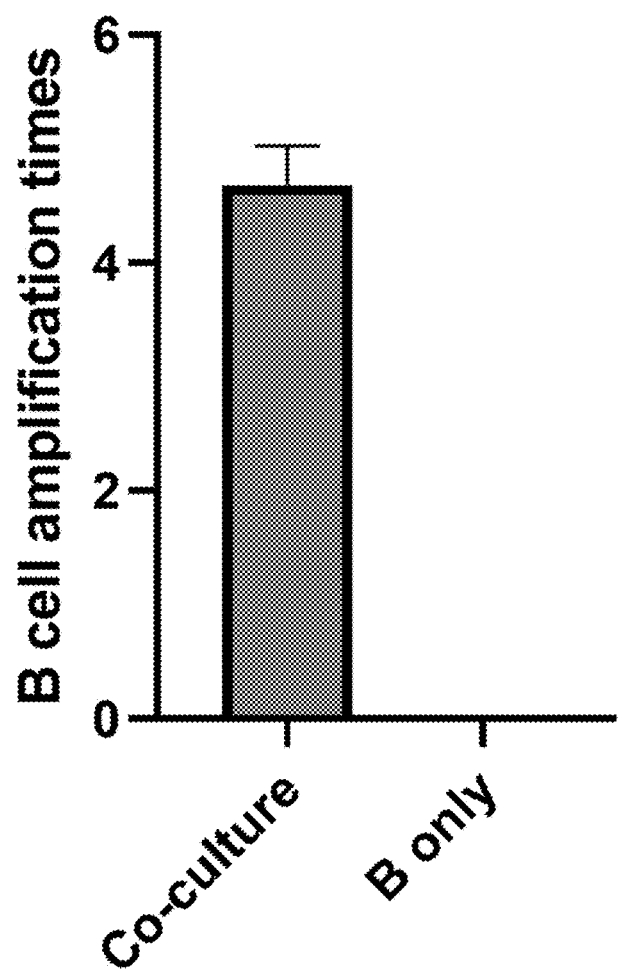

FIG. 12, shows the amplification of B cells obtained from co-cultures of feeder cells and antibody secreting B cells vs. B-cell only without feeder cells.

Figure 13:
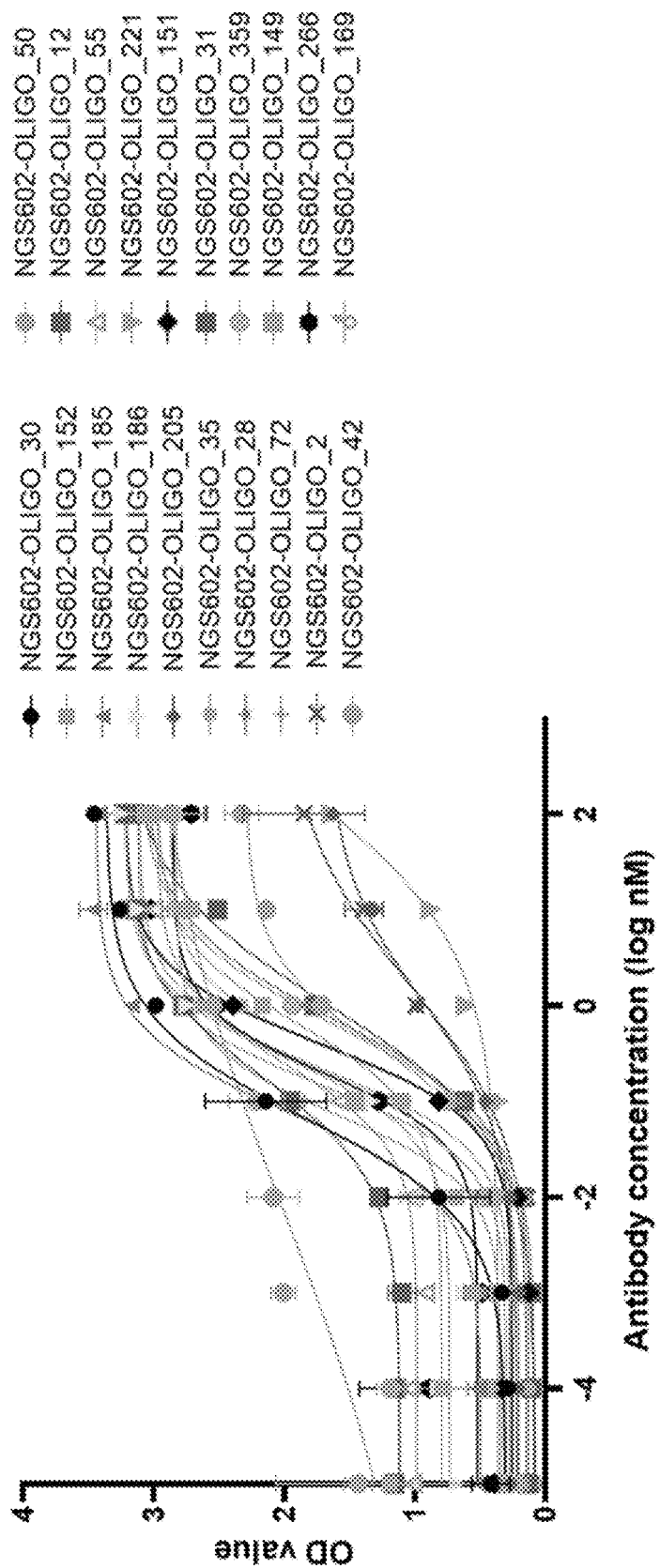

FIG. 13 shows results of ELISA assay of supernatants of selected clones from KLH NGS data.

Figure 14:
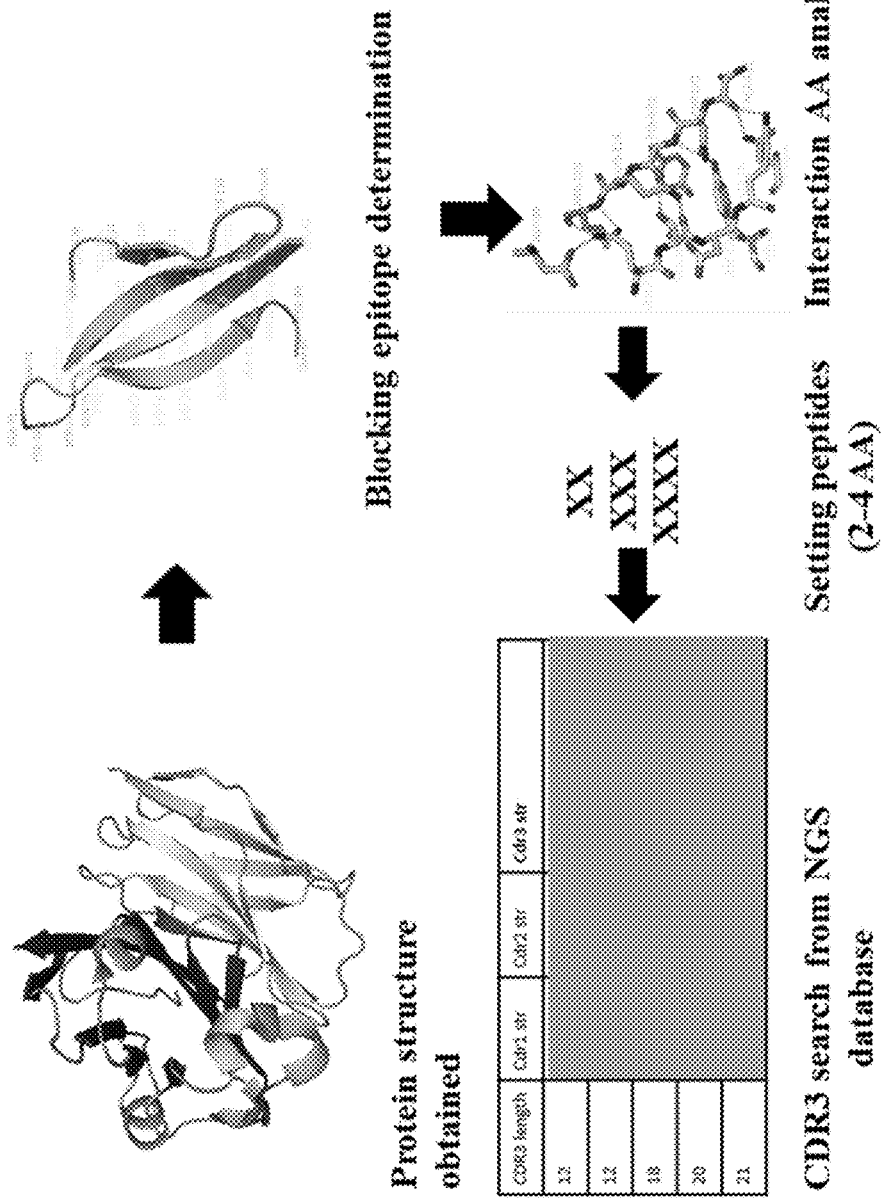

FIG. 14 shows workflow for identification of blocking antibodies based on CDR region 2-4 amino acid motif identified from 3-d structure of ligand/receptor complex.

Figure 15:
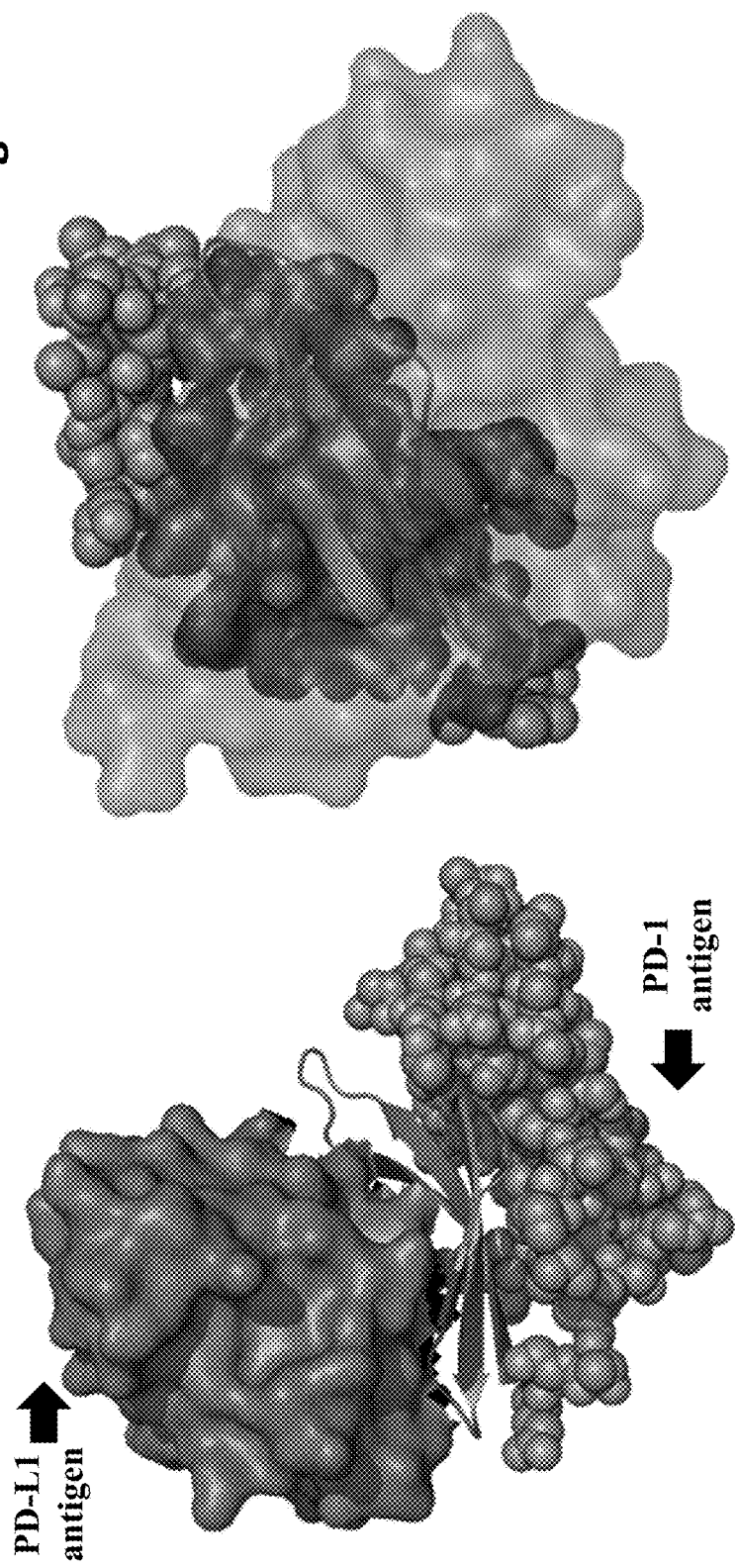

FIG. 15 shows two views of the complex formed between PD-1 and PD-L1 highlighting two peptides of PD-1 at the interface of the complex.

Figure 16:
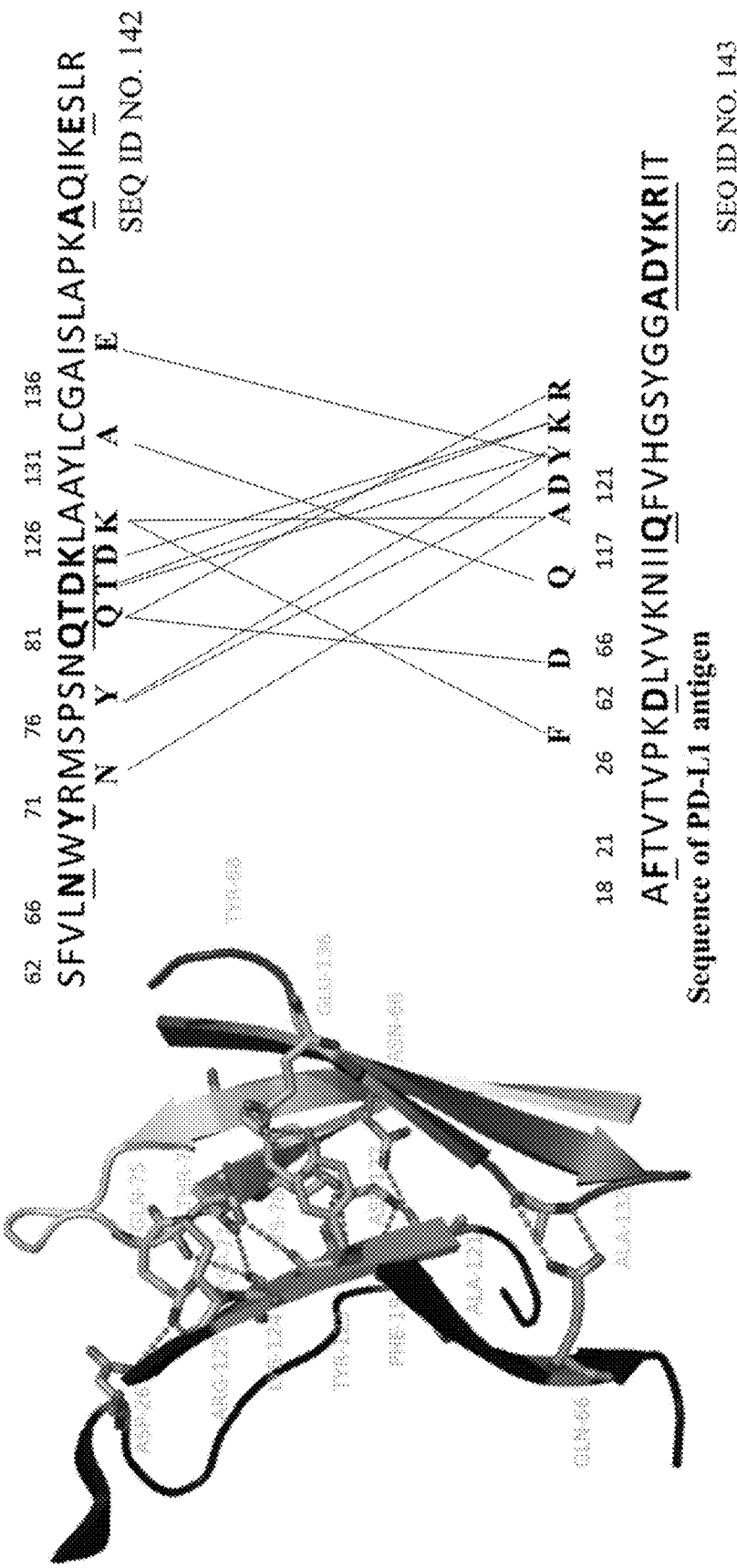

FIG. 16 shows analysis of the interaction of interfacial peptides in a PD-1:PD-L1 complex.

Figure 17:
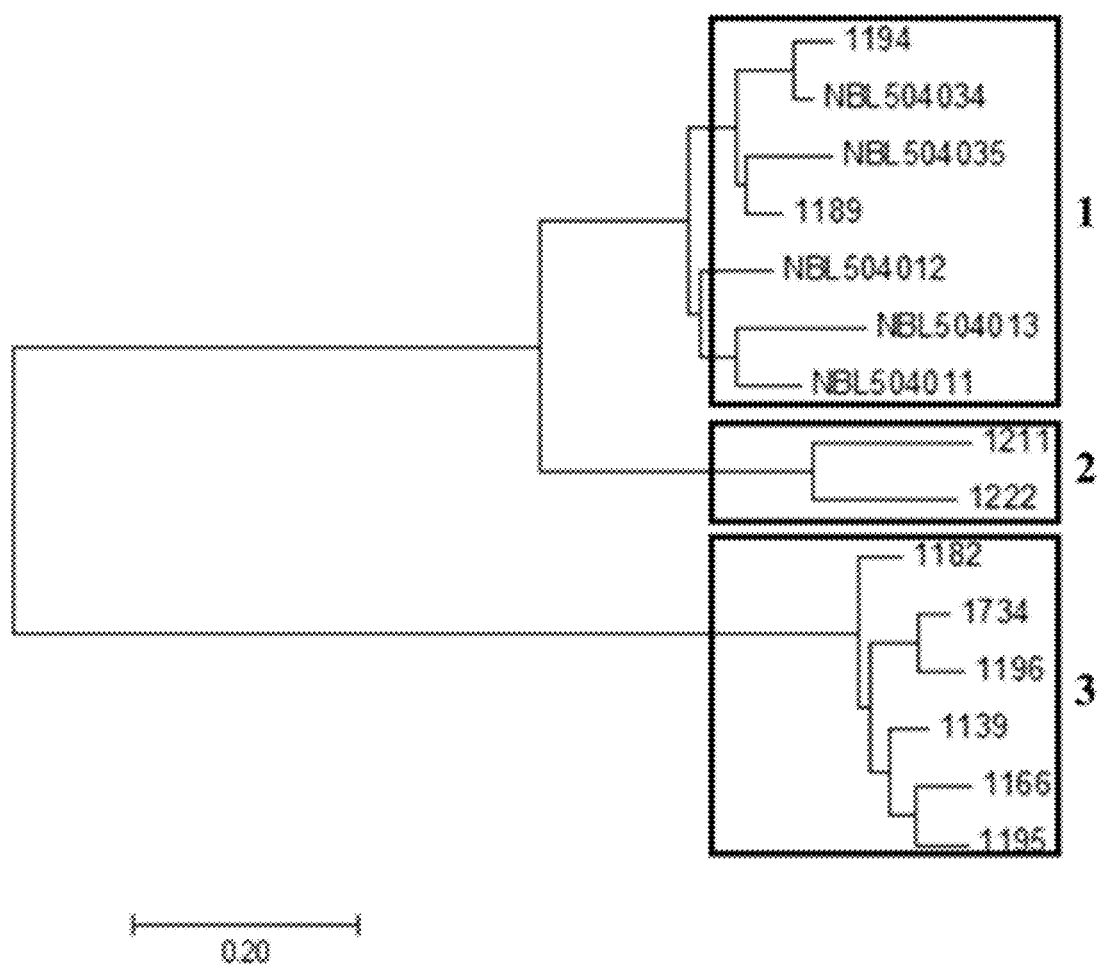

FIG. 17 shows a phylogenetic tree illustrating lineage grouping of selected anti-PD-1 VHH antibodies. The root of the phylogenetic tree serves as an anchor that defines a lineage group that includes the subgroups 1, 2 and 3.

Figure 18:
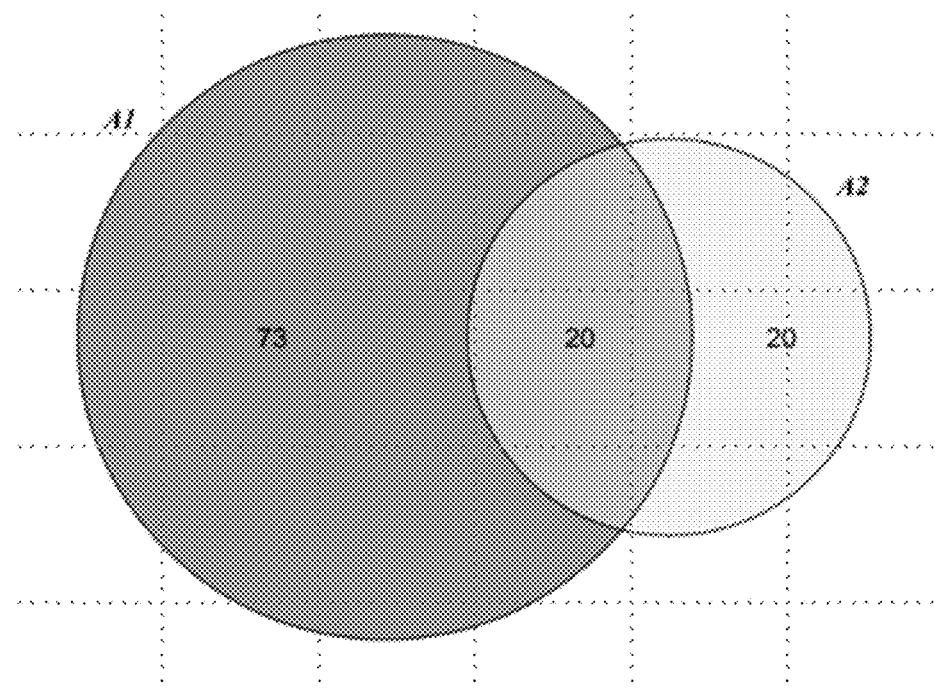

FIG. 18 shows a Venn diagram illustrating the overlap in CDR3 domain amino acid sequences in clone libraries from immunized alpacas A1 and A2.

Figure 19B:
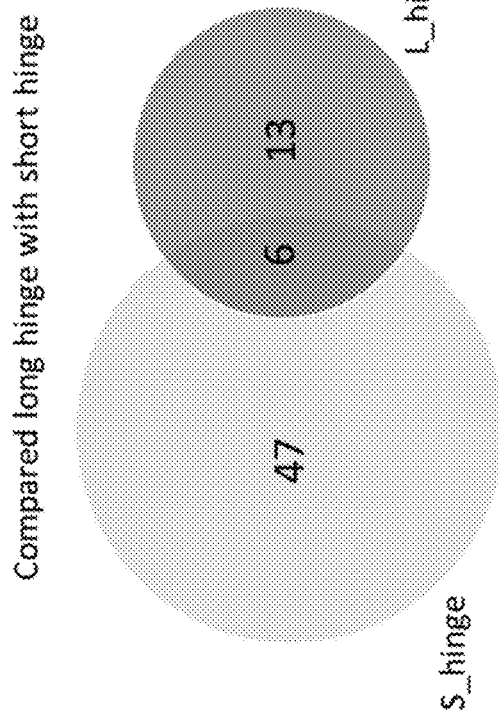
Figure 19A:
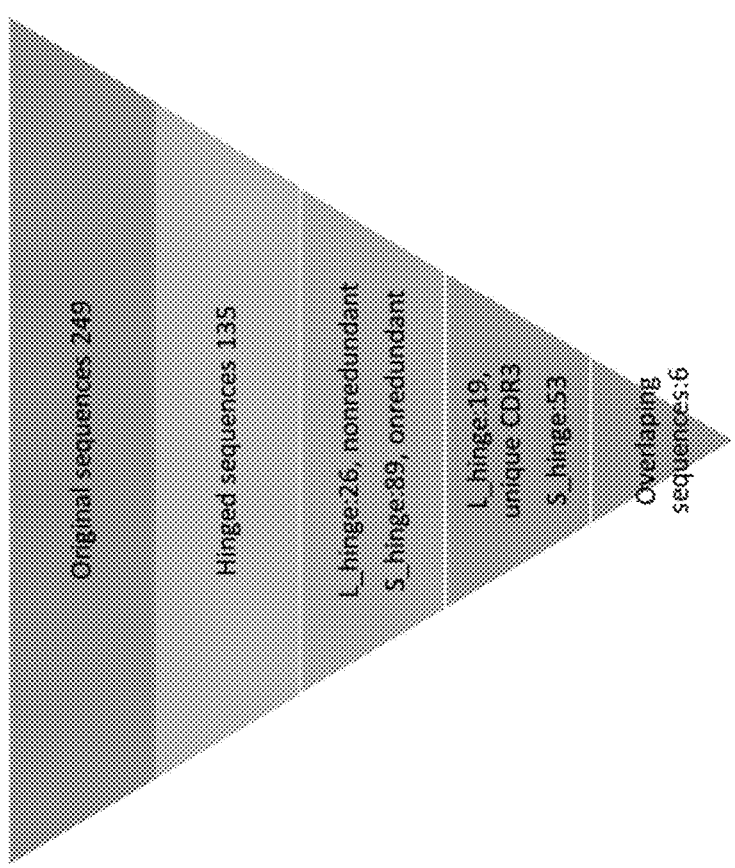

FIG. 19A shows a selection scheme to identify overlapping clones from alpacas A1 and A2 having hinge region and CDR3 domain sequences in common. FIG. 19B shows a Venn diagram illustrating the overlap in hinge region amino acid sequences in clone libraries from immunized alpacas A1 and A2.

Figure 20A:
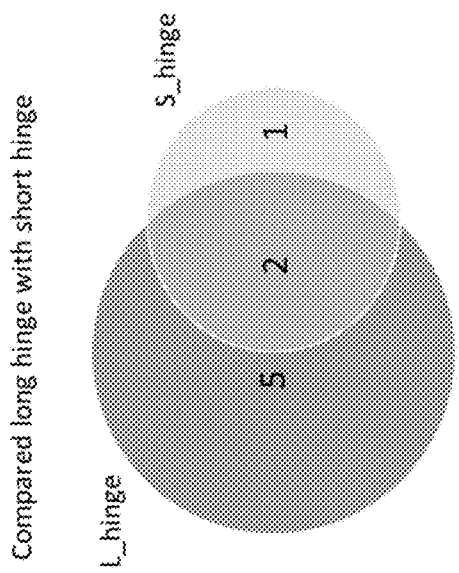
Figure 20B:
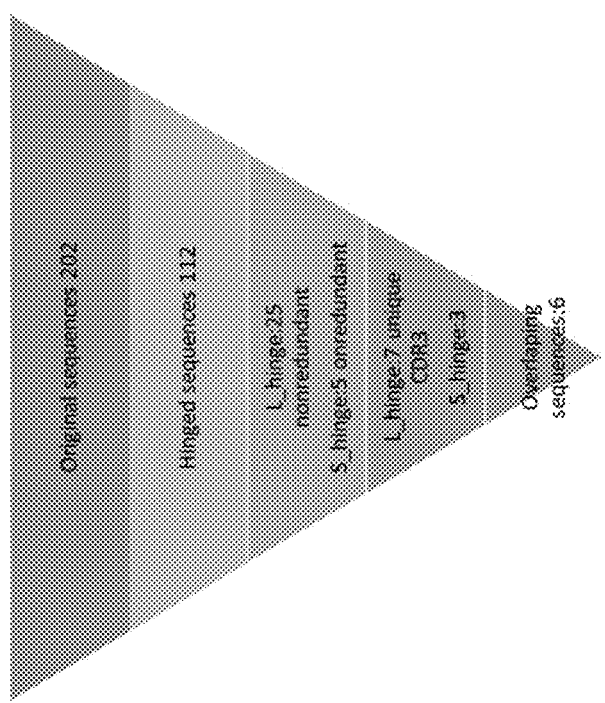

FIG. 20A shows a selection scheme to identify overlapping clones from alpacas A1 and A2 having hinge region and CDR3 domain sequences in common. FIG. 20B shows a Venn diagram illustrating the overlap in hinge region amino acid sequences in clone libraries from immunized alpacas A1 and A2.

Figures 21A, 21B:
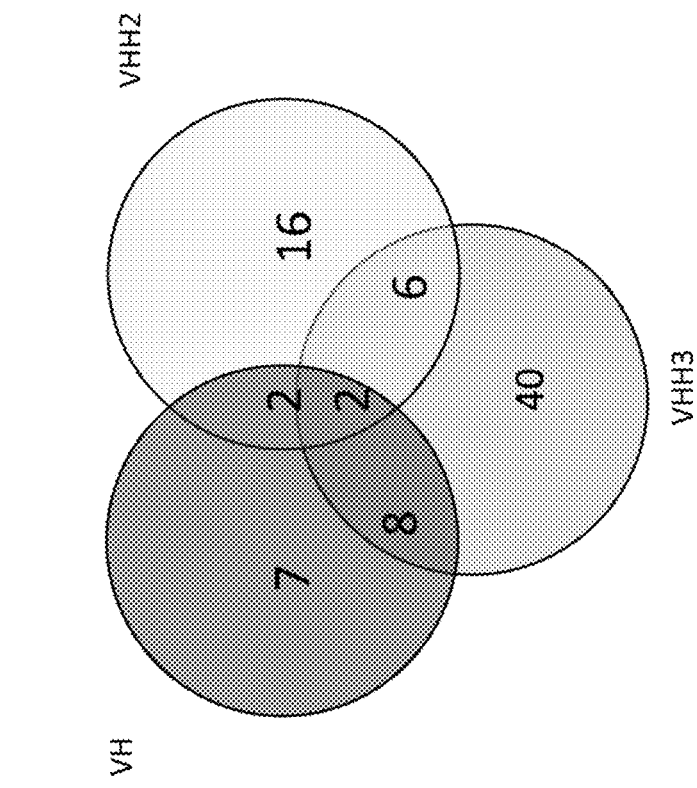

FIG. 21A shows a Venn diagram illustrating the overlapping clones of VH, VHH2 and VHH3 antibodies in a library from a single alpaca that have common CDR3 domain sequences. FIG. 21B shows the CDR3 sequences in common.

Figure 22:
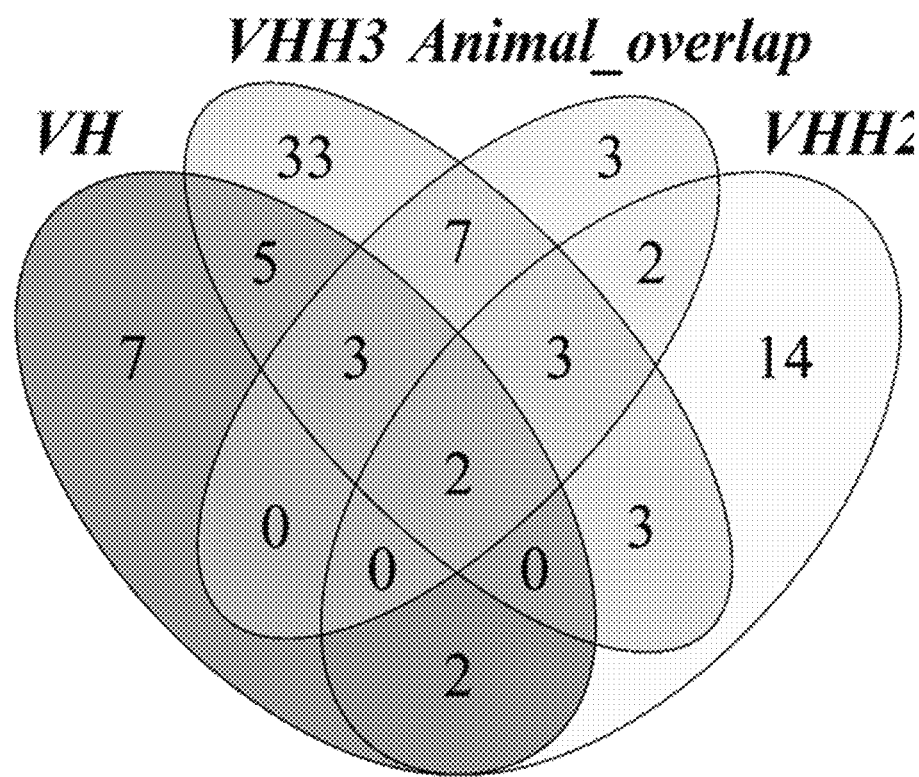

FIG. 22 is a Venn diagram showing the number of CDR3 domain sequences in common among alpacas A1 and A2, VH, VHH2 and VHH3 antibodies.

Figure 23:
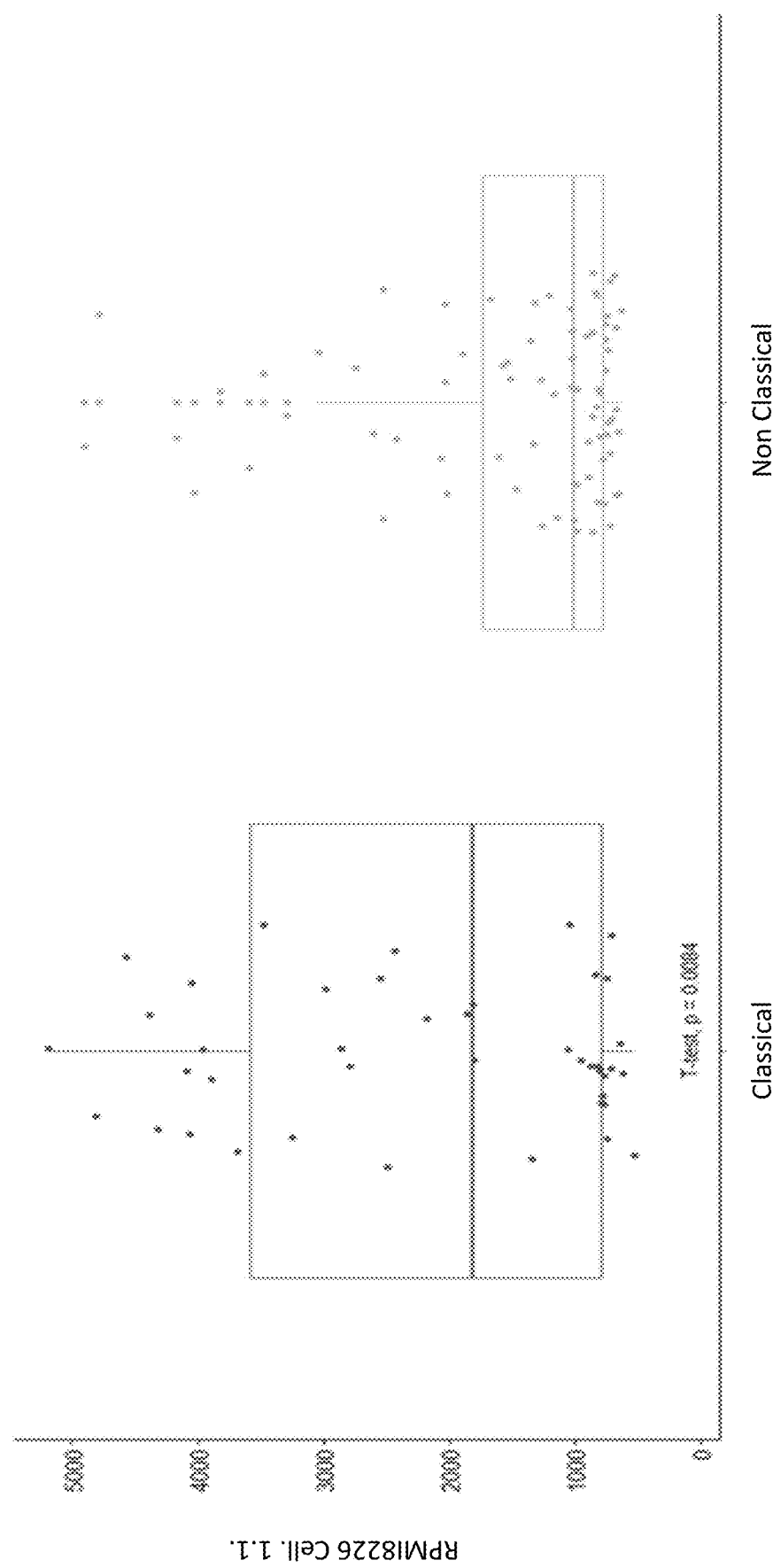

FIG. 23 shows the antigen-binding affinity by FACS using RPMI8226 cells expressing BCMA of selected antibody clones of classical VHH type and non-classical VHH type.

Figure 24:
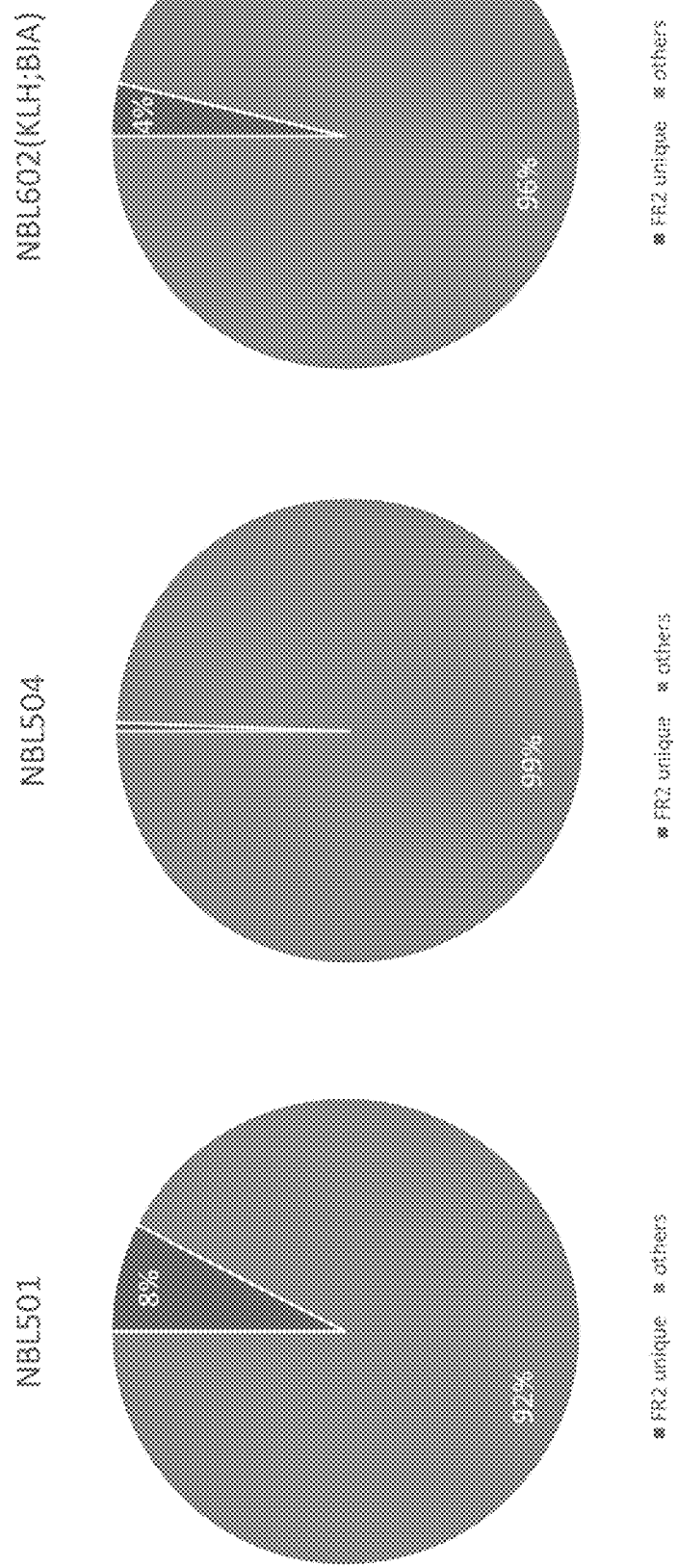

FIG. 24 shows the proportion of unique FR2 domain sequences in each of three libraries of antibodies binding to three different antigens.

Figure 25:
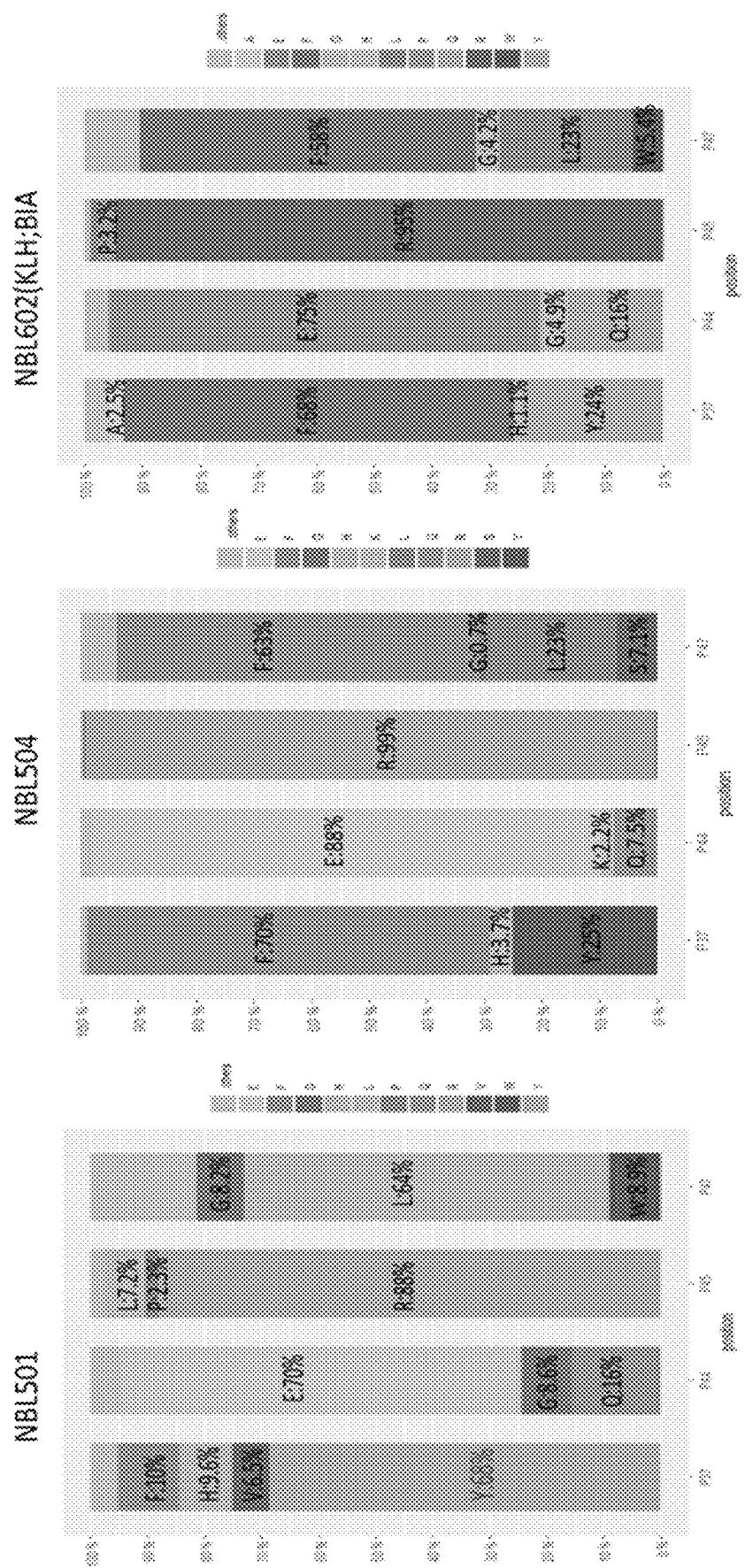

FIG. 25 shows the frequency of certain amino acid substitutions in the FR2 domain of antibodies in each of three libraries of antibodies binding to three different antigens.

Figure 26:
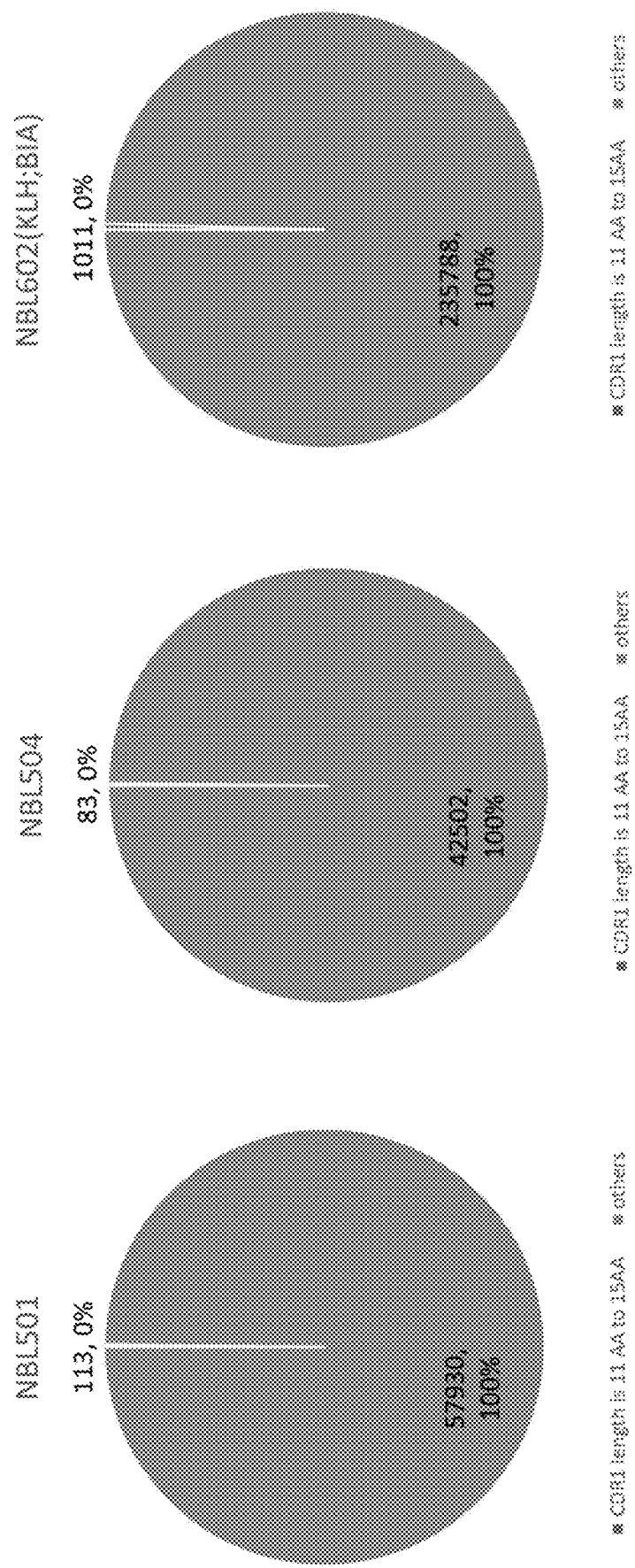

FIG. 26 shows the proportion of clones having a CDR1 domain length from 11 to 15 amino acids in each of three libraries of antibodies binding to three different antigens.

Figure 27:
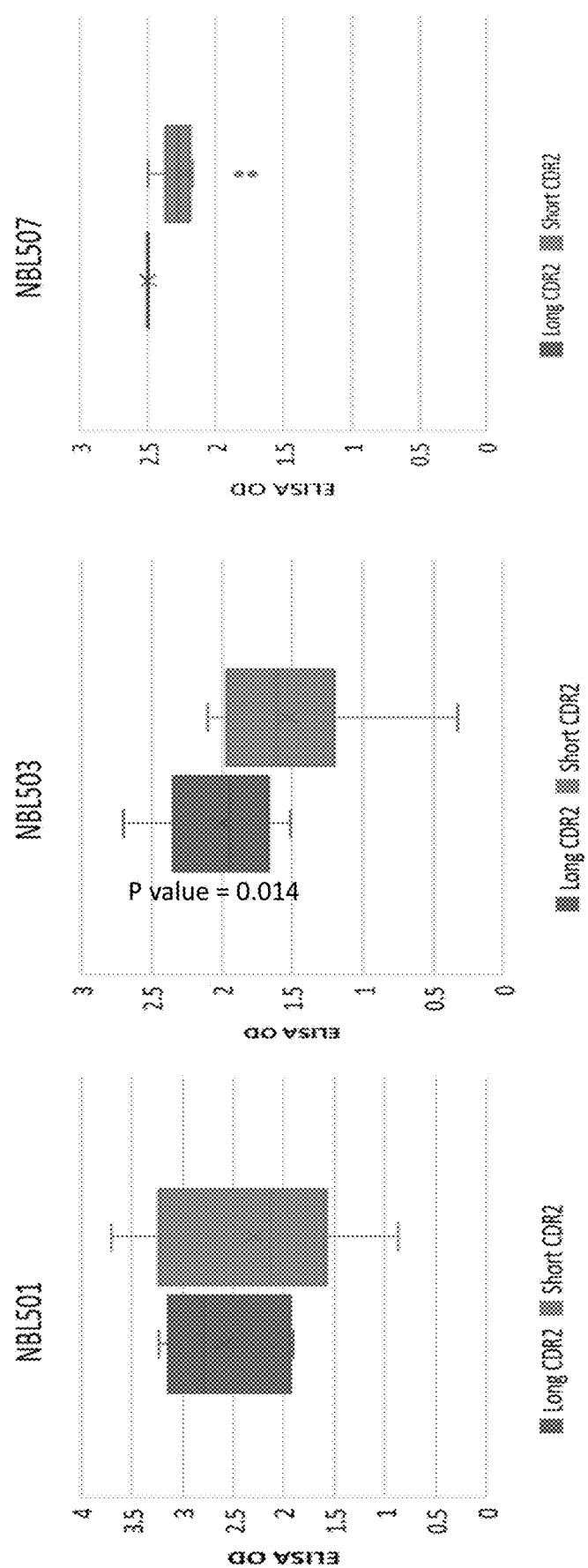

FIG. 27 shows the distribution of binding affinity by ELISA of antibodies having "long CDR2" domains in antibodies from three libraries targeting three different antigens.

Figure 28:
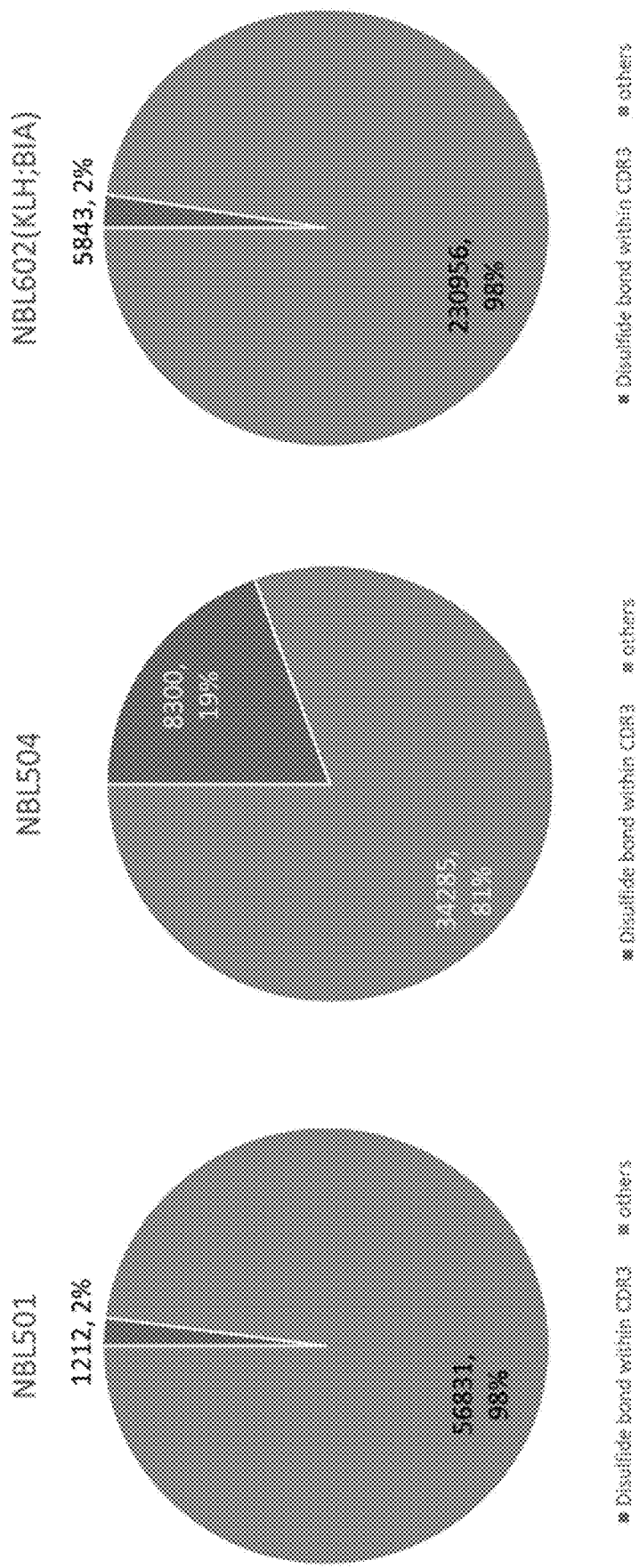

FIG. 28 shows the proportion of clones having extra disulfide bonds within the CDR3 domain in antibodies from three libraries targeting three different antigens.

Figure 29:
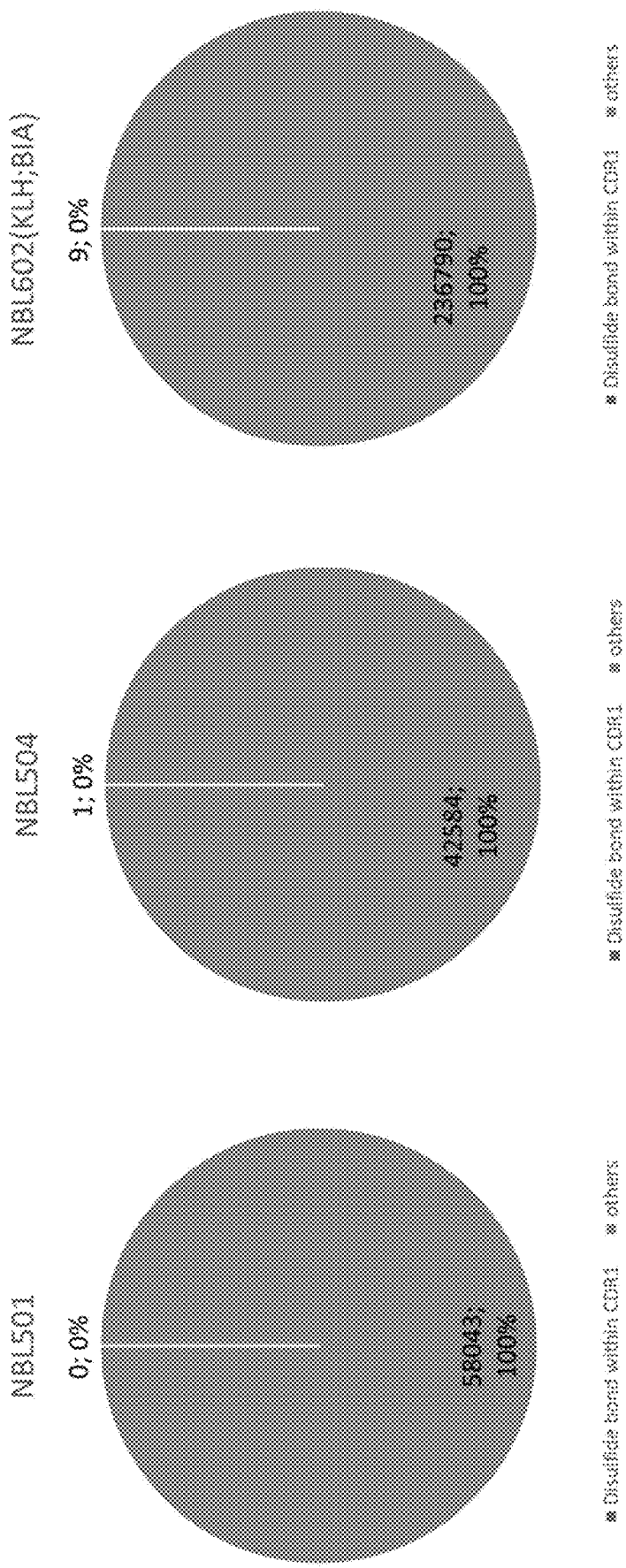
Figure 30:
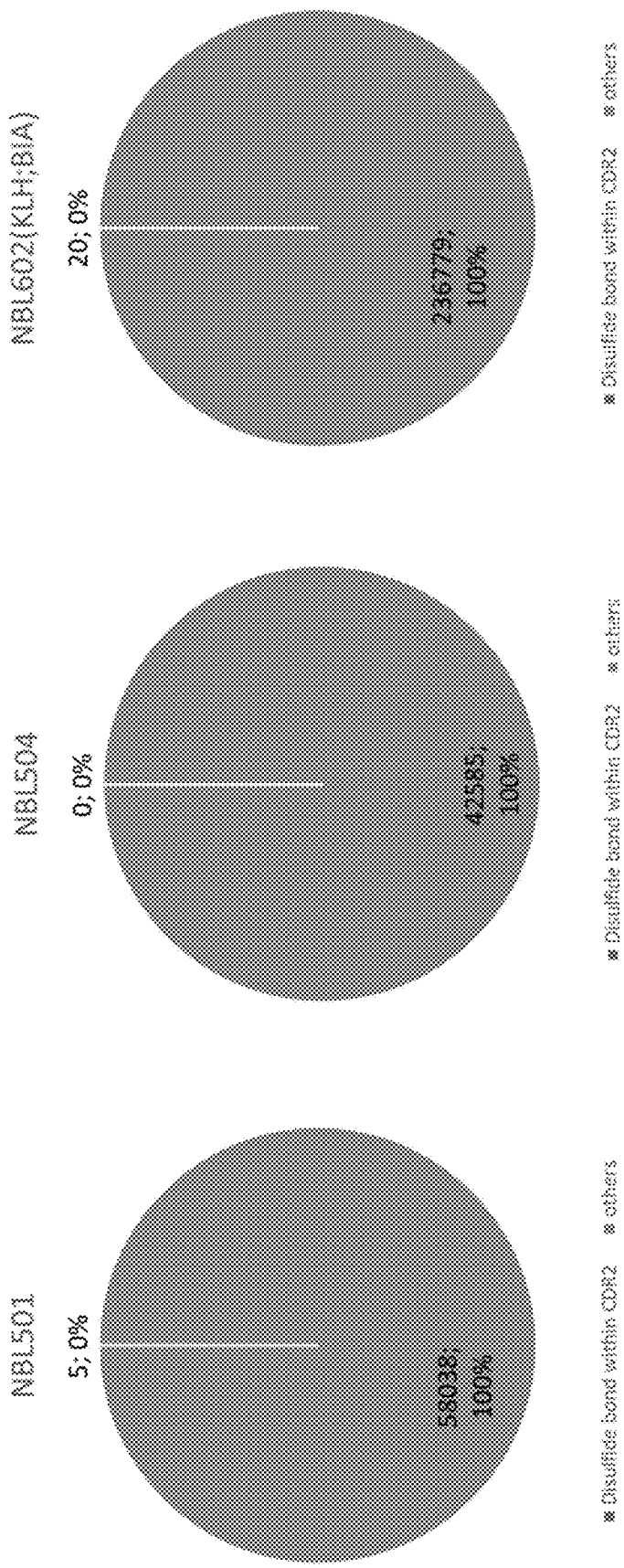

FIG. 29 and FIG. 30 show the proportion of clones having extra disulfide bonds between the CDR1 and CDR2 domains in antibodies from three targeting three different antigens.

Figure 31:
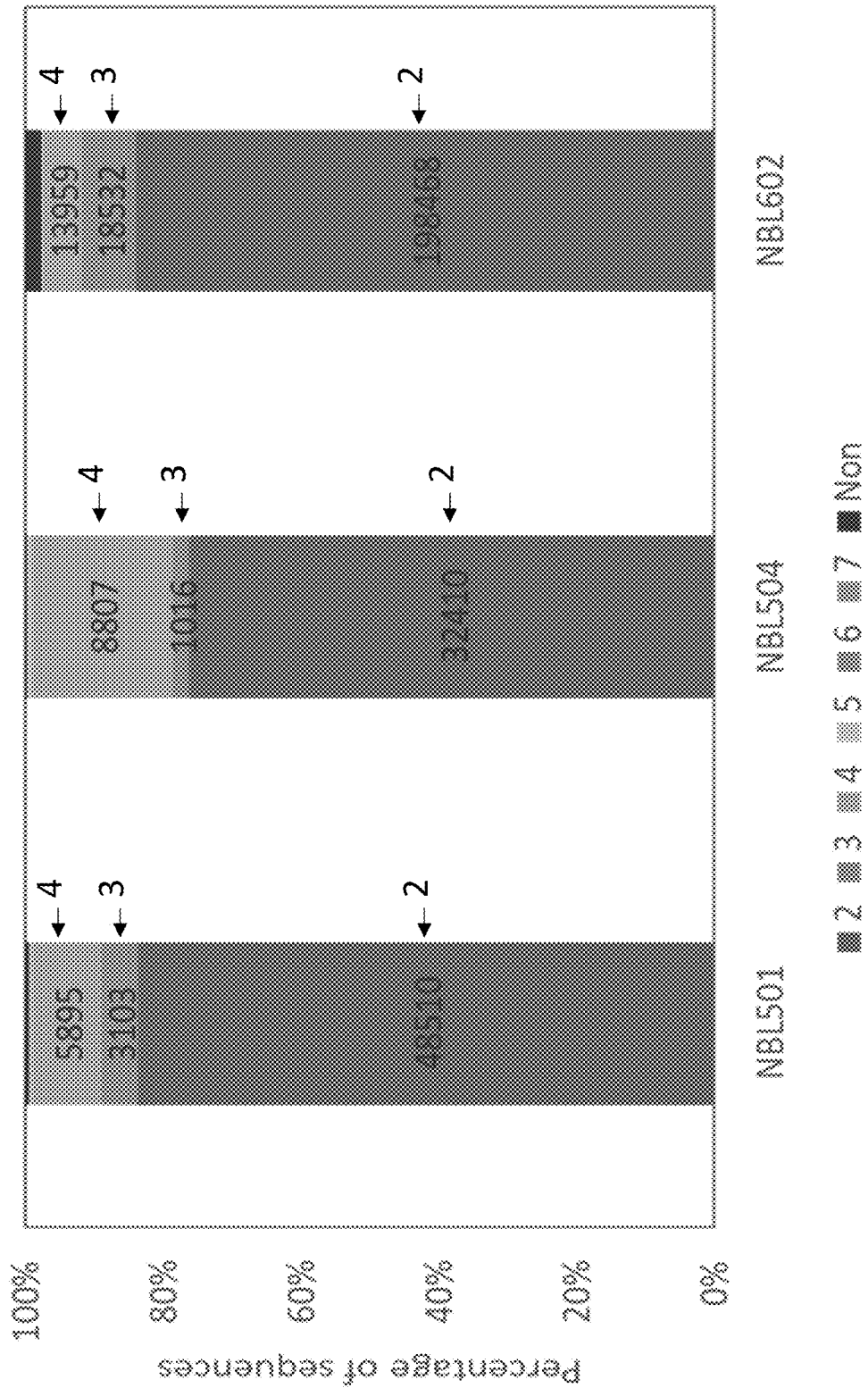

FIG. 31 shows analysis of the number of cysteine residues in the amino acid sequence of V-region in antibodies from three libraries targeting three different antigens.

Figure 32:
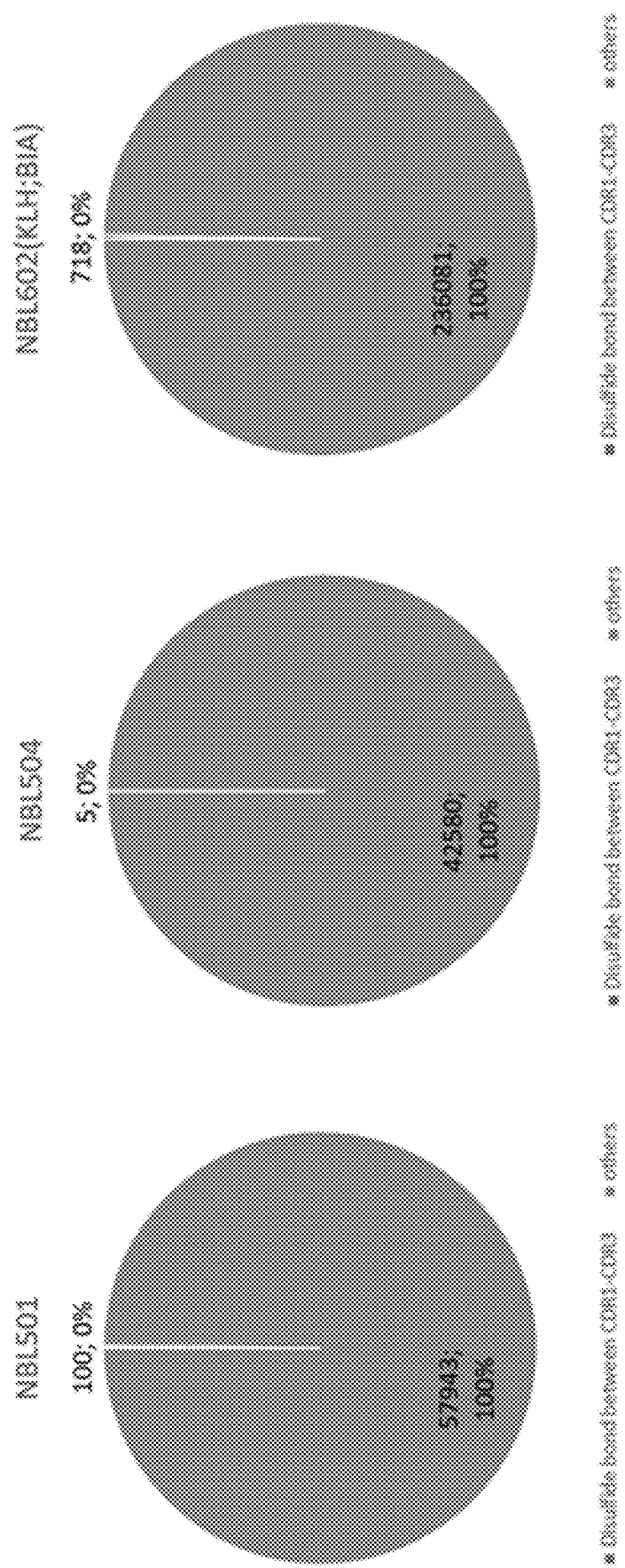

FIG. 32 shows the proportion of clones having extra disulfide bonds between the CDR1 and CDR3 domains in antibodies from three libraries targeting three different antigens.

Figure 33:
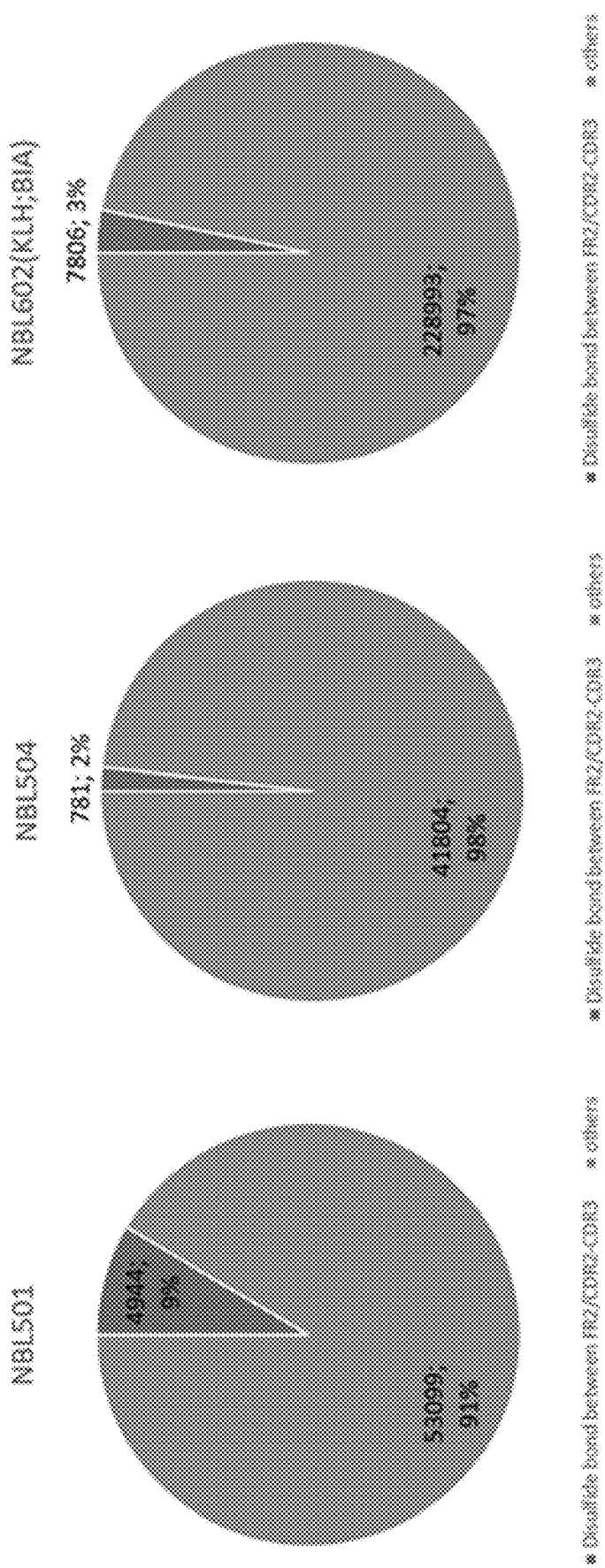

FIG. 33 shows the proportion of clones having extra disulfide bonds between the FR2 and CDR2 domains or between the FR2 and CDR3 domains in antibodies from three libraries targeting three different antigens.

Figure 34:
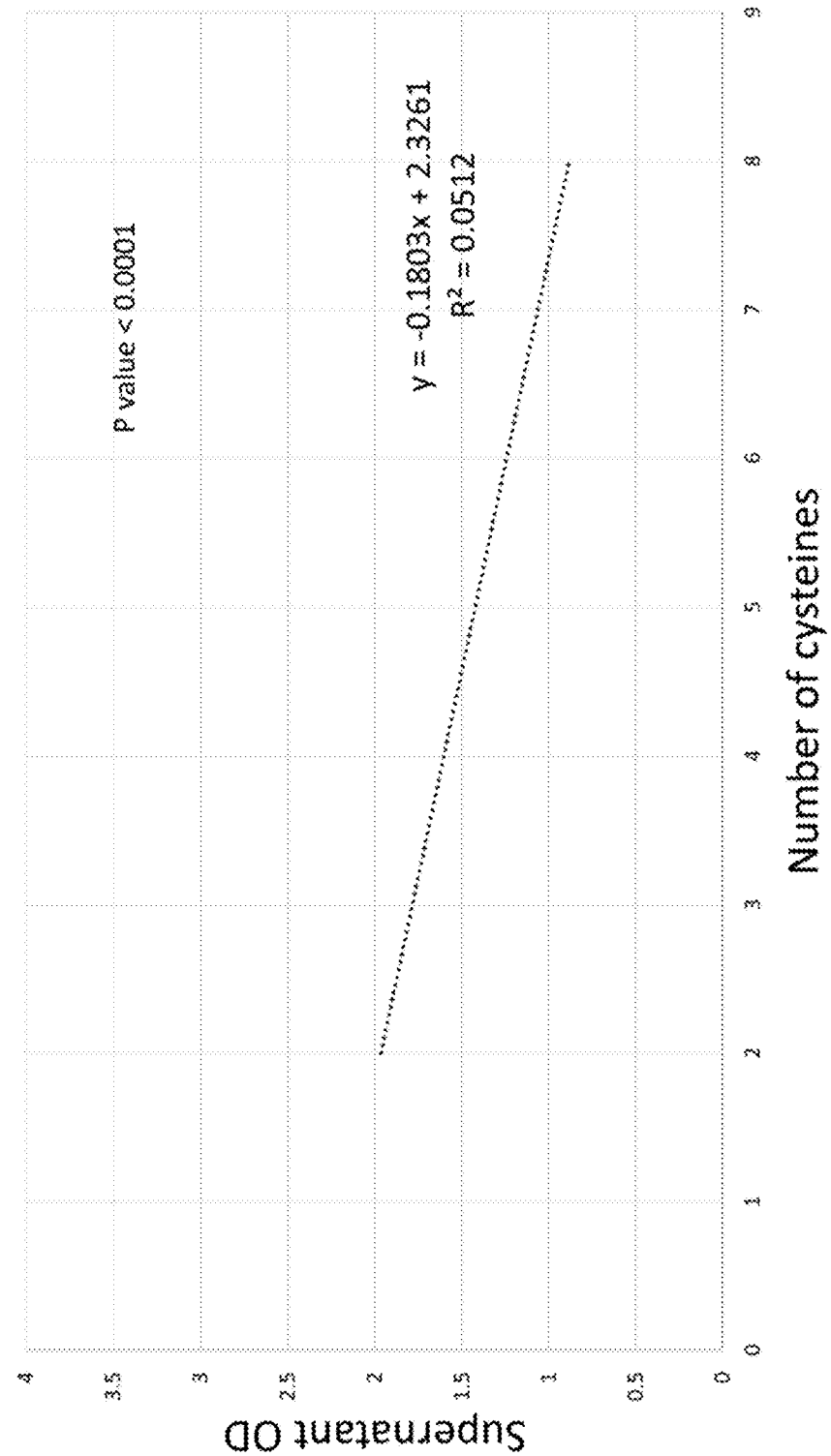

FIG. 34 shows the correlation between the number of cysteine amino acids in a VHH antibody sequence and the supernatant OD value.

Figure 35:
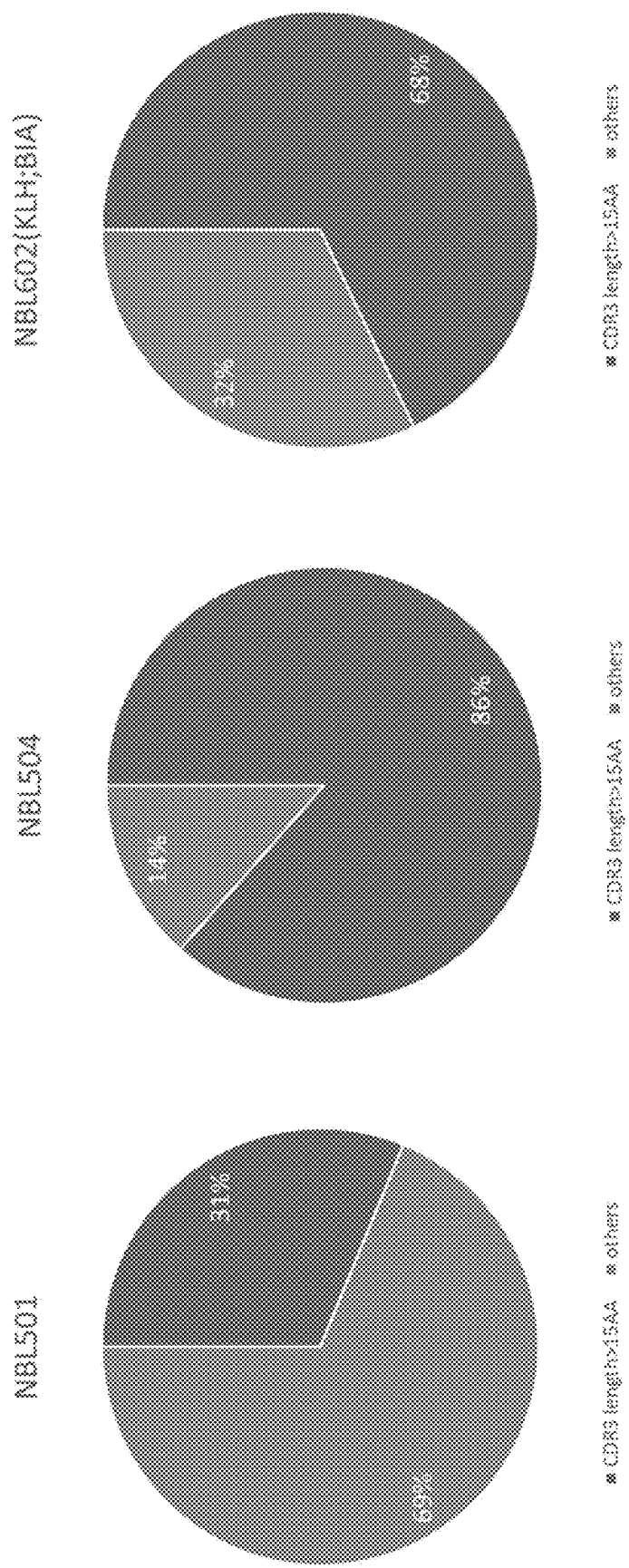

FIG. 35 shows the proportion of clones having a "long CDR3" domain in each of three libraries of antibodies binding to three different antigens.

Figure 36:
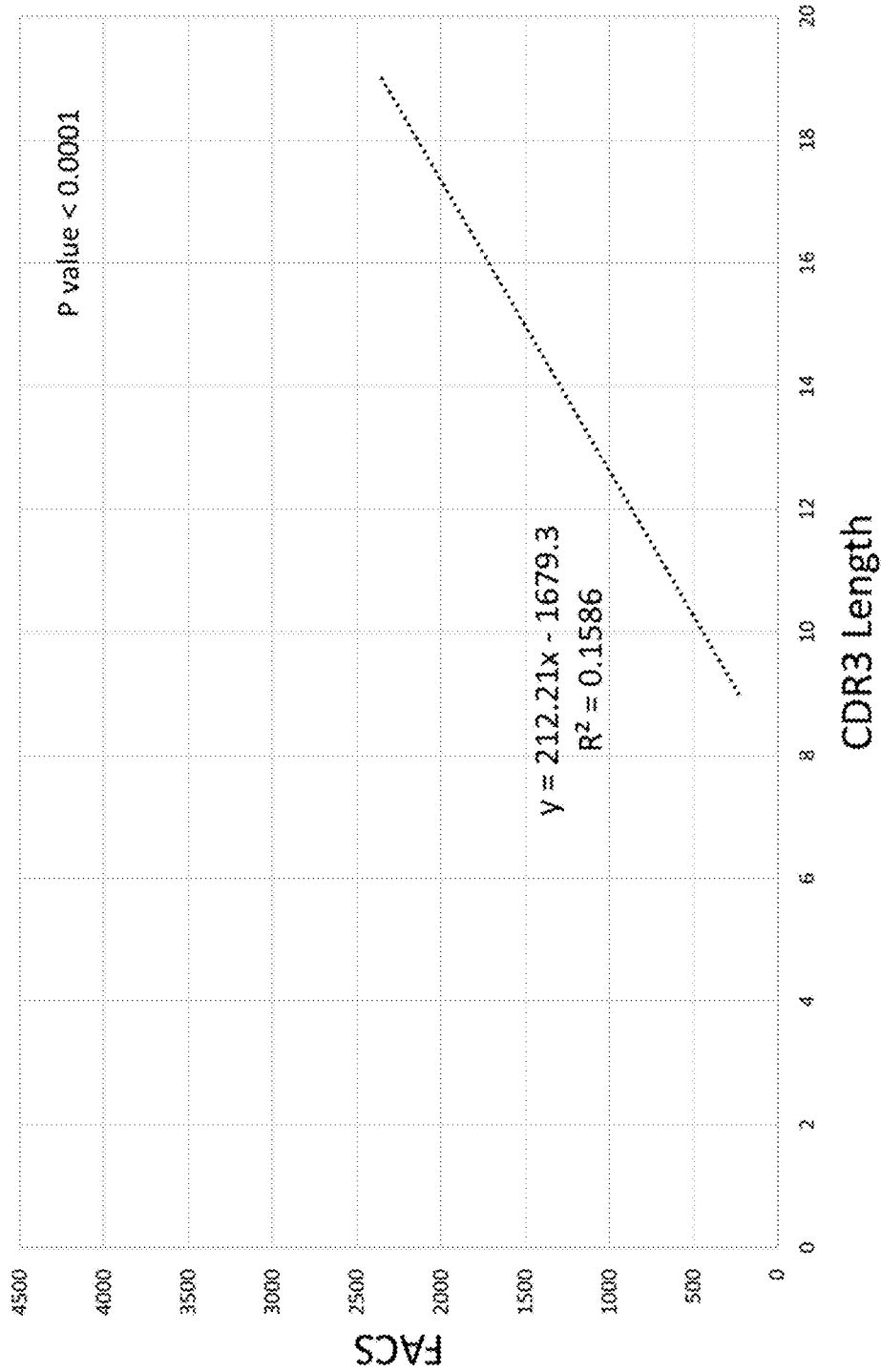
Figure 37:
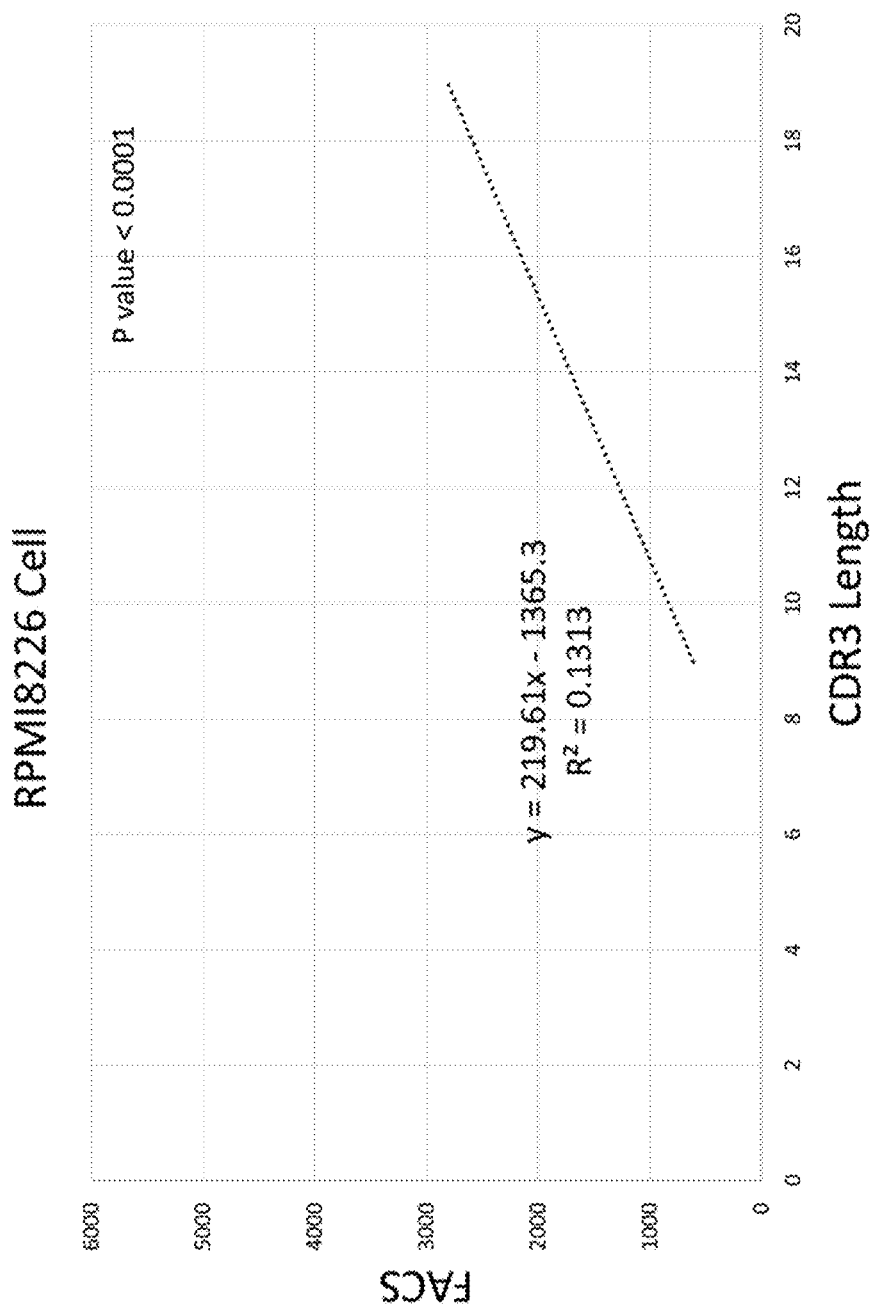
Figure 38:
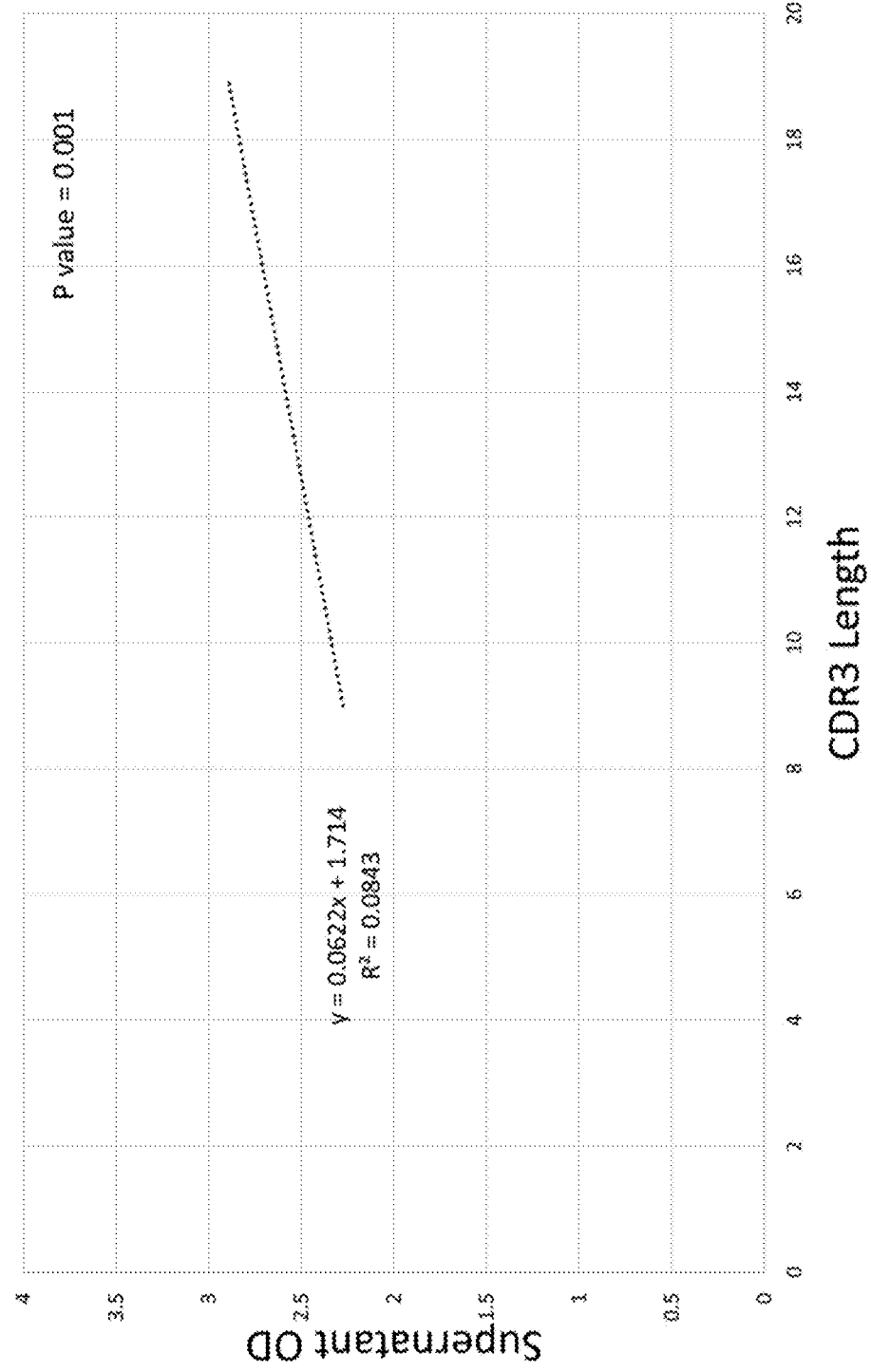

FIG. 36, FIG. 37 and FIG. 38 show the correlation between length of the CDR3 domain and antibody affinity assayed by FACS or ELISA for VHH anti-BCMA antibodies.

Figure 39:
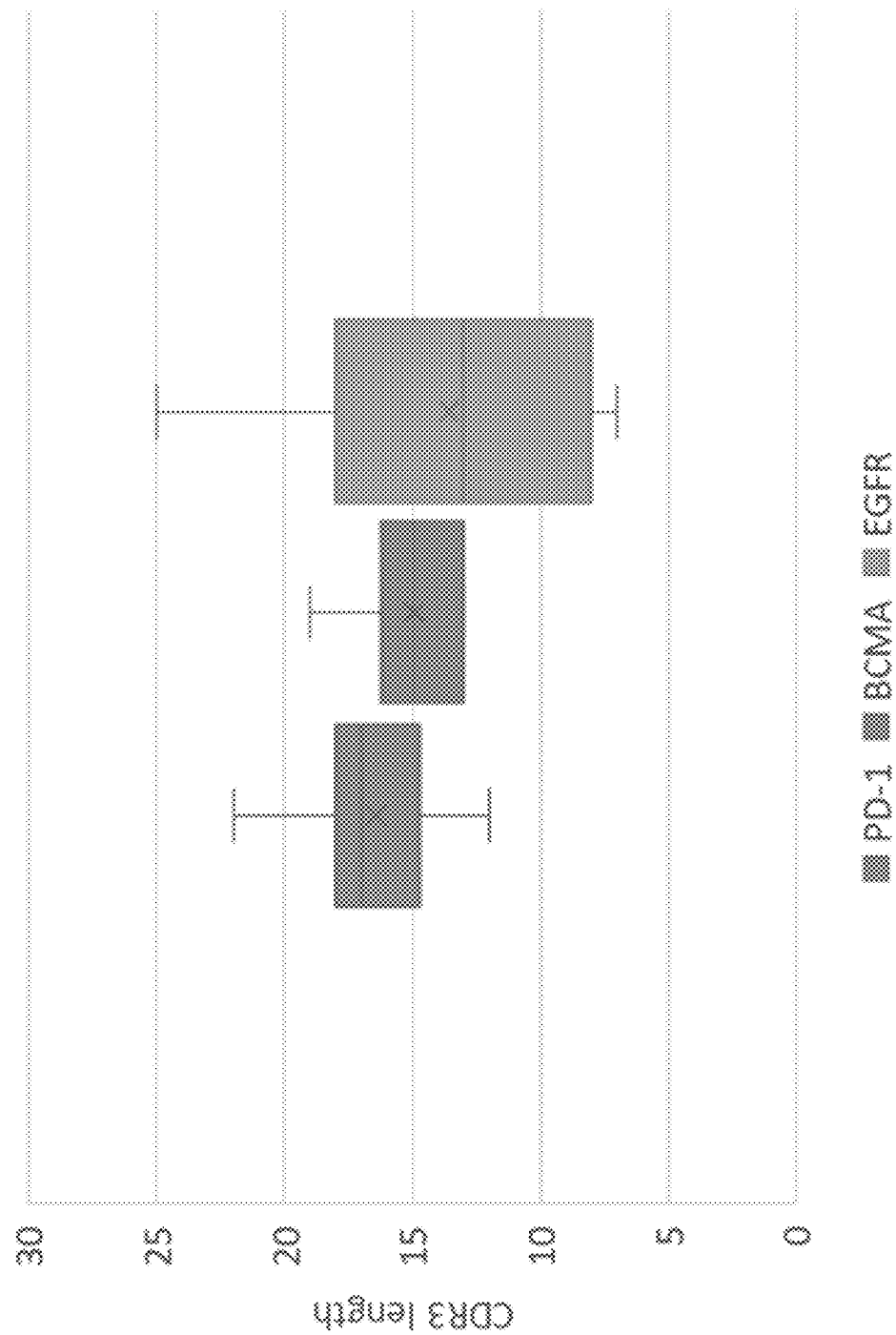

FIG. 39 shows the range of CDR3 length for a population of VHH antibodies binding to nearly identical epitopes or the same epitope of a certain antigen.

FIG. 40 shows the results of an experiment assessing competition of selected anti-PD1 clones with KEYTRUDA and OPDIVO for binding to PD1.

Figure 41:
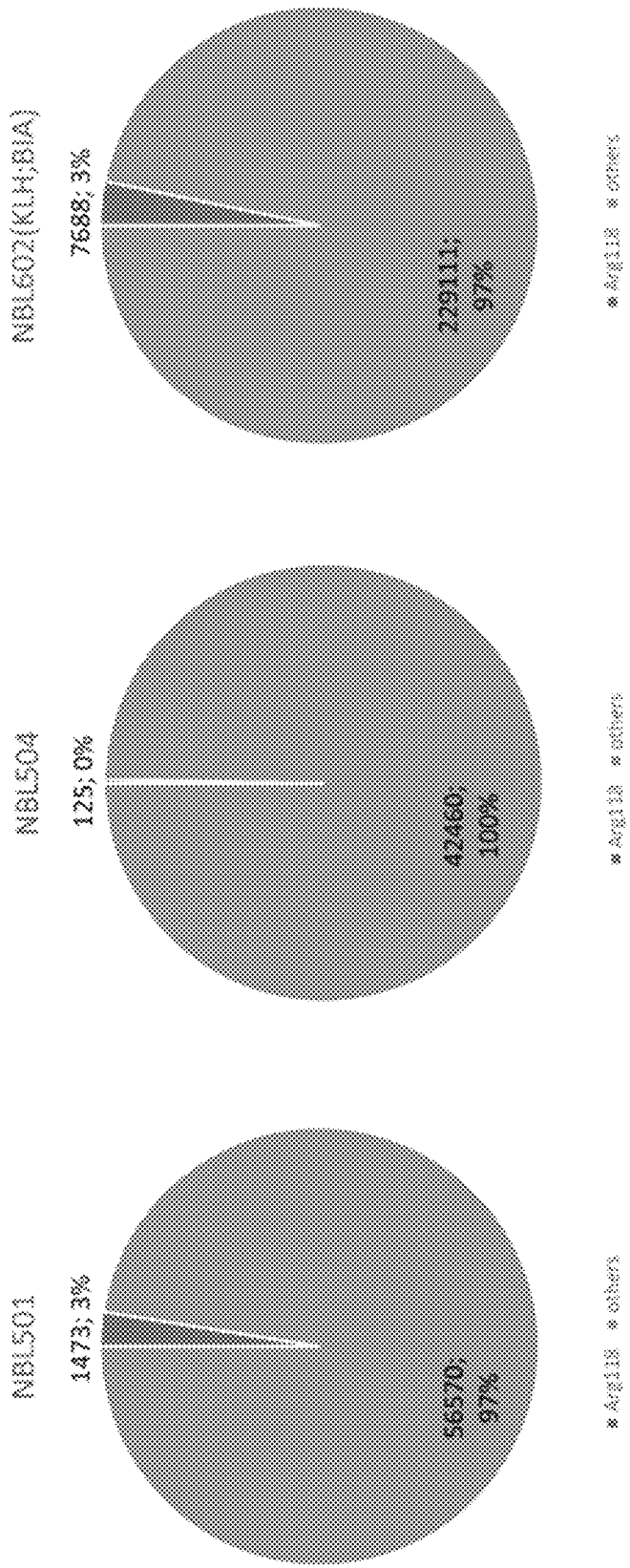

FIG. 41 shows the proportion of clones having the Trp118 amino acid substituted with Arg in VHH antibodies in each of three libraries of antibodies binding to three different antigens.

Figure 42:
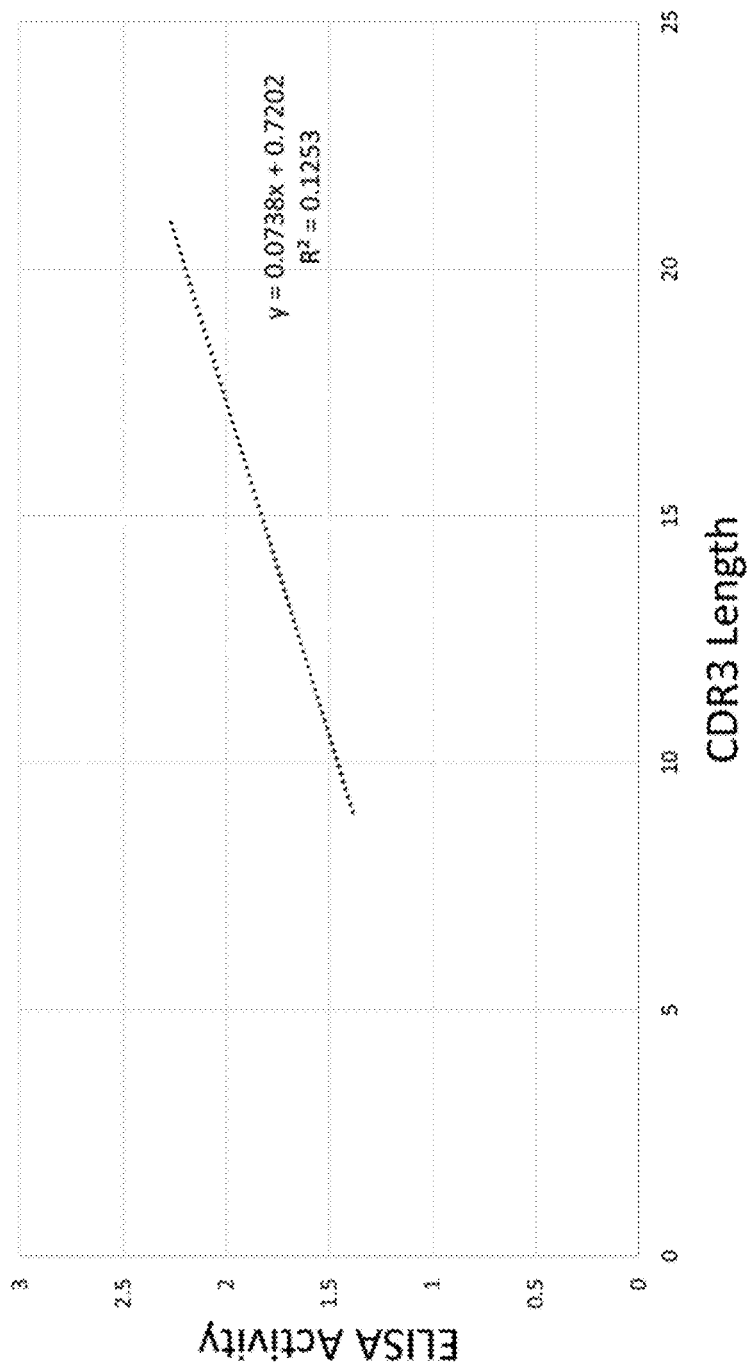

FIG. 42 shows the positive correlation between length of the CDR3 and ELISA binding activity for anti-KLH VHH antibodies.

DETAILED DESCRIPTION

The following embodiments and aspects thereof are described and illustrated in conjunction with systems, compositions and methods which are meant to be exemplary and illustrative, not limiting in scope.

Definitions

As used herein the term "comprising" or "comprises" is used in reference to compositions, methods, and respective component(s) thereof, that are useful to an embodiment, yet open to the inclusion of unspecified elements, whether useful or not. It is understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.).

Unless stated otherwise, the terms "a" and "an" and "the" and similar references used in the context of describing a particular embodiment of the application (especially in the context of claims) can be construed to cover both the singular and the plural. The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (for example, "such as") provided with respect to certain embodiments herein is intended merely to better illuminate the application and does not pose a limitation on the scope of the application otherwise claimed. The abbreviation, "e.g." is derived from the Latin exempli gratia, and is used herein to indicate a non-limiting example. Thus, the abbreviation "e.g." is synonymous with the term "for example." No language in the specification should be construed as indicating any non-claimed element essential to the practice of the application.

The term "plurality" refers to more than 1, for example more than 2, more than about 5, more than about 10, more than about 20, more than about 50, more than about 100, more than about 200, more than about 500, more than about 1000, more than about 2000, more than about 5000, more than about 10,000, more than about 20,000, more than about 50,000, more than about 100,000, usually no more than about 200,000. A "population" contains a plurality of items.

As used herein, the term "about" refers to a measurable value such as an amount, a time duration, and the like, and encompasses variations of ±20%, ±10%, ±5%, ±1%, ±0.5% or ±0.1% from the specified value.

The term "epitope" as used herein can include any protein determinant capable of specific binding to an immunoglobulin or T-cell receptor. Epitopic determinants usually consist of chemically active surface groupings of molecules such as amino acids or sugar side chains and usually have specific three-dimensional structural characteristics, as well as specific charge characteristics. An antibody is said to specifically bind an antigen when the equilibrium dissociation constant is ≤1 μM, preferably ≤100 nM and most preferably ≤10 nM.

The term "$K_D$" can refer to the equilibrium dissociation constant of a particular antibody-antigen interaction.

The term "immune response" as used herein can refer to the action of, for example, lymphocytes, antigen presenting cells, phagocytic cells, granulocytes, and soluble macromolecules produced by the above cells or the liver (including antibodies, cytokines, and complement) that results in selective damage to, destruction of, or elimination from an organism of invading pathogens, cells or tissues infected with pathogens, cancerous cells, or, in cases of autoimmunity or pathological inflammation, normal organismal cells or tissues.

An "antigen-specific T cell response" as used herein can refer to responses by a T cell that result from stimulation of the T cell with the antigen for which the T cell is specific. Non-limiting examples of responses by a T cell upon antigen-specific stimulation include proliferation and cytokine production (e.g., IL-2 production).

As used herein, the term "antibody" refers to an intact immunoglobulin or to a monoclonal or polyclonal antigen-binding fragment with the Fc (crystallizable fragment) region or FcRn binding fragment of the Fc region, referred to herein as the "Fc fragment" or "Fc region". Antigen-binding fragments may be produced by recombinant DNA techniques or by enzymatic or chemical cleavage of intact antibodies. Antigen-binding fragments include, inter alia, Fab, Fab', F(ab')2, Fv, dAb, and complementarity determining region (CDR) fragments, single-chain antibodies (scFv), single region antibodies, chimeric antibodies, diabodies and polypeptides that contain at least a portion of an immunoglobulin that is sufficient to confer specific antigen binding to the polypeptide. The Fc region includes portions of two heavy chains contributing to two or three classes of the antibody. The Fc region may be produced by recombinant DNA techniques or by enzymatic (e.g. papain cleavage) or via chemical cleavage of intact antibodies.

The term "antibody fragment," as used herein, refers to a protein fragment that comprises only a portion of an intact antibody, generally including an antigen binding site of the intact antibody and thus retaining the ability to bind antigen. Examples of antibody fragments encompassed by the present definition include: (i) the Fab fragment, having VL, CL, VH and CH1 regions; (ii) the Fab' fragment, which is a Fab fragment having one or more cysteine residues at the C-terminus of the CH1 region; (iii) the Fd fragment having VH and CH1 regions; (iv) the Fd' fragment having VH and CH1 regions and one or more cysteine residues at the C-terminus of the CH1 region; (v) the Fv fragment having the VL and VH regions of a single arm of an antibody; (vi) the dAb fragment (Ward et al., Nature 341, 544-546 (1989)) which consists of a VH region; (vii) isolated CDR regions; (viii) F(ab')2 fragments, a bivalent fragment including two Fab' fragments linked by a disulfide bridge at the hinge region; (ix) single chain antibody molecules (e.g., single chain Fv; scFv) (Bird et al., Science 242:423-426 (1988); and Huston et al., PNAS (USA) 85:5879-5883 (1988)); (x) "diabodies" with two antigen binding sites, comprising a heavy chain variable region (VH) connected to a light chain variable region (VL) in the same polypeptide chain (see, e.g., EP 404,097; WO 93/11161; and Hollinger et al., Proc. Natl. Acad. Sci. USA, 90:6444-6448 (1993)); (xi) "linear antibodies" comprising a pair of tandem Fd segments (VH-CH1-VH-CH1) which, together with complementary light chain polypeptides, form a pair of antigen binding regions (Zapata et al. Protein Eng. 8(10):1057-1062 (1995); and U.S. Pat. No. 5,641,870).

"Single-chain variable fragment", "single-chain antibody variable fragments" or "scFv" antibodies as used herein refers to forms of antibodies comprising the variable regions of only the heavy (VH) and light (VL) chains, connected by a linker peptide. The scFvs are capable of being expressed as a single chain polypeptide. The scFvs retain the specificity of the intact antibody from which it is derived. The light and heavy chains may be in any order, for example, VH-linker-VL or VL-linker-VH, so long as the specificity of the scFv to the target antigen is retained.

An "isolated antibody", as used herein, can refer to an antibody that is substantially free of other antibodies having different antigenic specificities (e.g., an isolated antibody that specifically binds a TRAIL protein can be substantially free of antibodies that specifically bind antigens other than TRAIL proteins). An isolated antibody that specifically binds a human TRAIL protein can, however, have cross-reactivity to other antigens, such as TRAIL proteins from other species. Moreover, an isolated antibody can be substantially free of other cellular material and/or chemicals.

The terms "monoclonal antibody" or "monoclonal antibody composition" as used herein can refer to a preparation of antibody molecules of single molecular composition. A monoclonal antibody composition displays a single binding specificity and affinity for a particular epitope.

The term "recombinant human antibody", as used herein, can refer to all human antibodies that are prepared, expressed, created or isolated by recombinant means, such as (a) antibodies isolated from an animal (e.g., a mouse) that is transgenic or transchromosomal for human immunoglobulin genes or a hybridoma prepared therefrom (described below), (b) antibodies isolated from a host cell transformed to express the human antibody, e.g., from a transfectoma, (c) antibodies isolated from a recombinant, combinatorial human antibody library, and (d) antibodies prepared, expressed, created or isolated by any other means that involve splicing of human immunoglobulin gene sequences to other DNA sequences. Such recombinant human antibodies have variable regions in which the framework and CDR regions are derived from human germline immunoglobulin sequences. In certain embodiments, however, such recombinant human antibodies can be subjected to in vitro mutagenesis (or, when an animal transgenic for human Ig sequences is used, in vivo somatic mutagenesis) and thus the amino acid sequences of the VH and VL regions of the recombinant antibodies are sequences that, while derived from and related to human germline VH and VL sequences, may not naturally exist within the human antibody germline repertoire in vivo.

The term "isotype" can refer to the antibody class (e.g., IgM or IgG1) that is encoded by the heavy chain constant region genes. An antibody can be an immunoglobulin G (IgG), an IgM, an IgE, an IgA or an IgD molecule, or is derived therefrom.

The term "VHH$^2$", "VHH$^3$" and "VH" are representing the heavy chains of three camelid IgG isotypes IgG2, IgG3 and IgG1 respectively. VL$^3$ is representing the light chain of camelid IgG1. Camelid VL$^3$ includes, but not limited to Vκ and Vλ.

The term "correspondingly positioned amino acids" and "corresponding amino acids" used herein interchangeably, are amino acid residues that are at an identical position (i.e., they lie across from each other) When two or more amino acid sequences are aligned. Methods for aligning and numbering antibody sequences are set forth in great detail in Chothia, supra, Kabat supra, and others. As is known in the art (see, e.g. Kabat 1991 Sequences of Proteins of Immunological Interest, DHHS, Washington, DC), sometimes one, two or three gaps and/or insertions of up to one, two, three or four residues, or up to about 15 residues (particularly in the Light chain and Heavy chain CDR3) may be made to one or both of the amino acids of an antibody in order to accomplish an alignment.

The term "natural" antibody refers to an antibody in which the heavy and light chains of the antibody have been made and paired by the immune system of a multicellular organism. Spleen, lymph nodes, bone marrow, blood and other lymphatic tissues are examples of tissues that contain cells that produce natural antibodies. For example, the antibodies produced by B cells isolated from a first animal immunized with an antigen are natural antibodies. Natural antibodies contain naturally—paired heavy and light chains.

The term "naturally paired" refers to heavy and light chain sequences that have been paired by the immune system of a multi-cellular organism.

The term "mixture", as used herein, refers to a combination of elements, e. g., cells, that are interspersed and not in any particular order. A mixture is homogeneous and not spatially separated into its different constituents. Examples of mixtures of elements include a number of different cells that are present in the same aqueous solution in a spatially undressed manner.

The term "assessing" includes any form of measurement, and includes determining if an element is present or not. The terms "determining", "measuring", "evaluating", "assessing" and "assaying" are used interchangeably and may include quantitative and/or qualitative determinations. Assessing may be relative or absolute. "Assessing the presence of" includes determining the amount of something present, and/or determining whether it is present or absent.

The term "enriched" is intended to refer to component of a composition (e.g., a particular type of cells) that is more concentrated (e.g., at least 2×, at least 5×, at least 10×, at least 50×, at least 100×, at least 500×, at least 1,000×), relative to other components in the sample (e.g., other cells) than prior to enrichment. In some cases, something that is enriched may represent a significant percent (e.g., greater than 2%, greater than 5%, greater than 10%, greater than 20%, greater than 50%, or more, usually up to about 90%-100%) of the sample in which it resides.

The term "enriching" is intended to any way by which antigen—specific cells can be obtained from a larger population of B cells. As described in greater detail below, enriching may be done by panning, using a bead or cell sorting, for example.

The term "obtaining" in the context of obtaining an element, e. g., cells or sequences, is intended to include receiving the element as well as physically producing the element.

The term "peripheral blood mononucleated cells" or "PBMCs" refers to blood cells that have a single approximately round nucleus (as opposed to a lobed nucleus) and includes lymphocytes (T cells, B cells and NK cells), monocytes and macrophage. PBMCs can be enriched from whole blood using a Ficoll gradient.

The term "antigen-specific B cells" refers to memory B cells that have an antibody that specifically binds to an antigen on their surface, as well as progenitors thereof.

A cell is "derived from" a host if the cell, or the progeny thereof, was obtained from the host. The progeny of a progenitor cell is derived from the progenitor cell.

The term "support comprising the antigen" comprises any type of support (e.g., a solid or semi-solid support, including plates and beads) that contains an antigen, or a portion thereof, immobilized thereon. An antigen may be immobilized on a support directly or indirectly, e.g., via a linker, via a biotin-streptavidin interaction or via a cell, for example. Methods that enrich for antigen-specific B cells by panning or using beads make use of such a support.

The term "panning" is used to refer to a method by which B cells are applied to a container (e.g., a plate) that has one or more surfaces that are coated in an antigen or portion thereof. Unbound cells can be removed by washing the surface after the cells are applied to it.

The term "bead-based enrichment" is used to refer to a method by which B cells are mixed with beads, e.g., magnetic beads, that are linked to an antigen or portion thereof.

The term "cell sorting" is used to refer to a method by which B cells are mixed a detectable antigen (e.g., a fluorescently detectable antigen) in solution. In cell sorting methods, cells that are bound to the antigen are sorted from the unbound cells. Fluorescence-activated cell sorting (FACS) is an example of a cell sorting method.

The term "complex immunogen" is intended to refer to an immunogen that contains a plurality of antigens. A complex immunogen can be composed of a plurality of different antigens that have been separately made and then mixed together, or they may be naturally complex (e.g., as is the case when one uses an entire cell and tissue or a fraction thereof) in an immunization.

The term "activating" is referred to the stimulation of B cells to a) proliferate and b) differentiate into plasma blasts and/or plasma cells and c) secrete antibodies. B cell activation can be done by contacting the B cells with antigen, T cells expressing CD40L and cytokines, although other methods are known (see, e.g., Wykes, Imm. Cell. Biol. 2003 81: 328-331).

The term "activated B cells" refers to a cell population that comprises the progeny of a B cell that was activated. As noted above, activation causes B cells to proliferate, and the progeny of such cells are referred to herein as activated B cells.

The term "collecting" refers to the act of separating the cells that in the culture medium from a substrate. Collecting may be done by pipetting or by decanting, for example.

The term "immunized by an antigen" and grammatical equivalents thereof (e.g., "immunized animal") is intended to refer to any animal (humans, rabbits, mice, rats, sheep, cows, chickens, camels) that is mounting an immune response an antigen. An animal may be exposed to a foreign antigen via exposure to an infectious agent, a vaccination, or by administrating an antigen and adjuvant (e.g., by injection), for example. The term "immunized by an antigen" is also intended to include animals that are mounting an immune response against a "self" antigen, i.e., have an autoimmune disease.

The terms "ranking" and "ranked order of abundance" refer to the order of sequences when they are listed by their abundance, i.e., with the most abundant sequence first, the second most abundant sequence next, and the third most abundant sequence next, and so on. In certain cases, sequences may be ranked by making a frequency distribution, and then ordering the sequences by their frequency.

The term "corresponding rank" or "correspondingly ranked" refer to two sequences that have the same positions in two ranks. For example, the first, second and third positions in a first rank correspond to the first, second and third positions in a second rank, respectively.

The term "lineage rank" refers to the order of lineages when they are listed by their priority factors. The priority factors include but not limited to abundancy of lineage sequences, amplification factor, dynamic change of lineage sequence before and after depleting certain unwanted B cells, dynamic change of lineage sequence abundancy during immunization course, lineages which share the same naïve B-cell origin between VHH and VH, avoidance of developability liability sequences and a combination thereof.

The term "hamming distance" refers to the number of positions at which the corresponding symbols are different between two sequences of equal length.

As used herein, the term "grouped antibodies by lineage", "lineage-related antibodies" and "antibodies that related by lineage" as well as grammatically-equivalent variants thereof, are antibodies that are produced by cells that share a common B cell ancestor. Antibodies that are related by lineage bind to the same epitope of an antigen and are typically very similar in sequence, particularly in their light chain and heavy chain CDR3s. Both the heavy chain and light chain CDR3s of lineage-related antibodies can have an identical length and a near identical sequence (i.e., differ by up to 5, i.e., 0, 1, 2, 3, 4 or 5 residues). Among the group of CDR3s from a lineage, minimal CDR3 distance of a specific CDR3 is the smallest hamming distance of this CDR3 comparing with all other CDR3 of the same length. In some embodiments, the minimal CDR3 distance is equal to or less than 1. In certain cases, the B cell ancestor contains a genome having a rearranged light chain VJC region and a rearranged heavy chain VDJ region, and produces an antibody that has not yet undergone affinity maturation. "Naïve" or "virgin" B cells present in spleen tissue, are exemplary B cell common ancestors.

Related antibodies are related via a common antibody ancestor, e.g., the antibody produced in the naïve B cell ancestor. The term "lineage related antibodies" is intended to describe a group of antibodies that are produced by cells that arise from the same ancestor B-cell. A "lineage group" contains a group of antibodies that are related to one another by lineage.

As used herein, the term "at least the CDR3s" or "at least the CDR3 sequences" refers to only CDR3 sequences, CDR3 sequences in conjunction with CDR1 and/or CDR2 sequences or a sequences of at least 50 contiguous amino acids of the variable domain, up to the entire length of the variable domain, where the sequence contains a CDR3 sequence.

As used herein, the terms "lineage tree" refers to a diagram, resulting from a cladistics analysis, which depicts a hypothetical branching sequence of lineages leading to the individual species of interest. The points of branching within a lineage tree are called nodes.

As used herein, the term "constructing a phylogenetic tree" refers to the computational act of making a phylogenetic tree from sequences.

As used herein, the term "lineage" refers to a theoretical line of descent. "Lineage" is used interchangeably with "group", and sometimes a group of antibodies related by lineage is referred to as a "lineage group". The term "group" or "lineage" is exclusive, in that a sequence can belong to only one group or lineage.

As used herein, the term "subgrouping" refers to a further grouping of sequences in a lineage based on unique features or signatures. "Subgroup" is not exclusive, which means one sequence can be in different subgroups. For example, one sequence can have two, three, four, five, or six unique features at the same time. "Subgrouping" is only for VHH. Applying VHH sequence signatures can help to select/narrow-down testing lineages (representative sequences) in a better manner, which may have better biological function/bioactivity outcomes.

As used herein, the term "lineage analysis" refers to the analysis of the theoretical line of descent of an antibody, which is usually done by analyzing a lineage tree.

As used herein, the term "sequence read" refers to a sequence of nucleotides determined by a sequencer, which determination is made, for example, by means of base calling software associated with the technique.

As used herein, the term "obtaining the amino acid sequences" refers to obtaining a file containing amino acid sequences. As is well known, a nucleic acid sequence can be translated into an amino acid sequence in silico.

As used herein, the term "most abundantly expressed", with reference to a protein sequence, that is most abundant in a sample. The abundance of a protein can be determined by, e.g., counting sequence reads encoding that protein. The protein encoded by the most sequence reads is the most abundant protein.

The term "anchor" and "anchor binder" as used herein interchangeably, is referred to conventional antibody generated with single B-cells sorting or heterohybridoma having native H and L pairing, with that, ones can "position/pair" heavy chain lineage and light chain lineage which consist of a group of sequences derived from clonal expansion of naïve B-cell H and L sequences after encountering the epitope of antigen. Lineages can be "anchored" considering the amino acid sequences of heavy and light chains that are known to pair with one another. In these embodiments, the branches are rotated around their nodes until there is a minimal number of cross-overs (e.g., no crossovers) between the anchored sequences. After the trees have been "aligned" by tanglegram analysis, the leaves that are known to pair can be connected by an edge. If the leaves that are known to pair are connected by an edge, the intervening leaves, in theory, can pair with one another as long as they do not create a cross-over event with an edge or one another.

The phrases "a monoclonal antibody recognizing an epitope on the antigen", "an antibody recognizing an antigen" and "an antibody specific for an antigen" are used interchangeably herein with the term "an antibody which binds specifically to an antigen."

The term "specific binding" refers to the ability of an antibody to preferentially bind to a particular antigen that is present in a homogeneous mixture of different molecules. In certain embodiments, a specific binding interaction will discriminate between desirable and undesirable molecules in a sample, in some embodiments more than about 10 to 100 fold or more than e.g., about 1000- or 10,000 fold.

The term "does not substantially bind" to a protein or cells, as used herein, can mean that it cannot bind or does not bind with a high affinity to the protein or cells, i.e., binds to the protein or cells with an $K_D$ of $2 \times 10^{-6}$ M or more, more preferably $1 \times 10^{-5}$ M or more, more preferably $1 \times 10^{-4}$ M or more, more preferably $1 \times 10^{-3}$ M or more, even more preferably $1 \times 10^{-2}$ M or more.

The term "high affinity" for an IgG antibody can refer to an antibody having a $K_D$ of $1 \times 10^{-6}$ M or less, preferably $1 \times 10^{-7}$ M or less, more preferably $1 \times 10^{-8}$ M or less, even more preferably $1 \times 10^{-9}$ M or less, even more preferably $1 \times 10^{-10}$ M or less for a target antigen. However, "high affinity" binding can vary for other antibody isotypes.

The term "pharmaceutical formulation" refers to a preparation which is in such form as to permit the biological activity of an active ingredient contained therein to be effective, and which contains no additional components which are unacceptably toxic to a subject to which the formulation would be administered.

A "therapeutically effective amount" of an agent, e.g., a pharmaceutical formulation or cells, refers to an amount effective, at dosages and for periods of time necessary, to achieve a desired therapeutic result, such as for treatment of a disease, condition, or disorder, and/or pharmacokinetic or pharmaco-dynamic effect of the treatment. The therapeutically effective amount may vary according to factors such as the disease state, age, sex, and weight of the subject, and the populations of cells administered. In some embodiments, the provided methods involve administering the cells and/or compositions at effective amounts, e.g., therapeutically effective amounts.

A "CDR grafted antibody" is an antibody comprising one or more CDRs derived from an antibody of a particular species or isotype and the framework of another antibody of the same or different species or isotype.

A "humanized antibody" has a sequence that differs from the sequence of an antibody derived from a non-human species by one or more amino acid substitutions, deletions, and/or additions, such that the humanized antibody is less likely to induce an immune response, and/or induces a less severe immune response, as compared to the non-human species antibody, when it is administered to a human subject. In one embodiment, certain amino acids in the framework and constant regions of the heavy and/or light chains of the non-human species antibody are mutated to produce the humanized antibody. In another embodiment, the constant region(s) from a human antibody are fused to the variable region(s) of a non-human species. In another embodiment, a humanized antibody is a CDR grafted antibody comprising one or more CDRs derived from an antibody of a particular species or isotype and the framework of human antibodies.

In another embodiment, one or more amino acid residues in one or more CDR sequences of a non-human antibody are changed to reduce the likely immunogenicity of the non-human antibody when it is administered to a human subject, wherein the changed amino acid residues either are not critical for immunospecific binding of the antibody to its antigen, or the changes to the amino acid sequence that are made are conservative changes, such that the binding of the humanized antibody to the antigen is not significantly worse than the binding of the non-human antibody to the antigen. Examples of how to make humanized antibodies may be found in U.S. Pat. Nos. 6,054,297, 5,886,152 and 5,877,293.

The term "chimeric antibody" refers to an antibody that contains one or more regions from one antibody and one or more regions from one or more other antibodies. In one embodiment, one or more of the CDRs are derived from a human antibody. In another embodiment, all of the CDRs are derived from a human antibody. In another embodiment, the CDRs from more than one human antibodies are mixed and matched in a chimeric antibody. For instance, a chimeric antibody may comprise a CDR1 from the light chain of a first human antibody, a CDR2 and a CDR3 from the light chain of a second human antibody, and the CDRs from the heavy chain from a third antibody. Other combinations are possible.

The term "biparatopic antibody" refers to an antibody binds to two non-overlapping epitopes of an antigen. In some embodiments, the biparatopic antibody comprises heavy chain only VHHs without light chain. In some embodiments, the biparatopic antibody comprises both heavy chain only VHHs and conventional $VH^1/VL^1$ pairs. In some embodiments, the biparatopic antibody comprises two conventional $VH^1/VL^1$ pairs. In some embodiments, the biparatopic antibody has a first heavy chain and a first light chain from a monoclonal antibody targeting one epitope, and an additional antibody heavy chain and light chain targeting another epitope. In some embodiments, the additional light chain or heavy chain can be different from the first light or heavy chains.

The binding of an antibody of the disclosed invention to an antigen can be assessed using one or more techniques well established in the art. For example, in a preferred embodiment, an antibody can be tested by ELISA assays, for example using a recombinant antigen protein. Still other suitable binding assays include but are not limited to a flow cytometry assay in which the antibody is reacted with a cell line that expresses the human antigen, such as HEK293 cells. Additionally or alternatively, the binding of the antibody, including the binding kinetics (e.g., $K_D$ value) can be tested in BIAcore binding assays, Octet Red96 (Pall) and the like.

The term "single B-cell sorting" refers to the sorting of isolated and separated single B cells based on antigen specificity. Technologies for single-cell separation, isolation, and sorting include but are not limited to: FACS (fluorescent activated cell sorting, e.g. using a fluorescent-tagged antigen to isolate cells that bind the antigen), ISAAC (immunospot array assays on a chip), LCM (laser-capture microdissection), microengraving, and droplet microfluidics.

A method for generating a camelid heavy chain only antibody or binding portion thereof for recognizing an antigen, particularly for therapeutic applications, the method comprises: a) Enriching and amplifying antigen-specific B-cells from immunized Camelidae; b) generating antibody NGS libraries comprising $VHH^2$, $VHH^3$, and $VH^1$ and $VL^1$ chain sequences from the antigen-specific B-cells; c) Grouping $VHH^2$, $VHH^3$, and $VH^1$ sequence data as phylogenetic lineage clonotypes based on CDR3—for example by grouping together CDR3 amino acid sequences that differ by 0 or 1 amino acids and have the same length; d) ranking lineages comprising the VHH heavy chain ($VHH^2$, $VHH^3$) by lineage priority factors; e) Selecting a representative sequence from lineages of $VHH^2$, $VHH^3$ with top rankings in antibody sequence library according to the lineage priority factors; f) Testing an antibody comprising the selected representative sequence to determine if the antibody binds to the antigen or portion thereof. In one embodiment, the antigen comprises a plurality of epitopes.

In one embodiment, sequences from a plurality of lineages can be selected and tested by repeating step f) and g). In one embodiment, f) can include 1) synthesizing DNA of the selected representative sequences, 2) constructing a vector comprising the DNA sequence, 3) expressing the vector in cells, 4) conducting an affinity and bioactivity test against the specific antigen. In one embodiment, b) can include 1) Making cDNA from the enriched population of antigen-specific B cells; 2) Sequencing the cDNA to obtain a plurality of $VHH^2$, $VHH^3$, $VH^1$ heavy chain sequences and a plurality of $VL^1$ (Vκ and Vλ) light chain sequences to generate a camelid IgG2 (HcAb), IgG3 (HcAb) and IgG1 (conventional Ab) library. In one embodiment, the generated camelid antibody comprises an IgG2. In one embodiment, the generated camelid antibody comprises an IgG3.

Another aspect of the invention lies in a method for generating a camelid antibody or binding portion thereof for recognizing an antigen, particularly for therapeutic applications, the method comprises: a) Enriching and amplifying antigen-specific B-cells from immunized Camelidae; b) generating antibody NGS libraries comprising $VHH^2$, $VHH^3$, $VH^1$ and $VL^1$ chain sequences from said antigen-specific B-cells; c) grouping $VHH^2$, $VHH^3$, $VH^1$, and $VL^1$ sequence data as phylogenetic lineage clonotypes based on CDR3; d) IgG1 $VH^1/VL^1$ lineage pairing according to an anchor binder generated by single B-cell sorting and heterohybridoma approaches; e) ranking lineages and lineage pairs from step c) and step d) by lineage priority factors; f) selecting a representative sequence from lineages of $VHH^2$, $VHH^3$ and lineage pairs of $VH^1/VL^1$ with the top ranking in the NGS library; g) testing an antibody comprising the selected $VH^1/VL^1$ pair sequences or sequence of $VHH^2$, $VHH^3$ to determine if the antibody binds to the antigen or portion thereof. In one embodiment, the $VL^1$ chain comprises Vκ and Vλ. In one embodiment, the antigen comprises a plurality of epitopes.

In one embodiment, sequences from a plurality of lineages can be selected and tested by repeating step f) and g). In one embodiment, g) can include 1) synthesizing DNA encoding the selected representative amino acid sequences, 2) constructing a vector comprising the DNA sequence, 3) expressing the vector in cells, 4) conducting an affinity and bioactivity test against the specific antigen. In one embodiment, b) can include 1) Making cDNA from the enriched population of antigen-specific B cells; 2) sequencing the cDNA to obtain a plurality of $VHH^2$, $VHH^3$, $VH^1$ heavy chain sequences and a plurality of $VL^1$ (Vκ and Vλ) light chain sequences to generate a camelid IgG2 (HcAb), IgG3 (HcAb) and IgG1 (conventional Ab) library. In one embodiment, the generated camelid antibody comprises an IgG2. In one embodiment, the generated camelid antibody comprises an IgG3. In one embodiment, the generated camelid antibody comprises a conventional IgG1. In one embodiment, the ranking of lineage pairs in step e) is based on lineage priority factors of $VH^1$ lineages of said lineage pairs. In one embodiment, the ranking of lineage pairs in step e) is based on lineage priority factors of $VL^1$ lineages of said lineage pairs. The method can further comprise testing to determine if antibody binding to the antigen inhibits binding of the antigen to another protein, e.g. whether antibody binding inhibits a ligand from specifically binding to its cognate receptor.

A method for generating humanized camelid antibodies targeting an antigen comprises a) enriching and proliferating antigen-specific B-cells from immunized camelids, b) generating antibody NGS libraries comprising $VH^2$, $VHH^3$, and $VH^1$ chain sequences from antigen-specific B-cells, c) grouping sequences of $VHH^2$, $VHH^3$, and $VH^1$ in the NGS library by lineages, d) identifying a substitutable position in a parent VHH antibody or $VH^1$ sharing the same naïve B-cell origin by comparing its amino acid sequence to the amino acid sequences of a number of related antibodies that each bind to the same epitope as the parent antibody in the same lineage, e) substituting amino acids at one or more of the substitutable positions of the parental VHH antibody or $VH^1$ antibody by correspondingly positioned amino acids in the human antibody; f) testing an antibody comprising the substituted residues within the selected sequences to determine if the antibody binds to the antigen or portion thereof. In one embodiment, the antigen comprises a plurality of epitopes. In one embodiment, the substitutable position is in the CDRs regions. In one embodiment, the substitutable position is in the FRs regions.

A camelid conventional IgG1 antibody generated in this invention can be humanized by substituting amino acids at one or more of the substitutable positions of the parental IgG1 antibody by corresponding positioned amino acids in the human antibody.

Figure 1A:
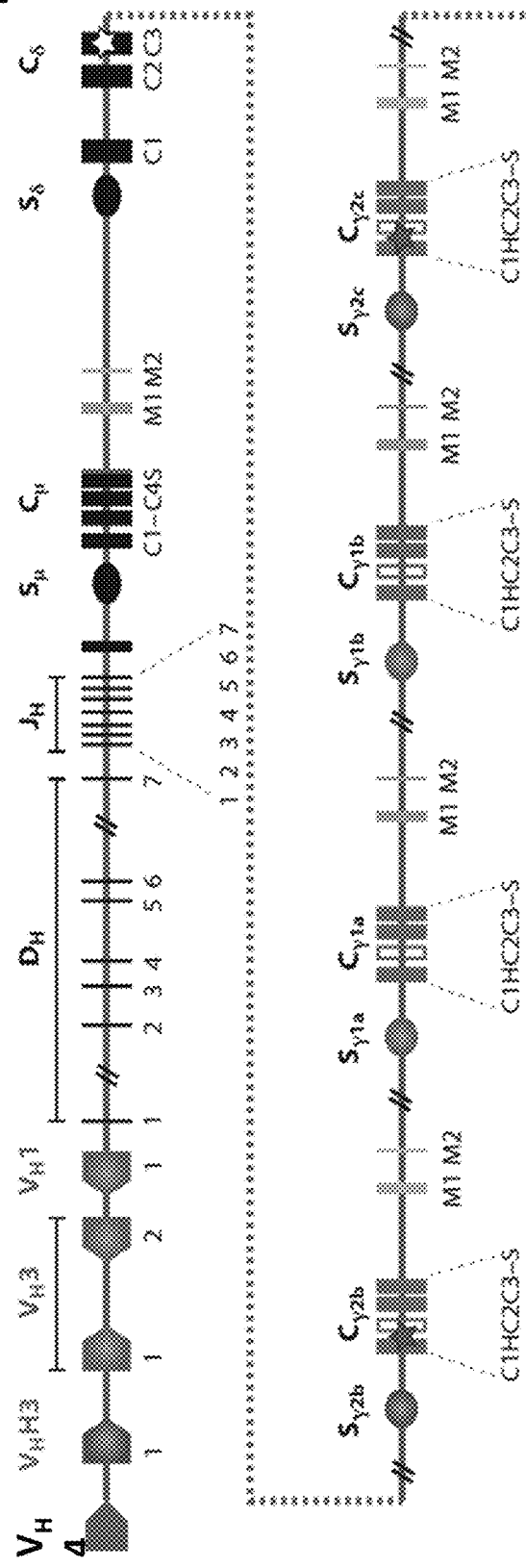
FIG. 1A shows the organization of camelids locus that encode VHH, VH and CH immunoglobulins.
Figure 1B:
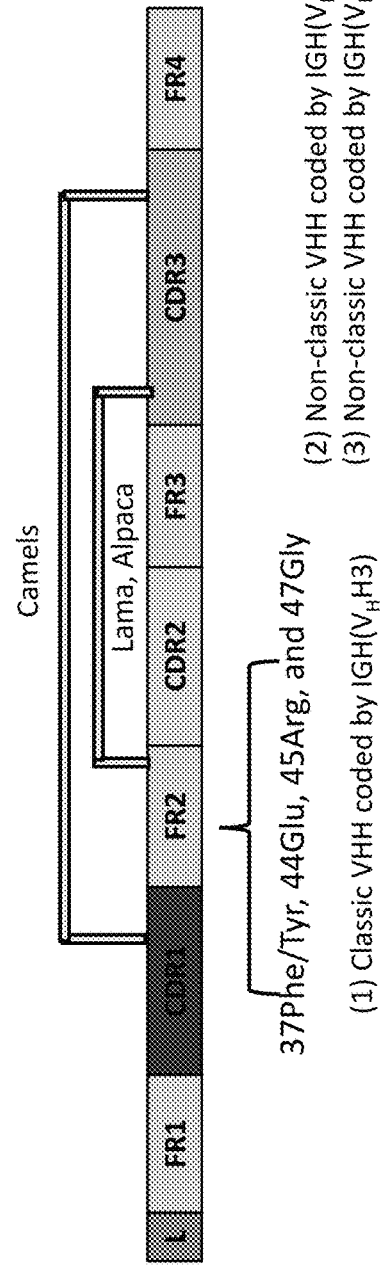
FIG. 1B shows camelids VHH structure.
Figure 2:
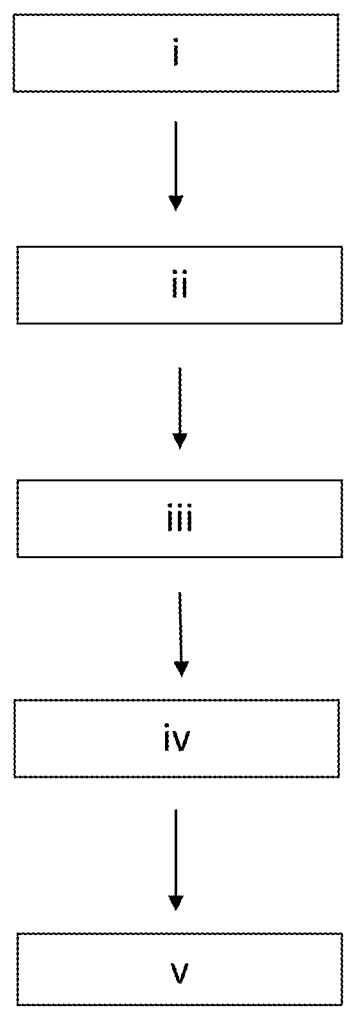
FIG. 2 shows Camelids immunization and antigen-specific B cells enrichment/proliferation. At (i), Camelidae (a camel or llama) is immunized with an immunogen, which can be a cDNA, small molecule, peptide, or protein, or a complex immunogen—normal or diseased cells or tissue. The VHHs generated are used to identify individual corresponding antigens by protein array or cells/tissue antigen cDNA library or immunoprecipitation-based mass spectrometry. At (ii) the antisera are evaluated by isolating IgG isotypes (IgG2, IgG3, IgG1/k, IgG1/l) and testing titer and bioactivity, respectively. At (iii), immune B cells are isolated from PBMC, spleen, bone marrow, lymph-notes and other lymphatic tissues. At (iv) Antigen-specific B cells, antigen-specific memory B-cells and plasmablasts are enriched with immunogen, desired domain or epitopes or complex immunogen by panning (enriching and/or depleting unwanted B-cells); magnetic bead purification or FACS sorting. At (v), antigen-specific B-cells are tested for activation and proliferation by camelid CD40-L cells, cytokines and/or immunogen.

An embodiment of the method for camelids immunization and antigen-specific B cells isolation/proliferation is schematically illustrated in FIG. 2; such embodiment comprises: 1) immunizing Camelidae with DNA or small molecule with carrier protein or peptide with carrier protein or protein or antigen complex such as cells or tissue; 2) monitoring the immune responses of IgG2, IgG3 and IgG1 separately; 3) obtaining a sample of cells which comprise B cells from PBMC, spleen, lymph nodes, lymphatic tissues. B cells are referred to memory cells, plasmablasts and different stages of B-cells which have cell membrane IgG2 (HcAb), IG3 (HcAb) and IgG1 (conventional IgG); 4) enriching antigen-specific B-cells with cell surface antibodies either through physical-surface antigen panning, or magnetic bead isolation or flow sorting; 5) activating the enriched B cells for cells proliferation in the presence of the antigen, camelid CD40-L expression cells and growth factors. The activation step allows one to selectively stimulate memory B-cells to differentiate and become plasma cells, which are rapidly dividing and expressing larger amounts of antibody. In some embodiments, immune responses of IgG2, IgG3 and IgG1 in antisera are monitored by a) purifying IgG2, IgG3 and IgG1 with Protein-A and Protein-G columns at different pH elution conditions; b) analyzing immune response titers of IgG2, 3 and IgG1; or c) testing bioactivities of IgG2, 3 and IgG1 with desired immunoassays.

The activating step of the method, which only proliferate B cells that have surface-tethered antibodies that are actually bound to the antigen, has three effects (1) the activating step causes only those B cells that are specifically bound to the antigen to proliferate, thereby increasing the relative concentration of those cells relative to the cells that are non-specifically bound to the support (2) activating step of the method causes the expression of HcAb or conventional IgG heavy and light chain mRNA to be induced only in the B cells that are specifically bound to the antigen (3) these "rare" antigen-specific B cells, but express antibodies with high affinity or specificity or recognizing "rare" epitopes have been amplified to improve signal-to-noise ratio significantly.

In some embodiments, antigens used for enrichment includes, but not limited to:
 a) an immunogen;
 b) a desired domain/epitopes of immunogen;
 c) a Complex Immunogen: an animal may be immunized with multiple antigens or cells or tissue, or biofluid, and antigen-specific B cells for each of a plurality of antigens may be enriched separately from one another or as a whole. The antigen-specific B cells can then be activated and collected separately from one another or as a whole. The simplicity of VHH offers an advantage for high throughput VHH cloning and expression, and it is relatively easier to identify each corresponding antigen of VHH by deconvoluting a complex immunogen. The complex immunogen can be deconvoluted by methods including but not limited to protein array or immunoprecipitation-based mass spectrometry method or cells, tissue antigen-cDNA library screening method.

It might also be desirable to deplete unwanted B cells through panning before antigen-specific panning to improve the purity of the B-cells sometimes.

$VHH^2$, $VHH^3$, $VH^1$, Vκ and Vλ NGS libraries can be prepared from B cells expressing IgG2 (HcAb), IgG3 (HcAb) and IgG1 (conventional Ab), respectively.

Figure 3:
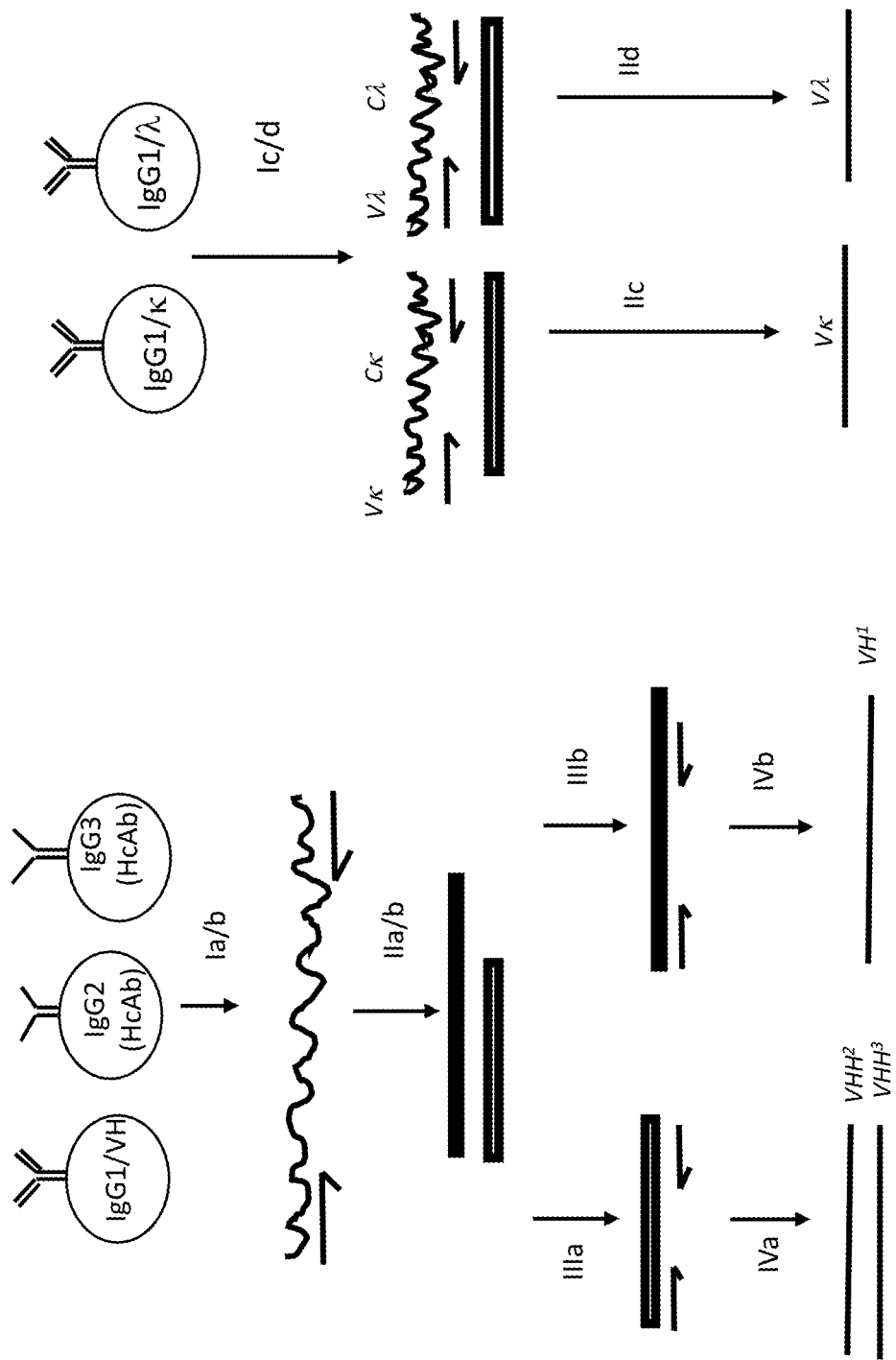
FIG. 3 shows IgG isotype specific primer sets to amplify VHH², VHH³, VH¹, Vκ and Vλ. At Ia/b, lead sequences (VH/VHH) CH2 sequences are identified. At IIa/b PCR is performed using primer sets for VH and VHH; at IIIa, a ~600 bp VHH fragment is purified; at IIIb ~900 bp VH fragment is purified; at IVa, nested primers for VHH2 are used to amplify VHH2 (short-hinge) sequences by PCR, and at IVb nested primers for VH1 and VHH3 (long-hinge) sequences by PCR. At IIc, primer sets for Vκ are used to amplify these sequences and at IId primer sets for Vλ are used to amplify these sequences by PCR.

Camelids' IgG1 (conventional Ab), IgG2 (HcAb) and IG3 (HcAb), each has a unique gene organization which allows ones to design specific primer sets to amplify their cDNAs separately (e.g. as in FIG. 3). cDNA amplification can be done by steps of:
 a) total RNA extraction (TRIOL) and purification (RNeasy kit);
 b) RNA quantification and optional storage at −20° C.;
 c) mRNA capture/RT-PCR ($VHH^2$, $VHH^3$, $VH^1$, Vκ and Vλ) with isotype-specific primer sets;

NGS libraries for $VHH^2$, $VHH^3$, $VH^1$, Vκ and Vλ can be prepared, for example, by Nextera Library through PCR adding NGS adapter and Library indexing.

cDNA in NGS libraries can be sequenced by High throughput sequencing of the library, for example using an Illumina MiSeq300x2 instrument.

Sequences can be structured by a bioinformatics process:—quality evaluation using NGSQCTookit, assembly R1/R2 reads, translation and then identifying CDR 1, 2, 3.

$VHH^2$, $VHH^3$, $VH^1$, Vκ and Vλ antibodies can be grouped using NGS data of, for example, CDR3 amino acid sequences, to construct phylogenetic lineage clonotypes.

Figure 4:
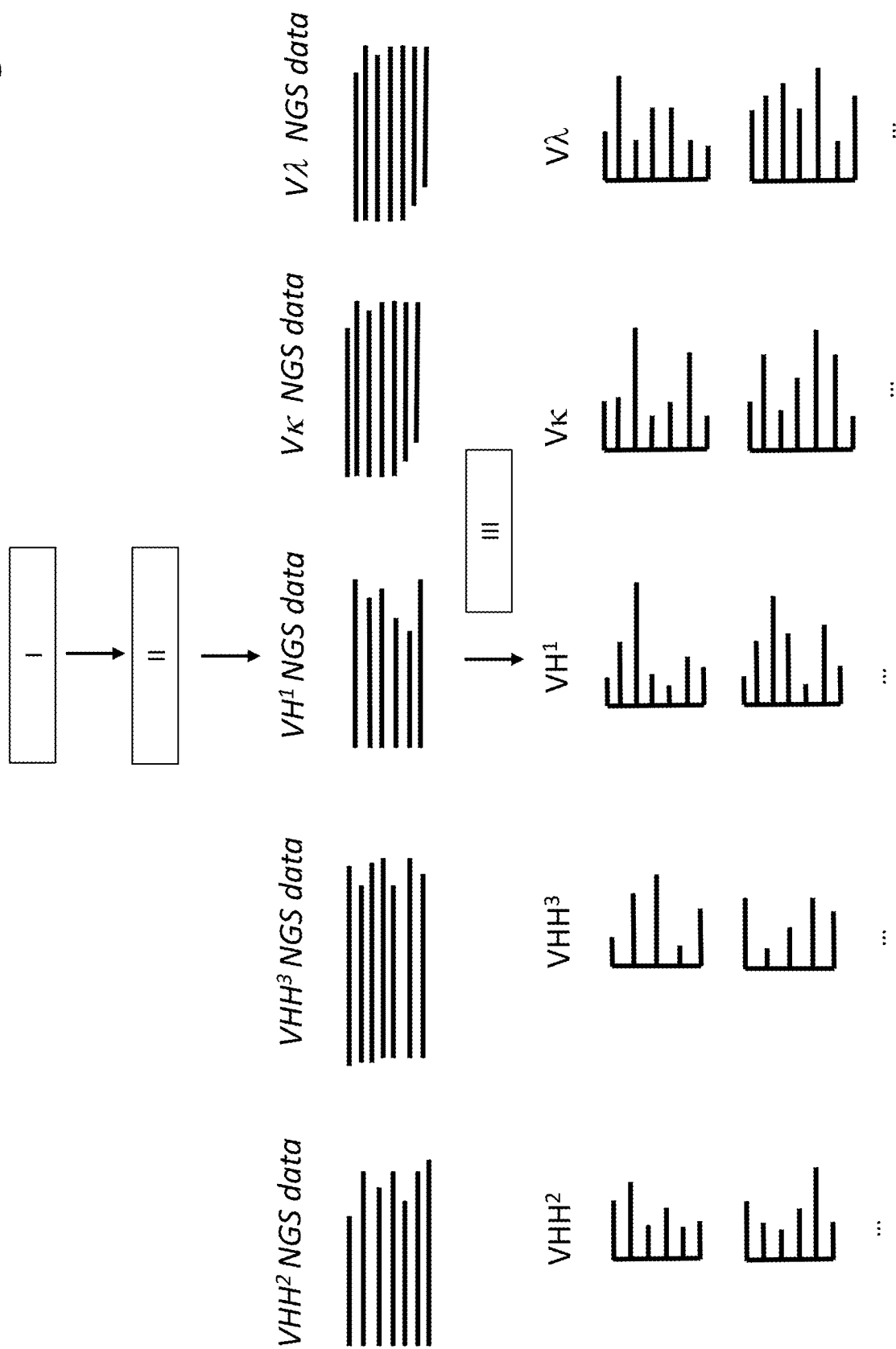
FIG. 4 shows generating VHH², VHH³, VH¹, Vκ and Vλ NGS libraries and grouping lineages. At I, data relating to VHH2, VHH3, VH1, Vκ and Vλ sequences are generated by adding NGS adapters and indexing; at II—nucleotide sequences are of the clones are determined by Illumina MiSeq 300x2 and data construction; at III—the sequences are grouped by lineage based on heavy chain CDR3 or light chain CDR3 sequences using bioinformatics.

A lineage is defined by a group of sequences which are from same naïve B cells (the same V and J assignment) and a lineage can be defined as a group with amino acid sequences in their CDR3 region differing by no more than 1 amino acid (hamming distance is 1 or less, or same CDR3 sequence if total amino acids within 5 aa). It is presumed that the amount of lineages reflects the amount of naïve B cells in a library, also the number of epitopes that these antibodies recognize. (FIG. 4).

In general, lineage size correlates with antibody maturation and clonal expansion. Bioinformatic methods allow structure and visualization of the data for a rational approach to candidate antibodies selection. For each NGS library, up to 10,000 of lineages are possible to be identified by sequences structuring through a bioinformatic process comprising: QC using NGSQCTookit, assembly R1/R2 reads, translation, identifying CDRs1, 2, 3 and then lineage grouping based on CDR3 similarity.

VHH (VHH², VHH³) sequences can be further grouped (subgrouped) by their unique sequence signatures.

Figure 5:
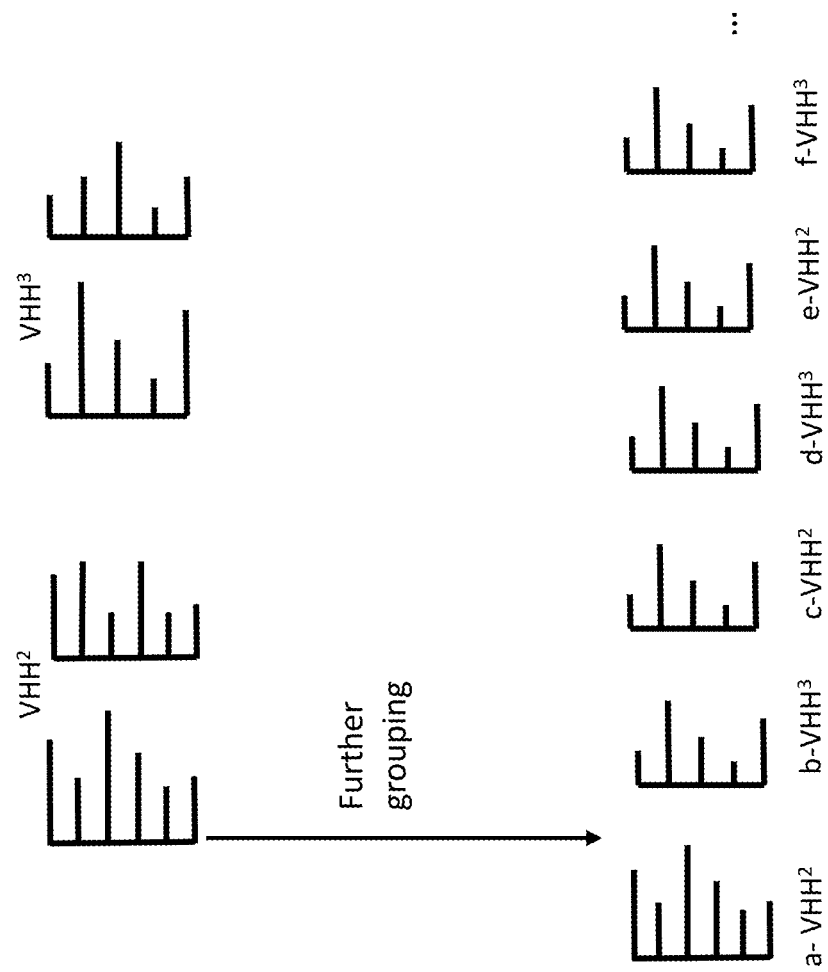
FIG. 5 shows further grouping VHH² and VHH³ lineages with sequence signatures. The further grouping is performed based on one or more of the criteria:
1) FR2 hydrophilic region (37Phe/Tyr, 44Glu, 45Arg, and 47Gly)
2) Extended CDR1
3) Disulfide bonds: CDR1-CDR3 or FR2-CDR3
4) Disulfide bonds: within CDR1 or within CDR3
5) CDR3>15 aa
6) Non-classic VHH: sequences sharing the same naïve B-cells origin with conventional VH
7) Non-classic VHH: conserved Trp118 substituted with Arg118
8) Non-classic VHH: lower hydrophobicity profile in FR3
9) Sequence-based novel Ag-binding loop conformation prediction
10) Convergent motif or sequence signature among individual animals
11) CDR2 length 12) CDR3 length
13) CDR3 length and identity
14) Presence of 3 or more positive charges in CDR3 region
15) The number of cysteines in the amino acid sequence
16) 2-4 amino acid motifs found in CDR regions. The motif is identified from 3-d structures of a ligand/receptor complex.

Camelids have evolved multiple mechanisms to further diversify VHH B-cell repertoire and enlarge antigen-binding capability. Sequence "signatures" arising from these mechanisms allow one to further group lineages. Such additional criteria for further grouping lineages can reflect subtle different recognitions of antibodies and help to identify epitopes with unique VHH recognition patterns. (FIG. 5) The signatures of VHH include but are not limited to:

i) FR2 hydrophilic region: for most VHH antibodies, FR2 has unique amino acids substitutions for conventional IgG: 37Phe/Tyr, 44Glu, 45Arg, and 47Gly;

ii) extended CDR1: many VHHs have the extra hypervariable region (residues 27-30, according to Kabat's numbering) next to CDR1. VHH uses this region together with long CDR3 to increase the surface area interacting with antigen;

iii) extra disulfide bond between CDR1-CDR3 or FR2-CDR3: in camel and dromedary, 82% VHH have disulfide bond between CDR1-CDR3, and in Lama and Alpaca, 74% VHHs have disulfide bond between FR2-CDR3;

iv) long CDR3: for these VHHs with long CDR3 ($\geq$15aa), extra disulfide bond is found in many cases;

v) extra disulfide bond within CDR3: around 5-10% VHH have an extra disulfide bond within CDR3, which may indicate more conformational recognition pattern;

vi) Extra disulfide bond within CDR1;

vii) non-classic VHH which have the same V and J germlines as conventional IgG: VHH lineage groups which share the same naïve B cells origin (same V and J assignment) with the conventional IgG1, which indicates the same or similar epitope recognition by both VHH and IgG1;

viii) non-classic VHH which have unique sequence signatures: for example, conserved Trp118 substituted with Arg118 and or lower hydrophobicity profile in FR3;

ix) novel canonical binding loop structure: the hypermutation hotspots residing at key-sites to determine the canonical loop structures create an interesting potential to diversify the VHH structural repertoire. Crystallographic studies accentuate that the CDR1 and CDR2 loops of camel VHHs often deviate from the known canonical structures of the conventional VH¹. Sequence-based novel Ag-binding loop conformation prediction also supports further grouping the lineage;

x) CDR2 length xi) CDR3 length xii) presence of 3 or more positive charges in CDR3 region xiii) the number of cysteines in the amino acid sequence xiv) 2-4 amino acid motifs found in CDR regions. The motif is identified from a 3-d structure of a ligand/receptor complex xv) CDR3 length and identity and xvi) convergent motif or sequence signature among camelids in the same immunization group.

Humanization of VHHs (VHH², VHH³), VH¹-Vκ and VH¹-Vλ can be guided by lineage analysis.

The invention provides a method for identifying positions of an antibody that can be modified without significantly reducing the binding activity of the antibody. In some embodiments, the method involves identifying a substitutable position in a parent antibody by comparing its amino acid sequence to the amino acid sequences of a number of related antibodies that each bind to the same antigen and epitope as the parent antibody in the same lineage.

In some embodiments, the amino acid at the substitutable position may be substituted for a different amino acid without significantly affecting the activity of the antibody. The subject methods may be employed to change the amino acid sequence of a CDR without significantly reducing the affinity of the antibody.

In humanization methods, or in other antibody engineering methods, the invention finds use in a variety of therapeutic and diagnostic applications.

Bispecific/biparatopic antibodies or antigen-binding fragments can be produced by a variety of methods including fusion of hybridomas or linking of Fab' fragments. See, e.g., Songsivilai & Lachmarm, Clin. Exp. Immunol. 79: 315-321 (1990), Kos-telny et al., J. Immunol. 148:1547-1553 (1992). In addition, bispecific antibodies can be formed as "diabodies" or "Janusins." A plurality of VHH variable domains can also be connected by linkers to form bivalent and multivalent antibodies.

Figure 6:
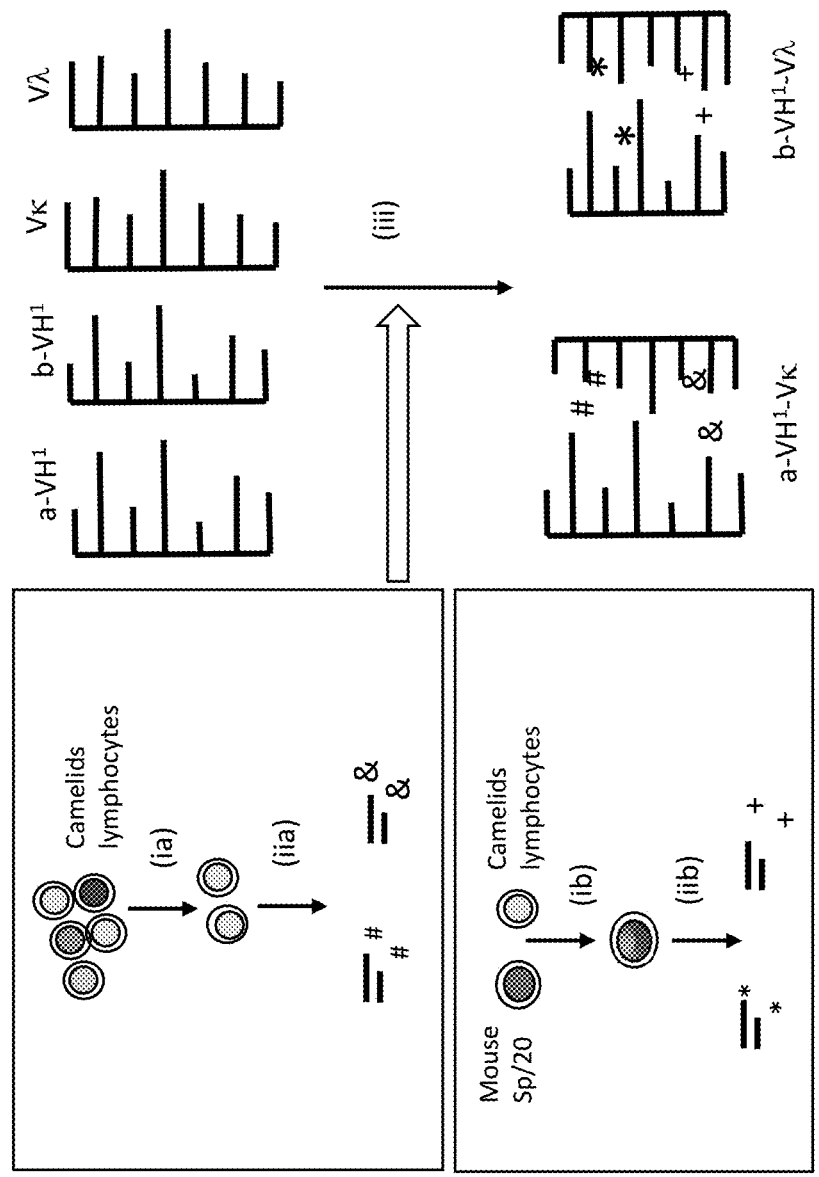
FIG. 6 shows pairing VH-Vκ or VH-Vλ lineages with anchors developed with single B-cells sorting and heterohybridoma. At (ia) antigen specific B-cells are sorted, at (iia) VH-Vκ or VH-Vλ pairs are identified by single-cell linkage PCR. At (ib), cells of mouse cell line Sp/20 and immune Camelid lymphocytes are fused to create heterohybridomas. At (iib) the heterohybridomas are screened to identify VH-Vκ and/or VH-Vλ pairs. At (iii), H and L (k or l) lineages are paired by anchors from B-cell sorting or heterohybridomas.

VH¹ and VL¹ (Vκ or Vλ) pairing lineages can be identified by considering VH¹-VL¹ "anchor" amino acid sequences found to pair with one another in antibodies secreted by heterohybridomas and/or flow-sorted single B-cells (illustrated in FIG. 6).

A challenge for camelid conventional IgG1 development with NGS technology is how to identify original, natural H and L pairs. Two approaches to establish anchor H and L (κ and λ) lineages are typically used: (1) heterohybridoma and (2) single B-cell sorting. After lineage pairs are further grouped with these anchors, representative sequence H/L pairs from each lineage pairs are selected for DNA synthesis, binding screening and bioactive tests as VHH antibodies.

I. Heterohybridoma Method

Isolate lymphocytes from PBMC or spleen or lymphnotes from immunized Camelids; fuse lymphocytes with mouse myeloma fusion partner cell lines such as SP/20 and generate heterohybridomas; screen supernatants of heterohybridomas with ELISA and bioactive assays; sequence VH¹ and VL¹ from the selected heterohybridomas; these pairs of VH and VL are used as anchors to pair VH¹ and VL¹ lineages from IgG1 NGS library.

II. Single-B-Cell NGS Method a) Harvest antigen-specific B-cells after panning and proliferation; b) Single B-cell sorting; c) VH¹-VL¹ Linkage PCR to amplify amplicons; d) NGS and identify VH¹-VL¹ pair sequences (VH¹-Vκ or VH¹-Vλ) as anchors through bioinformatics.

Figure 7:
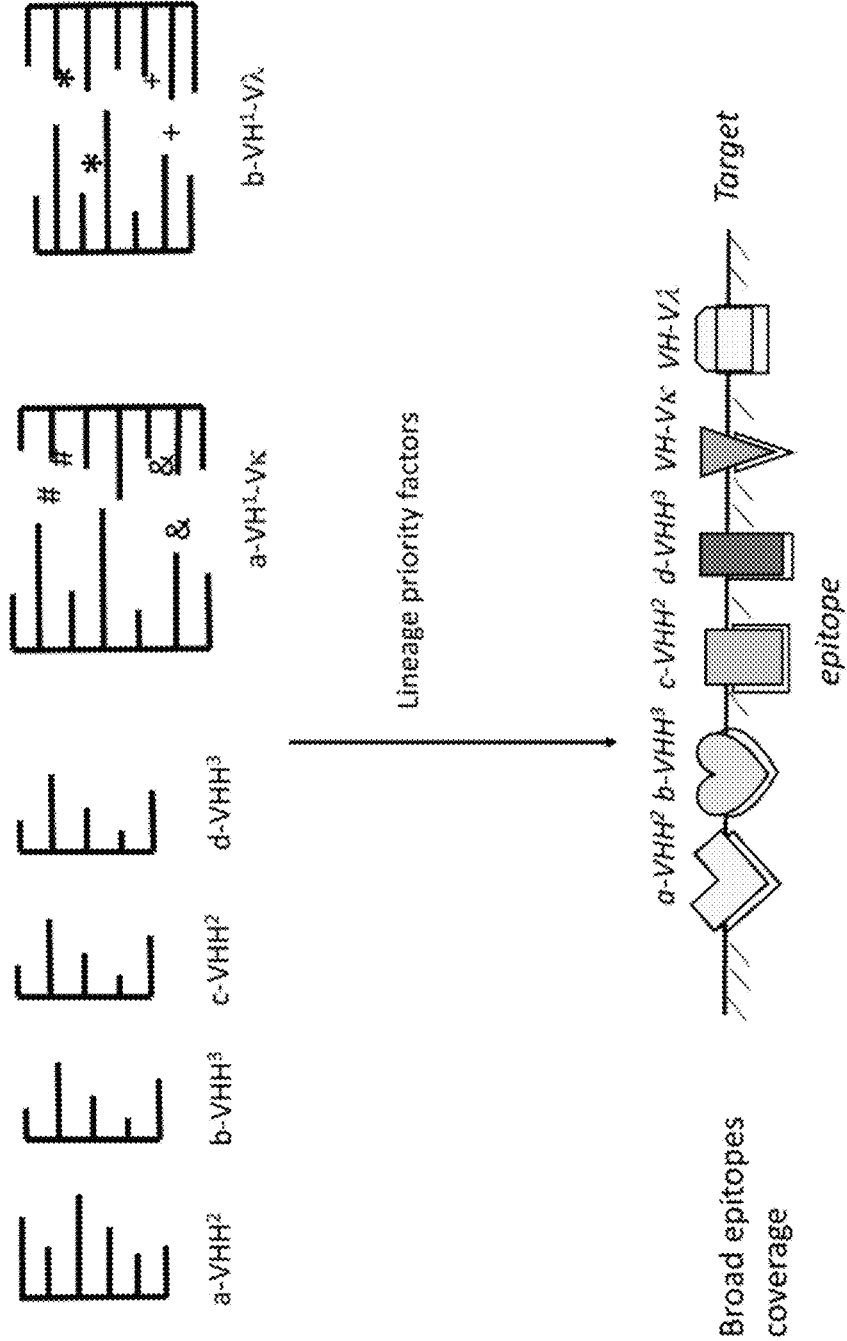
FIG. 7 shows sequences selection from each lineage for binder and bioactivity screening using lineage priority factors of:
1) High to low lineage sequences abundancy
2) High to low lineage sequence amplification factor
3) Dynamic change of lineage sequence before and after depleting unwanted B-cells
4) Dynamic change of lineage sequence abundancy during immunization course
5) Lineage sequences sharing the same naïve B-cell origin between VHH with conventional VH
6) Avoidance of developability liability sequences.

This method is able to capture the entire antigen-specific B-cell repertoire from an immunization, including HcAb and conventional IgG1 with NGS and takes advantage of the simplicity of HcAb:

a) IgG2/HcAb, IgG3/HcAb, IgG1/κ and IgG1/λ b) Lineages with different CDR3_different epitopes c) VHH lineages with sequence signatures_different epitopes d) VH-Vκ or VH-Vλ lineage pairing with VH-VL anchors generated from a heterohybridoma A lineage of antibodies recognizing a broad spectrum of epitopes of the antigen can be selected (illustrated in FIG. 7).

Each lineage or lineage pair is presumed to recognize one unique epitope, thus one representative sequence (VHH) or one representative pair (VH¹-VL¹) from top 100 lineages/lineage-pairs (e.g., 70 sequences for VHHs and 30 sequence pairs for VH-Vκ and VH¹-Vλ are selected for gene synthesis, binder screening and bioactive tests. The lineage selection criteria (priority factors) include but not limited to:
1) lineages from high to low sequences abundancy: the total number of unique cDNA counts (the sequence abundancy) from each lineage range from 2 to 50,000, and the lineage with most abundant sequences may indicate the most extensive clonal expansion after antigen stimulation;
2) lineage from high to low amplification factor, dynamic change of sequence abundancy before and after B cells enrichment/proliferation (the amplifying fold could range from 5 to 1,000);
3) lineages sequences abundancy change during immunization course, which indicates antigen-specific sequences enrichment and antibody affinity maturation (the sequence abundancy/unique cDNA counts change could range from 2 to 1,000);
4) lineages sequences abundancy change before and after depleting certain unwanted B cells if applicable (the sequence abundancy/unique cDNA counts change could range from 2 to 1,000);
5) lineages which share the same naïve B-cell origin (same V and J assignment) between VHH and VH¹.
6) avoidance of developability liability sequences: there are sequences which consist of some amino acids that can cause developability problems such as thermal stability (hydrophobic core, charge cluster residues and others), chemical stability (deamidation and isomerization), solubility (surface hydrophobicity and others) and heterogeneity (glycosylation) (Tomoyuki Igawa et al. mAbs, 2011). Selection of these lineages or lineage pairs should be avoided.

The selection criteria can also be a combination of the above priority factors.

The selected lineage sequences or pair is used for DNA synthesis and constructed into expression vectors such as VHH, scFv, Fab, HcAb, Camelidae IgG1 and human Fc chimeric.

In some cases, both selected VHH lineage and selected VH¹-VL¹ lineage pair could share the same naïve B-cell origin.

In another aspect, more pairs in the same top ranking lineage pairs in the first round of selection (e.g., 70 sequences for VHHs and 30 sequence pairs for VH¹-Vκ or VH¹-Vλ are selected for gene synthesis, binder screening and bioactive tests because representative sequence pairs from VH¹-Vκ or VH¹-Vλ need more combinational tests before the optimal pairs are identified.

More sequences and pairs in the next 100 top ranking lineages (e.g., 70 sequences for VHHs and 30 sequence pairs for VH-Vκ or VH-Vλ are selected for gene synthesis, binder screening and bioactive tests if the first 100 antibodies don't produce desired results.

The significance of this method is able to systematically and relationally select representative sequences from each lineage for testing to cover board epitopes with high-resolution. This improves antibody discovery in the following contexts:
a) therapeutic antibody discovery with a large pool of candidates for the best affinity, specificity and developability;
b) companion diagnostic antibody discovery in parallel and other applications;
c) bivalent and multivalent antibodies construction and development;
d) antibody heavy and light chain pairs discovery;
e) antibodies binding to the same epitopes can be identified by lineage-related sequences (illustrated in FIG. 8).

It is well recognized that the CDR3 sequence is the main determinant for binding to an epitope while CDR1 and CDR2 are more or less involved in determining other binding properties. After screening out the leads (e.g. marked by @ and + in FIG. 8) from each lineage, one can identify more candidates with different characteristics such as affinity, specificity, functionality, productivity and developability to test and select the most desired antibodies since antibodies from the same lineage are supposed to recognize the same or similar epitope. This step also helps to build-up a big candidate pool for further antibody drug development.

There may be around 10-20% VHH and VH¹ sharing the same naïve B-cells origins. The selected sequences of VHH from the first-round selection can help to identify VH¹s with the same V(D)J arrangement as VHH, and further test their VH-VL pairs for more selections. Selection criteria include:
1) CDR1 and/or CDR2 differences>2aa (amino acid)
2) FR1 and/or 2 and/or 3 and/or 4 differences>2aa;
3) sequences sharing the same naïve B-cell origin between VHH with conventional VH;
4) VH sequences which can pair with both Vλ and Vκ;

The selected sequences or pairs are used for DNA synthesis; and constructed into expression vectors such as VHH, scFv, Fab, HcAb, Camelidae IgG1 and human Fc chimeric.

More sequences and pairs can be selected until the best antibody is identified, and the remaining clones kept as a pool of further candidates.

Humanization of VHHs (VHH² and VHH³), VH¹-Vκ and VH-Vλ through lineage analysis.

Non-classic VHH genes sharing the same naïve cells with conventional VH, which is helpful to (1) subgroup VHH lineages (2) select HcAb and conventional IgG recognizing the same or similar epitopes (3) facilitate humanization for both HcAb and conventional IgG.

VHH domains typically display a high sequence identity with human type 3 VH domains (VH3), likely accounting for their low immunogenicity (Cortez-Retamozo V, Int J Cancer. 98(3):456-62, 2002). In addition, camelids VH¹, Vλ and Vκ domains of conventional antibodies also reveal significant homologous to their human counterparts in both sequence and structure (Alex Klarenbeek, et al., mAbs 7:4, 693-706; 2015). FIG. 9. As we know, sequences within the same lineage group share the same or similar CDR3 sequence and recognize the same epitope. Through the functional screening, we can identify these amino acids within the variable region including CDRs and FRs, which are substitutable since they constitute the same biological function even these amino acids are different within the lineage. Thus, we can replace these tolerant positions with human germline antibody amino acids and replaceable amino acids can even be within CDR regions for better humanization.

In addition, as mentioned before, these non-classical VHH (without FR2 hydrophilic amino acids) are derived from the same locus of IGHV3 or IGHV4, D and J genes as conventional VH¹, the lineages structures between VHH and VH¹ sequences in these groups are similar and can further support humanization design each other through lineage analysis.

Pharmaceutical Formulations

In another aspect, the present invention provides a composition, e.g., a pharmaceutical composition, containing one or a combination of monoclonal antibodies, or antigen-binding portion(s) thereof, of the present invention, formulated together with a pharmaceutically acceptable carrier.

Such compositions may include one or a combination of (e.g., two or more different) antibodies, or immunoconjugates or bispecific molecules of the invention. For example, a pharmaceutical composition of the invention can comprise a combination of antibodies (or immunoconjugates or bispecific antibodies) that bind to different epitopes on the target antigen or that have complementary activities.

EXAMPLES

Example 1: Identification of a Group of VHH Antibodies Specifically Binding to an Antigen Using the B Cell Isolation and Amplification (BIA)/NGS Sequence Analysis and Single B-Cell Methods 1A. BIA/NGS
Material and Methods
BIA
A1. Construction of CD40L Expression EL4.TL-2-C Cell line TIB-181(EL4.IL-2) was obtained from the American Type Culture Collection and stably transfected with a pCMV-6-based vector comprising a cDNA encoding human CD40L and that confers expression of human CD40L. A stable cell line was selected and treated with mitomycin as feeder cells.

A2. Alpaca Conditioned Medium

An unimmunized alpaca is sacrificed and the splenocytes are isolated for alpaca conditioned medium preparation. Activation medium containing 10% FBS, phytohemagglutinin (PHA) and phorbol myristate acetate (PMA) is prepared. $4 \times 10^8$ splenocytes are suspended in T175 flask in activation medium and incubated at 37° C. 5% $CO_2$ for 48 h. After incubation, the supernatant is collected and filtered as alpaca conditioned medium.

A3. Animal Immunization

Antigen (for example, 400 g Keyhole Limpet Cyanin ("KLH") in 0.5 mL PBS is emulsified with 0.5 mL complete Freund's adjuvant. The emulsified antigen is subcutaneously injected along the neck and the back of an alpaca. Five injections of ~200 μL (or less) are performed. Immunizations are performed 3 times in 14 day intervals A4. Lymphocytes Isolation from Different Organs For isolation of PBMCs from blood, EDTA-containing blood samples from an immunized alpaca are diluted two-fold with 1×DPBS containing 2% FBS. Then the diluted blood is slowly put on a Ficoll-Paque PLUS density gradient media for density centrifugation. The upper layer is drawn off and the lymphocyte layer is transferred to a clean centrifuge tube. The PBMCs are then washed twice with 1×DPBS.

For lymphocytes isolation from the spleen, the spleen from an immunized alpaca is washed with 1×DPBS and put in a clean dish. Balloon the spleen by injecting the medium until most lymphocytes are released. Then use the bottom of a 20 cc syringe to crush the spleen into pieces. Use of a lot of force when crushing helps get the best possible yield of lymphocytes. All of the released cells are collected by gentle centrifugation, e.g. at 1400 rpm. The supernatant is aspirated and then 5× the volume of the pellet of Red Cell Lysis Buffer is added and the sample is left to stand for at least 4 min. Then RPMI 1640 medium is added to terminate the lysis. The lymphocytes are then washed twice with 1×DPBS.

For lymphocytes isolation from the lymph nodes, mesenteric lymph nodes and inguinal lymph nodes are collected from an immunized alpaca. Lymphocytes are released by grinding the Lymph nodes in RPMI 1640 medium. The cells are passed through a cell mesh and collected by centrifugation. 5× the volume of the pellet of Red Cell Lysis Buffer is added to the sample and the sample is allowed to stand for at least 4 min to remove RBC. Then RPMI 1640 is added to terminate the red cell lysis. The lymphocytes are then washed twice with 1×DPBS.

For lymphocytes isolation from the bone marrow, the tibia and radius of an immunized alpaca are opened at both ends of the bone and the bone marrow is taken. Cells are released by grinding the bone marrow in RPMI 1640 medium. The cells are passed through a cell mesh and collected by centrifugation. 5× the volume of the pellet of Red Cell Lysis Buffer is added and the sample is allowed to stand for at least 4 min to remove RBC. Then RPMI 1640 medium is added to terminate the lysis and the lymphocytes are washed twice with 1×DPBS.

A5. Depletion of Nonspecific Cells

The collected cells are resuspended in RPMI1640 medium with 10% FBS, 1% Penicillin-Streptomycin and 0.05 μM 2-Mercaptoethanol to get a 1 M/mL cell suspension. The cells are preincubated for 1 h at 37° C., in a 6 well culture plate for non-specific adhesion of macrophage and monocytes to the plate surface. After pre-incubation, unbound cells are collected and counted.

A6. B Cell Panning

The collected cells are resuspended in RPMI1640 medium with 10% FBS, 1% Penicillin-Streptomycin to get a 1 million/mL cell suspension. The cells are incubated for 1.5 h at 37° C., at 5 million per 10 cm dish pre-coated with antigen for specific B cell panning. After incubation, the plated cells are washed with RPMI1640 medium for 2-10 times until only a few cell are found in suspension. All of the unbound cells are collected and counted, the count being designated as A1.

A7. B Cell Culture In Vitro 20 mL B cell medium are added into the dish containing B cells retained by the panning. The B cell medium should contain 10% FBS, 1% Penicillin-Streptomycin, 10% alpaca conditioned medium, various growth factors, for example one or more interleukins, at a concentration of 1 to 50 ng/ml and 2.5M MMC pre-treated feeder cells (EL4.IL-2-C3, expressing alpaca CD40L). B cell only and feeder cell only dishes are also cultured as a control in quality control testing. Cells are cultured in 5% $CO_2$ for 8-10 days.

A8. Cell Collection and QC

On day 10, 50 μL supernatant from the B cell cultures are used for ELISA to test the antibody secretion. All cells in co-cultured dishes are collected and counted, this count being deemed A2. Cells in feeder cell only dishes are collected and counted, this count being deemed A3. The B cell amplification fold (BCAF), is calculated by the following formula:

$$BCAF=(A2-A3)/(5M-A1)$$

A9. NGS Library Construction

The B cells from each panning were used to prepare template RNA for NGS cDNA library construction. To calculate sequence enrichment, libraries using B cells before panning were also constructed.

i. RNA Isolation

Extract the RNA from co-cultured B cell using TRIzol method.

Cultured B cells are lysed with TRIZOL Reagent by repetitive pipetting or by passing through a syringe and needle. Use 1 ml of the reagent per 0.5-1×10⁶ cells. 20% chloroform is added and the tube is agitated for about 15 sec. The aqueous phase is carefully removed using a pipette. An equal volume of isopropanol is added to the aqueous phase and mixed gently. The sample is centrifuged at maximal speed (12,000 rpm) for 10 min. The isopropanol is removed and the pellet is washed with 1 ml 75% ethanol in DEPC treated water and gentle mixing. The pellet is recentrifuged at 7,000 rpm for 1 min. and the RNA is recovered in approximately 70 μl of RNase-free water.

ii. Reverse Transcription

In 0.2 mL PCR mix, different primers (Random 6 mers, Oligo dT and A1.CH2+A1.CH2.2) are respectively used to amplify 8 reactions. The RNA-primer mix is heated at 65° C. for 5 minutes, and then incubated on ice for at least 1 minute. RT reaction mix is prepared and the reverse transcription is conducted at: 30° C. for 10 min; 42° C. for 50 min; 75° C. for 15 min.

iii. cDNA Amplification PCR

Approximately 2 μl cDNA from the reverse transcription is used as template in 50 μl PCR reactions containing 25 μl 2× Primer star mix, 18 μl RNase Free dH2O, 1 μl each of primers NGS-leader1_L (GCAGTGGCTGCAGGTGTC-CACTCG—SEQ ID NO. 63), NGS-leader2_L (GCAGGTCCCCAAGGTGTCCTGTCC—SEQ ID NO. 64), NGS-leader3_L (GGTGGTCCTGGCTGCTCT—SEQ ID NO. 65), NGS-hinge1_L (TTGTGGTTTTGGTGTCTTGGG—SEQ ID NO. 66) and NGS-hinge2_L (GGGGTCTTCGCTGTGGTGCGC—SEQ ID NO. 67) and cycled as follows: 98° C. for 3 min; 20 cycles of (98° C. for 15 s, 58° C. for 30 s and 72° C. for 30 s); 72° C. for 3 min. The resulting amplicons are purified using TIANGEN® PCR purification kits with a ≥300 bp size cutoff according to the manufacturer's instructions.

iv. Index PCR

Each amplicon sample is individually barcoded in a second 'tagging' 50 μl PCR reaction containing 25 μl 2× Primer star mix, 18 μl RNase Free dH2O, 1 μl of each primer pair (e.g. P5-seqF and P7-index1-seqR), and 100 ng first-round PCR as template, then cycled as follows: 98° C. for 30 s; 12 cycles of (98° C. for 10 s, 65° C. for 30 s and 72° C. for 30 s); 72° C. for 5 min. The final three amplicons (derived from three different reverse primers) are pooled and purified from 1.5% (w/v) agarose gels using a TIANGEN® PCR purification kits.

A10. NGS Data Analysis

Amplified cDNAs are sequenced using a MiSeq Sequencing System (Illumina, Miseq, 300x2). From each sample, 1-3 million reads are generated. Data are quality checked using the NGS QC toolkit and assembled using FLASH. Assembled sequences are translated to protein sequences and CDR1, CDR2, and CDR3 regions (based on IMGT numbering) are identified computationally. Sequences are clustered into lineages/groups as shown in FIG. 4. based on the same CDR3 length, CDR3 hamming distance smaller or equal to 1 and same mapped V/J germlines. Sequences are further sub-grouped into clusters based on same CDR3 length and CDR3 identity with 80% or more. For example, a lineage can be defined by clones having a CDR3 length of at least 12 amino acids, a CDR3 hamming distance (in comparison to a reference sequence) of 0 or 1, and having identical V/J region amino acid sequences. Enrichment scores for sequences or sequence groups are calculated using ratio of frequencies between libraries constructed from B cells before and after panning.

Representative clones (20 or more) are selected from different lineages based on lineage priority factors as shown in FIG. 7, and the antibodies they produce are tested in various binding assays like ELISA, FACS etc. Clones selected from different lineages are found to typically bind to different epitopes of the target protein. To optimize existing clones, additional clones can be selected from the same lineage as shown in FIG. 8. Clones selected from within a lineage are typically shown to bind to different parts of the same epitope Selection A: Pick Clones with the Highest Count in a Cluster As shown in the Table 1 below, Cluster C328 has 357 fold increase in frequency after enrichment. The top count clone in the cluster, NBL505-A1L1-P3R3_355, is a good choice to select for further tests.

TABLE 1

| C328 Name | NBL505 Project | NBL505-A1L1-P3R3 Lineage | 1 Count | 4 Frequency | 0.10411 Mismatches | 1433 Gaps | 1.42367 Classical | 9.3 AREWYPVGNEPDY | | Screened clones | 1430 Cysteines | Cdr3 length |
|---|---|---|---|---|---|---|---|---|---|---|---|---|
| | | | | | | | | V gene | J gene | | | |
| NBL505-A1L1-P3R3_355 | NBL505 | L58 | 1426 | 1.41672 | 10 | 0 | No | IGHV3S30*01 | IGHJ4*01 | | 2 | 13 |
| NBL505-A1L1-P3R3_22351 | NBL505 | L58 | 3 | 0.00298 | 9 | 0 | No | IGHV3S30*01 | IGHJ4*01 | | 2 | 13 |
| NBL505-A1L1-P3R3_54461 | NBL505 | L58 | 2 | 0.00199 | 9 | 0 | No | IGHV3S30*01 | IGHJ4*01 | | 2 | 13 |
| NBL505-A1L1-P3R3_14372 | NBL505 | L58 | 2 | 0.00199 | 9 | 0 | No | IGHV3S30*01 | IGHJ4*01 | | 2 | 13 |

Selection B: Pick Clones with Highest Enrichment Score.

By comparing sequences in libraries before and after enrichment (e.g. by panning or flow-sorting), an enrichment score can be calculated based on sequence frequency before and after enrichment. To increase the chance of picking clones secreting functional VHHs, the enrichment score can be used to prioritize clone picking. In Table 2 below, clone NBL505-A1L2-P3R2_5559 is selected based on the Fold Enrichment.

TABLE 2

Sequence Enrichment In C473(NBL505-A1L2-P3R2)

| Name | Count | Frequency | Screened Clones | Picked? | C258(NBL505-A1L2) | Fold Enrichment |
|---|---|---|---|---|---|---|
| NBL505-A1L2-P3R2_13391 | 14 | 0.0041 | | No | 0.02222 | 0.185 |
| NBL505-A1L2-P3R2_5559 | 42 | 0.01229 | | Yes | 0.00379 | 3.243 |

1B. Single B Cell

B1. Sorting of Ag Specific Single B Cell from Immunized Alpaca PBMC

Peripheral Blood Mononuclear Cells (PBMCs) are obtained from an immunized alpaca by Ficoll density gradient centrifugation (GE) and split into tubes containing $200\times10^6$ cells for immunostaining. The cells are incubated with 200 µL KLH-biotin diluted to 5 µg/mL in MACS buffer (PBS plus 2% FBS plus 2 mM EDTA) for 30 min at 4° C. and then washed twice with 5 ml ice-cold MACS buffer. Then the cells are stained with rabbit anti-llama IgG (H&L), APC-Streptavidin and live/dead dye. Stained samples were then collected on an Moflo Cell Sorter Cytometer (Beckman) and single IgG+ KLH+ Live+ cells were collected in individual PCR tubes containing 10 µL buffer containing 8 uL lysis buffer (Tiandz), 1 mM dNTP (Takara), 3.75 µM Random 6 mers (Takara) and 1.25 µM Oligo dT primer (Takara) per well.

B2. Single Cell RT-PCR and B Cell Cloning

The collected antigen specific alpaca B cells are lysed in the collection tubes, followed by heating to 65° C. for 5 min. After cooling to 4° C., total RNA from the lysed single cell is reverse transcribed in a final volume of 20 µL of 4 µL 5× PrimeScript II Buffer (Takara), 20 U RNase Inhibitor (Takara), 200 U PrimeScript II RTase (Takara) and 4.5 uL RNase Free water (Takara) for 50 min at 42° C., after an initial step of 10 min at 30° C. allowing random hexamers hybridization. The reaction is stopped by incubation for 15 min at 72° C.

Variable regions of the rearranged heavy chain (HC) locus, lambda (LCλ) or kappa (LCκ) light chain loci are next amplified separately from each single cell cDNA by two rounds of nested PCR. For each variable segment, the first round of PCR is performed on 3 µL of cDNA at 98° C. for 5 min, 98° C. for 15 s, 55° C. for 1 min for HC (62° C. for LCκ and 58° C. for LCλ) and 1 min at 72° C. for 40 cycles followed by a final elongation step at 72° C. for 7 min in 2× PrimeStar MAX Buffer (Takara) and 100 nM of primers in a 40- µL reaction volume. 4 µL of the first amplification products were further amplified by a second round of PCR. The second round of PCR protocol consists of a denaturation step at 98° C. for 5 min and then 40 amplification cycles (30 s at 98° C., 30 s at 58° C. for HC, 62° C. for LCκ, 58° C. for LCλ, and 1 min at 72° C.) and a final step at 72° C. for 7 min with 2× PrimeStar MAX Buffer (Takara) and 100 nM of primers in a 50-µL reaction volume. PCR products from each single cell are detected on a 1.5% agarose GelRed gel. PCR products from each well were purified by filtration through a commercially available purification kit (Tiangen).

Ligation is performed in a total volume of 20 µL with 10 uL of Genbuilder plus cloning-Ligase (Genscript), 100 ng of digested and purified PCR product and 100 ng of linearized vector. Electrocompetent *E. coli* TOP10 bacteria are transformed with 20 µl of the ligation products. Colonies are screened by PCR using PET-SEQ-F (TGCTGGTCTGCTGCTCCTCGC—SEQ ID NO. 68) as the forward primer and PET-SEQ-R as the reverse primer (ACCGTCTATCAGGGCGATGG—SEQ ID NO. 69), respectively. The expected insert band is approximately 700 bp in length. To ensure a consensus variable gene sequence is identified, for each plate, plasmid DNAs from ten colonies are isolated and sequenced.

Using the single B cell sorting method described above and purified Epidermal Growth Factor Receptor as an antigen, a group of 11 clones was identified that each express a VHH antibody that specifically binds to EGFR with high affinity. See, FIG. 10.

Using the panning B cell enrichment method described above and mesothelin (MSLN) as an antigen, a set of clones were picked from NGS data with lineage and CDR3 length and identity grouping methods. Among the clones of 12 sequences most abundant in the library, 7 clones were shown to be potent MSLN binders. (See Table 3, below.) Importantly, MSLN is composed of three domains; and antibodies of 5 of the MSLN binding clones specifically bind to an epitope in domain 1 of MSLN. In addition, the antibody of one of the picked clones specifically binds to domain 2 and the antibody of one of the clones specifically binds only to domain 3. Therefore, with a single effort of lineage grouping and picking, one can identify clones recognizing a broad spectrum of epitopes of a full length antigen. This will provide more opportunity to pick clones in the treatment of different condition for antigen binding, or give more options for bispecific combinations. Furthermore, this method can also identify clones which are shown to behave either as a blocker or nonblocker for the antigen-ligand complex. For example, among the 7 MSLN binding clones, antibodies from 2 clones are identified which bind to either domain 2 or 3 of MSLN but do not inhibit CA125 binding to MSLN. In contrast, the 5 domain 1 epitope binders are shown to prevent CA125 binding to MSLN. The present disclosed methods are efficiently able to systematically and relationally select antibodies for testing to cover a broad range of epitopes with high-resolution.

TABLE 3

Selected MSLN-binding clones

| clones | full length | MSLN ELISA Binding (supernatant) | | | Competition with CA125 | Notes |
| --- | --- | --- | --- | --- | --- | --- |
| | | epitope domain 1 | epitope domain 2 | epitope domain 3 | | |
| NBL501#001 (SEQ ID NO. 1) | Y | N | N | Y | N | domain 3 binders |
| NBL501#002 (SEQ ID NO. 2) | Y | Y | N | N | Y | domain 1 binders |
| NBL501#003 (SEQ ID NO. 3) | N | | | | | |
| NBL501#004 (SEQ ID NO. 4) | Y | Y | N | N | Y | domain 1 binders |
| NBL501#005 (SEQ ID NO. 5) | Y | Y | N | N | Y | domain 1 binders |
| NBL501#006 (SEQ ID NO. 6) | N | | | | | |
| NBL501#007 (SEQ ID NO. 7) | N | | | | | |
| NBL501#008 (SEQ ID NO. 8) | Y | Y | N | N | Y | domain 1 binders |
| NBL501#009 (SEQ ID NO. 9) | Y | N | Y | N | N | domain 2 binders |
| NBL501#010 (SEQ ID NO. 10) | N | | | | | |
| NBL501#011 (SEQIDNO. 11) | N | | | | | |
| NBL501#012 (SEQ ID NO. 12) | Y | Y | N | N | Y | domain 1 binders |

In a further instance of identification of clones producing antigen-specific antibodies, clones producing anti-KLH antibodies were found by the following procedure.

Antigen-specific B-cell isolation. In this further experiment, one alpaca named #009 is immunized with commercially available KLH (Keyhole Limpet Hemocyanin) in a standard immunization regime with 200 μg KLH in Complete Freud's adjuvant once, and then 100 μg KLH (sigma) in incomplete Freud's adjuvant every 2 weeks (Sigma). After evaluation of the antisera by ELISA of serial diluted samples, 100-200 mL blood is drawn for isolation of peripheral blood mononuclear cells (PBMC) using a Ficoll-Paque density gradient technique (GE) according to the instructions from the manufacturer. The isolated PBMCs (viability>95%) are resuspended in complete RPMI1640 media to get a $10^6$/mL cell suspension. 4 mL of the PBMC suspension is added to each well of a 6-well plate and incubated for 1 hour to trap nonspecific binding cells. Then the unbound cells are collected and resuspended to $10^6$/mL in complete RPMI1640 media. 5 mL of the cell suspension are added to a 10 cm high-binding petri dish (protein binding capacity>500 ng/cm$^2$) pre-coated with antigen for 1.5 hour with gentle shaking at 50 rpm, 37° C. After incubation, unbound cells are washed away with 1×DPBS for 2-10 times to remove nonspecific binding cells. Mitomycin treated EL4.IL-2-C3 feeder cells (stably expressing alpaca CD40L) resuspended in B cell medium are added to the dish at 0.5×$10^6$ cells/mL for B cell in vitro co-culture. The final volume is 20 mL in each 10 cm dish. The B cell co-culture medium contains 10% FBS (fetal bovine serum), 1% Penicillin-Streptomycin, 10% alpaca conditioned media from cultures of alpaca blank PBMCs, and various growth factors, for example one or more interleukins, at a concentration of from 1 to 50 ng/ml.

After 10 days' co-culture, 50 μL supernatant are used for ELISA to test the antibody secretion and specificity of binding to the KLH immunogen. Meanwhile, co-cultured cells are collected and counted for total cell number. B cell amplification after B-cell isolation and amplification is calculated by total cell number minus that of feeder cell control. To compare this enriched cell number with the initial cell amount added, we can calculate the amplification of antigen specific B cells. As shown in FIG. 11, B-cells from 5 different co-culture dishes showed consistent antigen-specific VHH antibody secretion. The antigen specific B cells in PBMC were amplified 4- to 6-fold after B-cell isolation and amplification (BIA).

After BIA, three NGS libraries are constructed using mRNA of co-cultured cells. Oligo-dT, Random hexamer and CH2-specific primers are used in reverse transcription, respectively. (Maass D R, Sepulveda J, Pernthaner A, Shoemaker C B. Alpaca (*Lama pacos*) as a convenient source of recombinant camelid heavy chain antibodies (VHHs). J Immunol Methods. 2007; 324(1-2):13-25.) These cDNA are then subjected to two rounds of PCR reactions. All these three libraries were sent to Genscript, Nanjing, China for sequencing on a MiSeq Sequencing System (Illumina, Miseq, 300×2) using a 30% PhiX genomic DNA spike in 4-5 million reads were generated for each sample. Data are quality checked with NGS QC Toolkit and assembled using FLASH. Sequences are clustered into lineages/groups as shown in FIG. 4, based on same CDR3 length, CDR3 hamming distance smaller or equal to 1 and same mapped V/J germlines. Sequences are further sub-grouped into clusters based on same CDR3 length and CDR3 identity with 80% or more. Over 800 groups were generated for each library. Several lineage priority factors are applied here to select clones from these groups: sequence abundance, classical VHH vs non classical VHH and CDR3 length. 20 clones are selected from 20 different groups and they are synthesized, expressed, and purified. The bioinformatic data relating to the picked clones are presented in Tables 4 through 6 below. The complete amino acid sequence of the antibody expressed by each of the picked clones is given as contiguous sequences of each domain (FR1, CDR1, etc.)

TABLE 4

Bioinformatic data of selected anti-KLH VHH clones

| No | Name | Cluster | Count | Frequency | Mismatches | V gene | 1 gene | Hinge | Expression (mg/mL) | Cys residues |
|---|---|---|---|---|---|---|---|---|---|---|
| 1- SEQ ID NO. 43 | NGS602-OLIGO_30 | C28 | 122359 | 4.44872 | 8 | IGHV3S57*01 | IGHJ4*01 | L | 256.7 | 2 |
| 2- SEQ ID NO. 44 | NGS602-OLIGO_152 | C15 | 76621 | 2.78578 | 13 | IGHV3-3*01 | IGHJ4*01 | L | 213.4 | 2 |
| 3- SEQ ID NO. 45 | NGS602-OLIGO_185 | C43 | 65893 | 2.39573 | 11 | IGHV3-3*01 | IGHJ4*01 | L | 200 | 2 |
| 4- SEQ ID NO. 46 | NGS602-OLIGO_186 | C329 | 61590 | 2.23928 | 6 | IGHV3-3*01 | IGHJ6*01 | L | 190 | 2 |
| 5- SEQ ID NO. 47 | NGS602-OLIGO_205 | C104 | 57830 | 2.10258 | 15 | IGHV3S53*01 | 1GHJ4*01 | L | 113.4 | 2 |
| 6- SEQ ID NO. 48 | NGS602-OLIGO_50 | C196 | 51491 | 1.87211 | 10 | IGHV3-3*01 | IGHJ4*01 | L | 213.4 | 2 |
| 7- SEQ ID NO. 49 | NGS602-OLIGO_12 | C43 | 50104 | 1.82168 | 12 | IGHV3-3*01 | IGHJ4*01 | L | 210 | 2 |
| 8- SEQ ID NO. 50 | NGS602-OLIGO_55 | C35 | 47677 | 1.73344 | 15 | IGHV3-3*01 | IGHJ4*01 | L | 203.4 | 2 |
| 9- SEQ ID NO. 51 | NGS602-OLIGO_221 | C189 | 45548 | 1.65603 | 5 | IGHV3-3*01 | IGHJ4*01 | L | 106.7 | 2 |
| 10- SEQ ID NO. 52 | NGS602-OLIGO_151 | C71 | 45395 | 1.65047 | 13 | IGHV3S9*01 | IGHJ4*01 | L | 223.4 | 2 |
| 11- SEQ ID NO. 53 | NGS602-OLIGO_35 | C137 | 44920 | 1.6332 | 10 | IGHV3-3*01 | IGHJ4*01 | L | 253.4 | 2 |
| 12- SEQ ID NO. 54 | NGS602-OLIGO_28 | C27 | 33302 | 1.21079 | 6 | IGHV3-3*01 | IGHJ4*01 | L | 90 | 2 |
| 13- SEQ ID NO. 55 | NGS602-OLIGO_72 | C5 | 31565 | 1.14764 | 13 | IGHV3-3*01 | IGHJ4*01 | L | 140 | 2 |
| 14- SEQ ID NO. 56 | NGS602-OLIGO_2 | C170 | 30695 | 1.11601 | 8 | IGHV3S53*01 | IGHJ7*01 | L | 120 | 2 |
| 15- SEQ ID NO. 57 | NGS602-OLIGO_42 | C176 | 27772 | 1.00973 | 9 | IGHV3-3*01 | IGHJ4*01 | L | 273.4 | 2 |
| 16- SEQ ID NO. 58 | NGS602-OLIGO_31 | C175 | 24345 | 0.88513 | 11 | IGHV3-3*01 | IGHJ4*01 | L | 203.4 | 2 |
| 17- SEQ ID NO. 59 | NGS602-OLIGO_359 | C226 | 23772 | 0.8643 | 11 | IGHV3S53*01 | IGHJ7*01 | S | 113.4 | 2 |
| 18- SEQ ID NO. 60 | NGS602-OLIGO_149 | C70 | 23543 | 0.85597 | 8 | IGHV3-3*01 | IGHJ4*01 | L | 243.4 | 4 |
| 19- SEQ ID NO. 61 | NGS602-OLIGO_266 | C102 | 22956 | 0.83463 | 7 | IGHV3S58*01, IGHV3-3*01 | 1GHJ6*01 | L | 276.7 | 2 |
| 20- SEQ ID NO. 62 | NGS602-OLIGO_169 | C132 | 21287 | 0.77395 | 11 | IGHV3S58*01 | IGHJ4*01 | L | 220 | 2 |

TABLE 5

Bioinformatic data of selected anti-KLH clones (cont'd)

| No-SEQ ID NO. | Name | Fr1 | CDR1 | Fr2 | CDR2 |
|---|---|---|---|---|---|
| 1- SEQ ID NO. 43 | NGS602-OLIGO_30 | QVQLVESGGGTVQAGGSLRLSCAAS | GLTFGSYA | MEWYRQAPGKERELVAT | ISSGGNT |
| 2- SEQ ID NO. 44 | NGS602-OLIGO_152 | QVQLVESGGGLVQAGDSLRLSCAAS | GDNFSRYT | FGWFRQAPGKEREFVAV | INWSGSYT |
| 3- SEQ ID NO. 45 | NGS602-OLIGO_185 | QVQLVESGGGLVQAGGSLRLSCAAS | GRTSSRYV | MGWFRQSPGKEREFVAA | ISANGRST |
| 4- SEQ ID NO. 46 | NGS602-OLIGO_186 | QVQLAESGGGLVQAGDSLRLSCAAS | GRSVSSYA | MGWFRQAPGKEREFVAA | ISWSGEST |
| 5- SEQ ID NO. 47 | NGS602-OLIGO_205 | RVQLVESGGGLVQPGGSLRLSCTAS | GLPLNTAA | MSWYRQTPGKERELVAS | ISITGDST |
| 6- SEQ ID NO. 48 | NGS602-OLIGO_50 | QVQLVESGGGLVQVGGSLRLSCVAS | GLTFSNYA | MGWFRQAPGKEREFVTA | INWSGAIK |
| 7- SEQ ID NO. 49 | NGS602-OLIGO_12 | QVQLVESGGGSVQAGGSLRLSCAAS | GRTFGRHV | MAWFRQAPGREREFVAA | ISGNGRVT |

TABLE 5-continued

Bioinformatic data of selected anti-KLH clones (cont'd)

| No-SEQ ID NO. | Name | Fr1 | CDR1 | Fr2 | CDR2 |
|---|---|---|---|---|---|
| 8-SEQ ID NO. 50 | NGS602-OLIGO_55 | QVQLTESGGGLVQAGASLRLSCVAS | PDTPSTYT | IAWFRRAPGKERDFVAN | IARAGTTI |
| 9-SEQ ID NO. 51 | NGS602-OLIGO_221 | QVQLVESGGGLVQAGESLRLSCVAS | GRTFSSYA | MGWFRQAPGQEREFVAR | ISRRGTNT |
| 10-SEQ ID NO. 52 | NGS602-OLIGO_151 | EVQLVESGGGLVQPGGSLRLSCTAS | GFTLSTSP | VSWARQAPGKGPEWLAG | IYSDGRT |
| 11-SEQ ID NO. 53 | NGS602-OLIGO_35 | QVSLVESGGGLVQAGGSLRLSCAAS | GRTFRRSA | MGWFRRPPGKEREFVAA | ITSSGGSI |
| 12-SEQ ID NO. 54 | NGS602-OLIGO_28 | QVQLVESGGGLVRAGGSLRLSCAAS | GRAFSSYP | MGWFRRAPGKEREFVAA | ISLSGSKQ |
| 13-SEQ ID NO. 55 | NGS602-OLIGO_72 | QVELVESGGALVQAGGSLKLSCVDS | GRSFSSYV | VAWFRQAPGKEREFVAR | VSASGAIR |
| 14-SEQ ID NO. 56 | NGS602-OLIGO_2 | QVQLVESGGGLVQPGGSLRLSCAAS | ESIRSIYA | MGWYRQAPGKQRELVAL | VTDDGST |
| 15-SEQ ID NO. 57 | NGS602-OLIGO_42 | QVQLVESGGGLVQAGGSLRLSCLFS | GTFGIYG | MGWFRQAPGKAREFVAG | VSRHGLTT |
| 16-SEQ ID NO. 58 | NGS602-OLIGO_31 | QVQLVESGGGLVQAGDSLRLSCTAS | GTTFDRYH | MGWFRQAPGMERHVVAH | ISWSGANT |
| 17-SEQ ID NO. 59 | NGS602-OLIGO_359 | QVQLVESGGGLVQPGGSLRLSCAAS | GYSLSFYA | MGWYRQSPGKQREVVAR | IAGPGVT |
| 18-SEQ ID NO. 60 | NGS602-OLIGO_149 | QVQLVESGGGLVQAGDSLRLSCAAS | GRTFSSYA | MAWFRRPPGKAREFVAL | IRWSNGRT |
| 19-SEQ ID NO. 61 | NGS602-OLIGO_266 | QVQLVESGGGLVQAGGSLRLSCAAS | GRTFFTYP | MGWFRQAPGKERQFVAA | ISGNGDSI |
| 20-SEQ ID NO. 62 | NGS602-OLIGO_169 | RVQLVESGGGLVQAGGALRLSCVGS | GFTFRDTA | MAWFRQSPGKEREFVAG | FSILS |

TABLE 6

Bioinformatic data of selected clones (cont'd)

| No | Name | Fr3 | Cdr3 | Fr4 |
|---|---|---|---|---|
| 1-SEQ ID NO. 43 | NGS602-OLIGO_30 | HYLASVKGRFTISRDNDKNTLYLQMNSLKPE DTAVYYC | AAKYGWTGIWYAPSDYVH | LGPGTQVTVSS |
| 2-SEQ ID NO. 44 | NGS602-OLIGO_152 | YVADSVAGRFTMSRDNAKHLVYLQMDSLNTG DTAVYYC | AAHWDYGSSSRRQREYDY | WGQGTQVTVSS |
| 3-SEQ ID NO. 45 | NGS602-OLIGO_185 | NYAGSVNGRFKISRDGAKDKVDLQMNSLKPE DTAVYFC | ATNMAFSSSSNFPANYDV | WGQGTQVTVSS |
| 4-SEQ ID NO. 46 | NGS602-OLIGO_186 | HYADSVKGRFTISRDNAENTVYLQMNSLKPE DTAVYYC | ASYLSGHYYFGIGRDPPFGS | WGQGTQVTVSS |
| 5-SEQ ID NO. 47 | NGS602-OLIGO_205 | TYADSVKGRFTISRDNVKNIVYLQMDILKPE DTAVYYC | TRAPWDYKY | WGQGTQVTVSS |
| 6-SEQ ID NO. 48 | NGS602-OLIGO_50 | NYGDSAKGRFTISRDNALNMLYLQMNRLKPE DTAVYYC | AARQGNMGDLVVKSGDY | WGQGTQVTVSS |
| 7-SEQ ID NO. 49 | NGS602-OLIGO_12 | NYALSMKGRFTISRDNANDMVYLQMDGLKPE DTAVYSC | ATRMAFDSDSNFPATYDV | WGQGTQVTVSS |
| 8-SEQ ID NO. 50 | NGS602-OLIGO_55 | TYADSVKGRFTISKDNARNTVYLQMNNLTPA DTAIYYC | AAYSPGSIIARDSTQYRY | WGQGTRVTVSE |

TABLE 6-continued

Bioinformatic data of selected clones (cont'd)

| No | Name | Fr3 | Cdr3 | Fr4 |
|---|---|---|---|---|
| 9-SEQ ID NO. 51 | NGS602-OLIGO_221 | YYADSVRGRFTISRDNAKNTVYLQMNSLKPEDTAVYYC | AADRSDVFEKDPGYYDY | WGQGAQVTVSS |
| 10-SEQ ID NO. 52 | NGS602-OLIGO_151 | SNLVSLRGRFTISRDNAKNTVYLQMNSLLPEDTALYYC | AIGAAAVGGL | RGQGTQVTVSS |
| 11-SEQ ID NO. 53 | NGS602-OLIGO_35 | YDPDIAKDRFTISRDNSKTSVYLQMNNLKPEDTAVYYC | SLKTTYSGGPYDYTKGPEYD | WGQGTQVTVSS |
| 12-SEQ ID NO. 54 | NGS602-OLIGO_28 | YYVDSVKGRFTISRDNAKNTVSLQMNSLKPEDTAVYYC | AALKDGEPPAVDY | WGQGTQVTVSS |
| 13-SEQ ID NO. 55 | NGS602-OLIGO_72 | IYADSVRGRFTISRDNTKATVYLQMNSLKSEDTAVFFC | AAGGVSTAVHPFKPTSYDF | WGQGTQVTVSV |
| 14-SEQ ID NO. 56 | NGS602-OLIGO_2 | DYVDSVKGRFTVSRDSAKNTVYLQMNSLKPEDTAVYHC | YVEGSTHYDPVREY | WGKGTLVTVSS |
| 15-SEQ ID NO. 57 | NGS602-OLIGO_42 | QYADSVKGRFTISRDNAKNTMYLQMNSLKPEDTADYYC | ARSRLSASLLVTASDYDY | WGQGTQVTVSS |
| 16-SEQ ID NO. 58 | NGS602-OLIGO_31 | YVADSMKGRFTISRDNAKNTAYLQINNLKFEDTALYYC | AAGSYLAVPGSRWDY | WGQGTQVTVSS |
| 17-SEQ ID NO. 59 | NGS602-OLIGO_359 | NYADSVMGRFTISRDNAKNMVYLQMNSLEPEDTAVYYC | NAGGTRWSVGDY | WGKGTLVTVSS |
| 18-SEQ ID NO. 60 | NGS602-OLIGO_149 | AVVDSVKGRFTASRDNAKNTGYLQMDSLKSEDTAVYYC | AACDQALDPPRCND | WGQGTQVTVSS |
| 19-SEQ ID NO. 61 | NGS602-OLIGO_266 | DYADSVKGRFTISRDNAKNTLYLQMNSLKPEDAALYYC | NAVITHDYTRPLFAS | WGQGTQVTVSS |
| 20-SEQ ID NO. 62 | NGS602-OLIGO_169 | RYADSVKGRFTISRDNDKNTVYLQMNSLKPEDTAVYYC | AAGDGTIASVLTTSGVNF | WGQGTQVTVSS |

Validation of antigen-specific binding of the antibodies is done by ELISA. The library is surveyed based on subgrouping signatures (sequence abundance, classical VHH vs non classical VHH and CDR3 length). In this example, only one clone is selected from each cluster. In this example most of the selected clones produce a classical VHH instead of a nonclassical VHH. Amino acid sequences having both of long and short hinge sequences are included in the selected clones in this example, as is one clone with an additional pair of disulfide bonds within CDR3 than usual VHH sequences. With such clone picking strategy, we achieved 100% successful rate in selecting clones with binding activity. As shown in the ELISA assay, all 20 clones selected showed specific binding activity to the KLH antigen KLH (FIG. 13). 18 of them had an average binding EC of 0.465 nm (except No 6 and No 9 as outlier). 3 clones (nos. 1, 3 and 13) are shown to be potent KLH binders, with an EC 50 at 67, 77 and 72 pmol/L, respectively. Most of the leads are shown to have a sub-nanomolar potency. Thus, cloned B-cells secreting potent KLH binding antibodies can be identified via BIA and NGS. To confirm the correlation result between CDR3 length and binding activity, clones with different CDR3 length are included in the list. The shortest CDR3 length that is seen is 9 amino acids, whereas the longest one is 21. The average CDR3 length of the 20 VHH antibodies is 16 amino acids. As shown in FIG. 42, a positive correlation is observed between CDR3 length and clone ELISA activity.

TABLE 7

Anti-KLH ELISA of selected clones

| No. | Clone | EC50 (nanomole/L) |
|---|---|---|
| 1 | NGS602-OLIGO_30 | 0.067 |
| 2 | NGS602-OLIGO_152 | 0.638 |
| 3 | NGS602-OLIGO_185 | 0.077 |
| 4 | NGS602-OLIGO_186 | 0.280 |
| 5 | NGS602-OLIGO_205 | 1.156 |
| 6 | NGS602-OLIGO_50 | NA |
| 7 | NGS602-OLIGO_12 | 0.181 |
| 8 | NGS602-OLIGO_55 | 0.241 |
| 9 | NGS602-OLIGO_221 | 220.400 |
| 10 | NGS602-OLIGO_151 | 0.409 |
| 11 | NGS602-OLIGO_35 | 0.291 |
| 12 | NGS602-OLIGO_28 | 0.707 |
| 13 | NGS602-OLIGO_72 | 0.072 |
| 14 | NGS602-OLIGO_2 | 1.740 |
| 15 | NGS602-OLIGO_42 | 0.342 |
| 16 | NGS602-OLIGO_31 | 1.008 |
| 17 | NGS602-OLIGO_359 | 0.610 |
| 18 | NGS602-OLIGO_149 | 0.147 |
| 19 | NGS602-OLIGO_266 | 0.195 |
| 20 | NGS602-OLIGO_169 | 0.213 |

Example 2: Discovery of an Antibody that Blocks PD-1:PD-L1 Complexation by Epitope Prediction Overview of the Experimental Approach Workflow for discovery of an antibody that blocks a ligand:receptor binding interaction (complexation) is illustrated in FIG. 14. The workflow begins with identification of three dimensional structures of the ligand and receptor, and/or of the structure of their complex, by computational or crystallographic methods. Portions of both of the receptor and ligand that form the binding interface can be determined by examination of the interface of the "docked" proteins. Amino acids that interact to establish or stabilize the bound complex can be determined by examination of the structure. Data from experiments that change amino acids at the interface and look at the effect of such a change on the binding strength of the complex can contribute to determining the amino acids that interact to form and stabilize the complex.

Short linear amino acid sequence portions of 2 to 4 amino acids of the ligand or of the receptor that lie at the interface of the complex are selected and then an NGS amino acid sequence library is searched to identify antibody cDNA clones that encode the selected short amino acid sequences in a CDR part of the sequence, preferably in a CDR3 portion of the antibody sequence. The screening peptide sequence with 2-4 amino acids length is set as a key word for searching CDR3 sequences from NGS database, and the satisfactory VHH sequences and their abundances are obtained.

Sequences identified as present in the NGS library above a selected threshold of abundance are selected for gene synthesis and expressed in HEK293 cells fused with a human IgG4-FC tag. The expressed proteins are purified and then subjected to functional testing, e.g. for antigen binding and inhibition of PD-1:PD-L1 complex formation PD-1/PD-L1 Structure Analysis The structure of PD-1/PD-L1 complex was downloaded from the PDB database (PDB ID: 4ZQK). PYMOL software is used for structure analysis. The structure showed that PD-L1 covered two peptides of PD-1 (FIG. 15), the loop sequence close to PD-L1 is SFVLNWYRMSPSNQTDK-LAA (SEQ ID NO. 138), the loop sequence close to PD-1 is YLCGAISLAPKAQIKESLR (SEQ ID NO. 139). The polar contact-residue regions observed in PD-1/PD-L1 crystal structures are selected. Polar contacts between PD-1 and PD-L1 are shown in PYMOL by using 'actions-find-polar contacts-to others excluding solvent'.

FIG. 15 shows the interface of the PD-1:PD-L1 complex (the data of the complex are publically available—Protein DataBase ID No: 4ZQK), and two adjacent peptides of PD-1 that are potential "blocking" peptides that inhibit complex formation are shown. FIG. 16 illustrates results of an interaction analysis between the PD-1 protein and the two adjacent peptides; amino acids that interact between the SFV . . . SLR peptide of PD-1 and the AFT . . . RIT peptide of PD-L1 at the interface of their complex are identified by connecting lines.

Through the above analysis, the polar contact residues of PD-L1 were determined, and they are F-D-Q-ADYKR (SEQ ID NO. 144). Because there are very long amino acid intervals (>2 amino acids) in F-D-Q-A, only the peptide ADYKR (SEQ ID NO. 143) fits the selection strategy. Two to four amino acid peptides are chosen for VHH selection. Then the peptides ADYK (SEQ ID NO. 68), DYKR (SEQ ID NO. 142), ADY, DYK, YKR, AD, DY, YK and KR are set for screening criteria from NGS database (Table 4).

Additional structures of PD-1 complexed by a variety of antibodies are available and are also downloaded from the PDB database and analyzed in the same manner as above. Complexes between PD-1 and a variety of anti-PD-1 antibodies and the short peptides identified as potential blocking peptides by the interaction analysis as described above of the complexes are listed in Table 8.

TABLE 8

| PDB ID | Complex | Screening peptides |
|---|---|---|
| 4ZQK | PD-1/PD-L1 | ADY |
| 4ZQK | PD-1/PD-L1 | DYK |
| 4ZQK | PD-1/PD-L1 | YKR |
| 4ZQK | PD-1/PD-L1 | DY |
| 5WT9 | PD-1/nivolumab | NDD |
| 5WT9 | PD-1/nivolumab | DDY |
| 5WT9 | PD-1/nivolumab | DD |
| 6J14 | PD-1/GY-14 | NTD |
| 6J15 | PD-1/GY-5 | FYY |
| 6J15 | PD-1/GY-5 | YYF |
| 6JBT | PD-1/toripalimab | YWY |
| 6JBT | PD-1/toripalimab | WY |
| 5GGS | PD-1/pembrolizumab | YRF |

Attention is focused on the CDR3 sequences, because the CDR3 in VHH is the main binding region to antigens, and in VHH antibodies the CDR3 portion is longer than in a conventional (VHVL) antibody, and the longer CDR3 provides VHH antibodies a large binding area. CDR3 sequences including screening peptides were extracted from the NGS database and their abundance was counted to eliminate the repetitive sequences. It is found that 2-4 amino acids are appropriate to search the NGS database; two amino acids might be too short (resulting in an unmanageable number of hits), and four amino acids might restrict the number of choices unduly. Accordingly, 3 amino acid strings were selected to search the NGS database.

Prior publications have described protocols for antibody discovery by panning phage surface VHH display libraries. But this method tends to obtain only VHH clones with high abundance in a library, and results in losing some low abundance VHHs. Based on the keyword search using different screening peptide strings, a series of VHH sequences of varying abundance (percentage of all clones that carry a DNA encoding a selected amino acid sequence) are selected from the NGS database. The CDR3 portion of the amino acid sequence encoded in selected clones with different abundance tare presented in Table 9.

TABLE 9 cDNA clones selected as possible blocking antibodies

| Clone ID | Screening peptide | CDR3 | Count |
|---|---|---|---|
| 504#SS1 (SEQ ID NO. 13) | ADYK | AASTMVVTTVAADYKY (SEQ ID NO. 69) | 4 |
| 504#SS2 (SEQ ID NO. 14) | ADY | AAGLKADYGDSYVDTSTRNY NY (SEQ ID NO. 70) | 3302 |
| 504#SS3 (SEQ ID NO. 15) | ADY | AADYNRLQIGQRSRDYDY (SEQ ID NO. 71) | 16 |
| 504#SS4 (SEQ ID NO. 16) | ADY | AGRPFGLQLDTHQADYNI (SEQ ID NO. 72) | 61 |
| 504#SS5 (SEQ ID NO. 17) | ADY | GVDRRQYGLGIPPLADY (SEQ ID NO. 73) | 30 |
| 504#SS6 (SEQ ID NO. 18) | ADY | VADYRVWGTRIAGTKYDS (SEQ ID NO. 74) | 3 |

TABLE 9-continued cDNA clones selected as possible blocking antibodies

| Clone ID | Screening peptide | CDR3 | Count |
|---|---|---|---|
| 504#SS7 (SEQ ID NO. 19) | DYK | AADGDASDRSYAPPRDYKYEY (SEQ ID NO. 75) | 3 |
| 504#SS8 (SEQ ID NO. 20) | DYK | AADNVGDSWYSDDYKY (SEQ ID NO. 76) | 2 |
| 504#SS9 (SEQ ID NO. 21) | DYK | NARPTFGAYYSDYKSGVDY (SEQ ID NO. 77) | 2 |
| 504#SS10 (SEQ ID NO. 22) | DYK | NRGNYYRDYKPEF (SEQ ID NO. 78) | 2 |
| 504#SS11 (SEQ ID NO. 23) | DYK | TTEVACYSDYKSTQISRI (SEQ ID NO. 79) | 2 |
| 504#SS12 (SEQ ID NO. 24) | YKR | NYKRGHYPDGVSTYEY (SEQ ID NO. 80) | 4 |
| 504#SS13 (SEQ ID NO. 25) | YKR | SYKRGRYPDGVSTLEY (SEQ ID NO. 81) | 3 |
| 504#SS14 (SEQ ID NO. 26) | NDD | ANSTYFNDDPEYDR (SEQ ID NO. 82) | 2 |
| 504#SS15 (SEQ ID NO. 27) | NDD | NAGRLSYGGSYYPNDDY (SEQ ID NO. 83) | 3 |
| 504#SS16 (SEQ ID NO. 28) | NDD | NTDYTFAKLTAPDRRNDD (SEQ ID NO. 84) | 2 |
| 504#SS17 (SEQ ID NO. 29) | DDY | NADTIATMTDDY (SEQ ID NO. 85) | 15 |
| 504#SS18 (SEQ ID NO. 30) | DDY | NATRPRDDYYYTGGFLYY (SEQ ID NO. 86) | 11 |
| 504#SS19 (SEQ ID NO. 31) | DDY | RPYSDYVTYDPDDYDY (SEQ ID NO. 87) | 11351 |
| 504#SS20 (SEQ ID NO. 32) | NTD | NTDPDYSDYDDMYVRS (SEQ ID NO. 88) | 9 |
| 504#SS21 (SEQ ID NO. 33) | NTD | AATNSNTDWRTYTEYNY (SEQ ID NO. 89) | 2 |
| 504#SS22 (SEQ ID NO. 34) | FYY | AAKFTSSSFYYRSPREYSS (SEQ ID NO. 90) | 3 |
| 504#SS23 (SEQ ID NO. 35) | FYY | AAKNVPGFYYSDYANHEYDY (SEQ ID NO. 91) | 4 |
| 504#SS24 (SEQ ID NO. 36) | YYF | NAPKGGSYYFPAVGGYDY (SEQ ID NO. 92) | 7 |
| 504#SS25 (SEQ ID NO. 37) | YYF | RVESQDYYFDYDRDS (SEQ ID NO. 93) | 2 |
| 504#SS26 (SEQ ID NO. 38) | YWY | ATGYWYTPGD (SEQ ID NO. 94) | 4 |
| 504#SS27 (SEQ ID NO. 39) | YWY | NAKRYWYDY (SEQ ID NO. 95) | 5 |
| 504#SS28 (SEQ ID NO. 40) | YRF | AADFDTYRFCSGFGPDAYSS (SEQ ID NO. 96) | 11 |
| 504#SS29 (SEQ ID NO. 41) | YRF | AVLVDSTYRF (SEQ ID NO. 97) | 2 |
| 504#SS30 (SEQ ID NO. 42) | YRF | NADISRYRFSRGDY (SEQ ID NO. 98) | 5 |

CDR3 Sequence Selection from NGS Database

We determined a series of screening peptides with amino acids length of 2-4. We supposed that CDR3 contains the screening peptides may bind with PD-1 and block PD-L1. Because the CDR3 in VHH is the main binding region with antigens, it is s longer than conventional antibody and the longer CDR3 provides VHH large binding area. CDR3 sequences including screening peptides were extracted from the NGS database and the abundance was counted to wipe out the repetitive sequences. Due to different screening peptides, we found that 2-4 amino acids were appropriate but what needs illustration is that 2 AA may be too short, and 4 AA may restrict the choose number, 3 amino acids length screening peptides were the best choice.

Antibody Expression and Purification

Nucleic acids encoding the selected VHH antibody sequences are synthesized and inserted into a pCDNA 3.4 vector fused with IgG4-FC tag with a $(G4S)_3$ linker. The recombinant plasmids are confirmed by sequencing. Then the VHH-FC constructs are transformed in HEK293 cells.

Transformed cells are cultured for 5-7 days to obtain the recombinant proteins. Then the recombinant VHH antibodies are purified from filtered culture supernatants. The protein concentration of the obtained antibodies is measured by UV-absorbance at 280 nm. The purity of the purified recombinant antibodies is evaluated by Coomassie-staining of sodium dodecyl sulfate-polyacrylamide gels (SDS-PAGE) and high-performance liquid chromatography (HPLC).

ELISA Binding Assay

2 µg/ml of PD-1 protein is coated on 96-well plates overnight for ELISA binding assay. Recombinant VHH-FC proteins are added to the wells and allowed to stand for a period of time, then 1 µg/ml of HRP-conjugated anti-FC antibody is added as detection antibody and the assay reagents are added. The absorbance is read at 450 nm. Binding of nivolumab serves as a positive control and plates coated with BSA are used as the negative control group.

ELISA Blocking Assay

Each well of 96-well microtiter plates is coated with 2 µg/ml of PD-1 protein in PBS and blocked with 1% BSA. Purified VHH-FC protein at a concentration of 5 µg/ml is added to each well.

Then 2 µg/ml of biotin labeled PD-L1 protein is added to each well. The PD-L1 proteins are detected with RP-conjugated anti-human IgG and TMB as substrate. The intensity of the developed color is measured at 450 nm. Wells with no added PD-1 and no added VHH-FC are negative and positive controls, respectively.

Thirty clones were selected and VHH antibodies are purified from the selected clones. Thirty clones are selected for expression and purification as described above. 19 clones exhibited good expression of the recombinant VHH antibody.

Purified VHH antibodies from the 19 clones are assessed for binding to PD-L1 and for inhibition of formation of a PD-1:PD-L1 complex by ELISA as described above. Results are shown in Tables 10 and 11, respectively:

TABLE 10

PD-L1 binding activity of VHH antibodies expressed from selected cDNA clones

| Clone ID | Mean Measurement Value (OD450) | | | |
|---|---|---|---|---|
| | 2 µg/mL | 0.2 µg/mL | 0.02 µg/mL | 0.002 µg/mL |
| SS1 | 0.04 | 0.03 | 0.03 | 0.03 |
| SS2 | 3.10 | 3.12 | 2.25 | 0.59 |
| SS5 | 3.06 | 3.18 | 2.79 | 1.56 |
| SS7 | 1.07 | 0.24 | 0.05 | 0.03 |
| SS8 | 0.04 | 0.03 | 0.03 | 0.03 |
| SS9 | 0.04 | 0.03 | 0.03 | 0.03 |
| SS10 | 0.04 | 0.03 | 0.03 | 0.03 |
| SS11 | 3.16 | 3.03 | 1.52 | 0.24 |
| SS12 | 0.07 | 0.04 | 0.03 | 0.03 |
| SS13 | 0.03 | 0.03 | 0.03 | 0.03 |
| SS14 | 0.04 | 0.03 | 0.03 | 0.04 |
| SS15 | 0.05 | 0.04 | 0.04 | 0.04 |
| SS16 | 0.05 | 0.03 | 0.04 | 0.03 |
| SS22 | 0.04 | 0.03 | 0.03 | 0.04 |
| SS23 | 3.00 | 2.91 | 1.22 | 0.19 |
| SS25 | 0.04 | 0.03 | 0.03 | 0.03 |
| SS28 | 3.06 | 2.77 | 0.93 | 0.14 |
| SS29 | 0.35 | 0.06 | 0.04 | 0.04 |
| SS30 | 0.04 | 0.03 | 0.03 | 0.04 |
| 1194-z0-IgG4 | 3.10 | 3.00 | 1.36 | 0.17 |
| NBL507-BMK2-H4-IgG4 | 0.05 | 0.04 | 0.04 | 0.04 |
| Blank | 0.03 | 0.03 | 0.03 | 0.04 |

TABLE 11

Blocking activity of selected VHH clones

| Clone ID | Mean Measurement Values of Antibodies at Different Concentrations (OD450) | | | |
|---|---|---|---|---|
| | 9.75 µg/mL | 2.42 µg/mL | 0.61 µg/mL | 0.15 µg/mL |
| SS1 | 3.17 | 3.26 | 3.15 | 3.19 |
| SS2 | 3.31 | 3.31 | 3.23 | 3.34 |
| SS5 | 0.08 | 0.14 | 1.65 | 3.18 |
| SS7 | 3.26 | 3.31 | 3.35 | 3.32 |
| SS8 | 3.27 | 3.33 | 3.28 | 3.27 |
| SS9 | 3.32 | 3.46 | 3.36 | 3.42 |
| SS10 | 3.32 | 3.28 | 3.24 | 3.27 |
| SS11 | 2.87 | 2.92 | 3.13 | 3.18 |
| SS12 | 3.28 | 3.27 | 3.20 | 3.22 |
| SS13 | 3.33 | 3.29 | 3.33 | 3.34 |
| SS14 | 3.36 | 3.27 | 3.25 | 3.22 |
| SS15 | 3.68 | 3.57 | 3.69 | 3.53 |
| SS16 | 3.26 | 3.22 | 3.35 | 3.48 |
| SS22 | 3.28 | 3.32 | 3.34 | 3.47 |
| SS23 | 3.28 | 3.29 | 3.31 | 3.47 |
| SS25 | 3.17 | 3.36 | 3.30 | 3.32 |
| SS28 | 3.27 | 3.31 | 3.28 | 3.32 |
| SS29 | 3.31 | 3.39 | 3.36 | 3.35 |
| SS30 | 3.28 | 3.29 | 3.26 | 3.33 |
| 1194-z0-IgG4 | 0.10 | 0.32 | 2.60 | 3.23 |
| NBL507-BMK2-H4-IgG4 | 3.15 | 3.24 | 3.24 | 3.32 |
| Blank | 3.23 | 3.31 | 3.24 | 3.19 |

1194-z0-IgG4 is a positive control antibody known to have activity of blocking PD-1.PD-L1 complexation. NBL507-BMK2-H4-IgG4 is an irrelevant antibody used as a negative control.

Seven of the selected clones produced VHH antibodies that have substantial activity of binding to PD-1, and five of these with the strongest binding were selected for testing for activity of blocking PD-1:PD-L1 complex formation. Clone SS5 is found to exhibit stronger complexation inhibition even than the positive control 1194-z0-IgG4.

From the results obtained, it appears that the collection of clones expressing antibodies having a CDR3 sequence that is represented among all clones that are selected in at least ten (10) copies has a high probability of including at least one clone expressing a VHH antibody that will specifically bind to the antigen and will block complexation of the antigen with its specific protein binding partner. For example, in the experiment disclosed herein, 100% of clones having their CDR3 sequence represented in greater than 10 copies among the picked clones express a VHH antibody that binds to PD-1, and 33% of them express a VHH antibody that will block binding of PD-1 to PD-L1. In contrast only 25% of clones having their CDR3 sequence present in less than 10 copies among the picked clones express a VHH antibody that binds to PD-1 and none of the picked clones express a VHH antibody that will block PD-1 binding to PD-L1.

In additional experiments conducted as above, 30 clones for expression and purification are picked as described above. 19 clones are shown to have good expression of recombinant VHH antibody. Among them, 7 showed strong binding to human PD-1. The overall success rate for identifying clones secreting antigen binding VHH antibodies NGS guided clone selection is 37%.

Example 3: Development of Sequence Signatures and Clone Selection Rules

Convergent (overlapping) sequences between animals under BCMA immunization. In this experiment, two alpacas named 507-A1 (A1) and 507-A2 (A2) are immunized with human recombinant BCMA protein. Animals A1 and A2 receive an equal amount of recombinant human BCMA using the same immunization regime. 93 and 40 VHH sequences with unique CDR3 amino acid sequences are found as promising leads for animals A1 and A2, respectively. Between animals, selecting clones double-blinded as to the immunization and clone identification, there are 20 sequences with CDR3 sequences shared by both animals. Table 12 shows the 20 unique CDR3 sequences shared by both animals.

TABLE 12

CDR3 sequences of overlapping clones

| CDR3 | |
|---|---|
| AIGAPDPFNYSGWRRNL | SEQ ID NO. 99 |
| AIGISPHYGSDWYALR | SEQ ID NO. 100 |
| AIGLSPGYRDPNL | SEQ ID NO. 101 |
| AIGLSPGYRDPNL | SEQ ID NO. 102 |
| ALGAMREGVYSDL | SEQ ID NO. 103 |
| AVGAPLVSSPYRS | SEQ ID NO. 104 |
| AVGAWYEKRKKKEKGL | SEQ ID NO. 105 |
| AVGIVVPYSEDAWYSTL | SEQ ID NO. 106 |
| GIGRWYDQRKKEEGL | SEQ ID NO. 107 |
| NAAPWGSYHPQTDIVS | SEQ ID NO. 108 |
| NAAPWGSYSPGPGDIAS | SEQ ID NO. 109 |
| NGAPWGDHAPVVGS | SEQ ID NO. 110 |
| NGAPWGDIAPVAVS | SEQ ID NO. 111 |
| NPAPWGDYTATDFHS | SEQ ID NO. 112 |
| QLGIHPGAF | SEQ ID NO. 113 |
| QVGRYVSGVDYQP | SEQ ID NO. 114 |
| QVGRYVSGVYYQP | SEQ ID NO. 115 |
| VIGRGGYAMGDRRL | SEQ ID NO. 116 |
| VIGRRGYAMGDRTL | SEQ ID NO. 117 |
| VVGRRGYAMGSRQL | SEQ ID NO. 118 |

The relationship among CDR3 sequences from animals A1 and A2 is shown as a Venn diagram in FIG. 18.

Antibody sequences shared between VHH2 (long-hinged) and VHH3 (short-hinged) sequences. In the A1 alpaca, 6 VHH sequences can be found having either a long region or a short hinge region. As shown in FIG. 19A an original pool of 249 sequences is found and 135 of them are found to have hinge sequences. Among these 26 nonredundant sequences with long hinge sequences and 89 with short hinge sequences are found. Of these, 19 unique CDR3 sequences have long hinge sequences, and 53 unique CDR3 sequences have short hinge sequences. Among these two groups, 6 CDR3 sequences are found to be shared.

Similar consideration of the amino acid sequences of clones from animal A2 identifies 2 sequences that are shared by A2 animals in both the long-hinged or short hinged pool as shown in FIGS. 20A and 20B.

Altogether, 8 sequences in A1 and A2 animals are found to be in both of a long hinge sequence pool and in a short hinge sequence pool.

Convergent sequences between traditional antibodies in alpaca (VH) and VHH2/VHH3. 19 single chain antibodies are identified from the 2 animals that show good binding to human BCMA. Surprisingly, the 2 VHH sequences shared by long and short hinge pools, named as 1A1 and 1D2, are also shared by the leads from the traditional VH repertoire. The number of sequences shared by the different classes of antibodies are shown in FIG. 21A. The 8 VHH CDR3 sequences shared by either a long or a short hinge are shown in FIG. 21B, with the highlighted sequences being shared by all VH/VHH2 and VHH3.

Shared sequences are shown to be potent BCMA binders. To test if overlapping sequences are preferred signatures, the antibodies expressed by the 8 convergent VHH clones shared by VHH2 and VHH3 are purified. All found to be potent BCMA binders, either by ELISA or by flow cytometry. The highlighted sequences in FIG. 21B (SEQ ID NOS. 117 and 118), named as 1A1 and 1D2, are shared by both VH and VHH antibodies. The 8 convergent VHH antibodies are found to bind cells of tumor cell line RPMI8226 that overexpress BCMA, but not to 293T cells that are negative for BCMA expression. ELISA showed similar results using either His- or Fc-conjugated human BCMA as the coating antigen (Table 13).

TABLE 13

BCMA binding by selected antibodies

| | FACS on different Cell (MFI) | | ELISA (OD450) | | | | | | |
|---|---|---|---|---|---|---|---|---|---|
| Sample ID | RPMI8226 | 293T-EGFR | BCMA-His 1 ug/mL | BCMA-Fc 1 ug/mL | Anti-His 1 ug/mL | human IgG 1 ug/mL | PI | MW (kDa) | extinction coefficient |
| NBL507-A1L1-P1R2-1A1-(1)-PME207-SEQF_A01.seq | 2418 | 230 | 2.37 | 2.47 | 2.10 | 0.03 | 8.66 | 12.9 | 1.68 |
| NBL507-A1L1-P1R2-1D2-(9)-PME207-SEQF_A02.seq | 1263 | 222 | 2.32 | 2.35 | 0.57 | 0.02 | 8.91 | 12.8 | 1.16 |
| NBL507-A1L1-P1R2-1E2-(10)-PME207-SEQF_B02.seq | 2553 | 227 | 2.37 | 2.53 | 2.44 | 0.03 | 8.72 | 12.6 | 1.92 |
| NBL507-A1L1-P1R2-1B6-(31)-PME207-SEQF_G04.seq | 864 | 216 | 2.25 | 2.52 | 1.96 | 0.03 | 7.96 | 12.7 | 1.70 |
| NBL507-A1L1-P1R2-1B8-(44)-PME207-SEQF_D06.seq | 1808 | 219 | 2.27 | 2.47 | 1.79 | 0.01 | 6.76 | 12.7 | 1.90 |
| NBL507-A1L1-P1R2-1G8-(48)-PME207-SEQF_H06.seq | 4172 | 236 | 2.42 | 2.60 | 2.06 | 0.01 | 8.68 | 13.1 | 1.54 |
| NBL507-A2L1-P1R2-1C1-(273)-PME207-SEQF_E11.seq | 764 | 222 | 2.28 | 3.12 | 0.71 | 0.03 | 6.77 | 12.8 | 1.81 |

TABLE 13-continued

BCMA binding by selected antibodies

| Sample ID | FACS on different Cell (MFI) | | ELISA (OD450) | | | | PI | MW (kDa) | extinction coefficient |
|---|---|---|---|---|---|---|---|---|---|
| | RPMI8226 | 293T-EGFR | BCMA-His 1 ug/mL | BCMA-Fc 1 ug/mL | Anti-His 1 ug/mL | human IgG 1 ug/mL | | | |
| NBL507-A2L1-P1R2-1H1-(275)-PME207-SEQF_G11.seq | 532 | 222 | 2.11 | 3.30 | 0.98 | 0.04 | 7.95 | 12.7 | 1.70 |

NBL507-A1L1-P1R2-1A1-(1)-PME207-SEQF_A01 SEQ ID NO. 131
NBL507-A1L1-P1R2-1D2-(9)-PME207-SEQF_A02 SEQ ID NO. 132
NBL507-A1L1-P1R2-1E2-(10)-PME207-SEQF_B02 SEQ ID NO. 133
NBL507-A1L1-P1R2-1B6-(31)-PME207-SEQF_G04 SEQ ID NO. 134
NBL507-A1L1-P1R2-1B8-(44)-PME207-SEQF_D06 SEQ ID NO. 135
NBL507-A1L1-P1R2-1G8-(48)-PME207-SEQf_H06 —
NBL507-A2L1-P1R2-1C1-(273)-PME207-SEQF_E11 SEQ ID NO. 136
NBL507-A2L1-P1R2-1H1-(275)-PME207-SEQF_G11 SEQ ID NO. 137

Overlapping sequence signature. Finally, the 2 sequences shared by VH/VHH2/VHH3 are also be found in both of the A1 and A2 animals (see FIG. 22). Therefore, picking those sequences which are found in multiple animals/VH/VHH germlines is considered to be a useful signature of antibodies that exhibit strong, specific binding to their antigen.

Data to support additional signatures. The affinity of classical VHH and nonclassical VHH for binding to human BCMA is examined. Classical VHH have higher affinity than nonclassical VHH. The results are shown in FIG. 23; $P<0.05$.

Additional Signature Statistics

FR2 hydrophilic region: for most of VHH antibodies, FR2 has unique amino acid substitutions compared to conventional IgG: 37Phe/Tyr, 44Glu, 45Arg, and 47Gly. FIG. 24 shows the proportion of clones having these FR2 unique amino acids of VHH antibodies in each of three libraries, each against a different antigen (NBL501 (anti-MSLN), NBL504 (anti-PD1) and NBL602 (anti-KLH)). Surprisingly, we only found up to 8% of the whole VHH repertoire of clones in these three libraries includes this particular FR2 substitution pattern. The frequency of the individual substitutions at position 37, 44, 45 and 47 (Kabat numbering) in the FR2 unique sequences is also examined, and these data are shown in FIG. 25.

Interestingly, the unique sequence substitutions are quite diversified. While at position 44 and 45, Glu and Arg are predominant amino acids, the positions 37 and 47 are variable. In the NBL501 anti-MSLN project, 70% of Tyr and 10% of Phe occupied position 37. In contrast, in anti-PD1 (NBL504) and anti-KLH projects (NBL602), 37Phe reached 70%, with 37Tyr is found at about 25%. A consistent high percentage of Leu instead of Glycine in position 47 is observed, and there are also a significant percentage of clones having Phe and Trp in this position. The signature amino acid Gly only accounts for less than 10% of the frequency in this position. Therefore, a signature for alpaca VHH FR2 is proposed as 37Phe/Tyr, 44Glu, 45Arg, and 47Gly/Leu/Phe Extended CDR1 and CDR2: VHHs have an extra hypervariable region (residues 27-30, according to Kabat's numbering) next to CDR1. VHH antibodies with this region together with a long CDR3 region have increased the surface area interacting with antigen. However, antibodies having this signature are not often seen.

The CDR2 domain is normally 5-9 amino acids in length. However, many clones contain a "long CDR2" with a length of 14-17 amino acids. Importantly, VHH containing a long CDR2 are found to have a higher binding affinity for their antigen than those with a shorter CDR2. ELISA data from antibodies from three different libraries are shown in FIG. 27.

Extra disulfide bond within CDR3: around 5-10% of VHH antibodies have an extra disulfide bond within the CDR3 domain, which may indicate that the epitope bound by the antibody is a more "conformational" recognition site that is formed from the three-dimensional structure of the antigen rather than a short length of a linear amino acid sequence. About 2-19% of CDR3 contain intra-disulfide bonds. FIG. 28 shows the proportion in the three libraries of antibodies having an extra disulfide bond within the CDR3 domain (identified as an additional Cys residue—i.e. 2 cysteine amino acids in CDR3). The NBL504 anti-PD1 library contains a high percentage antibodies having a long CDR3 domain, and it contains significantly more CDR3 intra-disulfide bonds than the other two libraries, which have such clones at about 2%.

Extra disulfide bond between CDR1 and CDR2: Although low in frequency, antibodies having an extra disulfide bond between CDR1 and CDR2 can be found, as an extra Cys amino acid CDR1 or CDR2. See, FIGS. 29 and 30.

Extra disulfide bond between CDR1-CDR3 or FR2-CDR3: In camel and dromedary, 82% of VHH antibodies have a disulfide bond between CDR1 and CDR3, and in Llama and Alpaca, 74% of VHH antibodies have a disulfide bond between FR2-CDR3. 70-80% of the VHH antibody sequences do not contain additional disulfide bonds. 10-25% of the VHH sequences might contain an additional disulfide bond (4 cysteines in the sequence). Interestingly, 5-10% of the VHH antibody sequences contain an unpaired cysteine. How and if these VHH antibodies can pair with another VHH antibody by forming a disulfide bond between unpaired cysteines is unknown. A total of up to 7 cysteine in a single VHH sequence has been observed. These data suggest that up to 3 intra-domain disulfide bonds can be formed with a remaining unpaired cysteine. FIG. 31 shows analysis of the number of cysteine residues in amino acid sequences of selected VHH antibodies in three different libraries.

Extra disulfide bond between CDR1 and CDR3 can be seen but this is rare. See FIG. 32.

Most of the extra disulfide bonds in VHH antibodies are between FR2/CDR2-CDR3. Consistent with the total cysteine number calculation, most of the additional disulfide bonds are between FR2/CDR2 (depending on nomenclature of either IMGT or KABAT) and CDR3. The additional paired cysteines are between 2-9 percent of all the VHH sequences in the NGS database. See, FIG. 33.

A significant negative correlation of the supernatant OD value by a clone to the number of cysteines in its amino acid sequence is observed (see, FIG. 34). Accordingly, in picking clones, it is recommended to usually avoid an odd numbers of cysteine in the VHH amino acid sequence. Furthermore, it is preferred to avoid picking VHH sequences containing more than 1 pair of cysteine sequences. The extra disulfide bonds can either affect the expression yield of the VHH or have a negative effect on the affinity of binding. Thus, additional disulfide bonds can adversely affect the developability of downstream manufacturing of nanobodies.

Long CDR3: In a PD1 NGS library (NBL504), up to 86% of the VHH clones have a "long CDR3" domain having more than 15 amino acids. See, FIG. 35.

FIG. 36, FIG. 37 and FIG. 38 show that there is a positive correlation between length of the CDR3 domain and antibody affinity assayed by FACS for VHH anti-BCMA antibodies binding to the surface of cells from two different cell lines (CHO.K1 and RPMI8226) expressing BCMA and by ELISA using supernatant. All correlations have p value equal to 0.001 or smaller. CDR3 length is consistently shown to have a significant correlation with binding affinity of the antibody to its antigen. Accordingly it is preferable to select antibodies having a CDR3 domain length longer than 14 amino acids if there are a large number of clones that might be picked.

CDR3 variants with a similar length are observed to be likely binding to a similar epitope of a single antigen. We have observed a narrow range of CDR3 length for a populations of VHH antibodies binding to nearly identical epitopes or the same epitope of a certain antigen. See, FIG. 39.

Furthermore, antibodies binding to the same epitopes can be identified by lineage-related sequences. For example, clones with CDR3 length difference of 0 or 1 amino acids. Clones 1182, 1202 and 1734 are picked from same lineage of anti-PD1 antibodies, and they all compete with Keytruda for PD1 binding (see, FIG. 40). It is seen that clones picked from related lineages with a same length of CDR3 are in the same bin. The experiments disclosed herein suggest that lineage-related clones having same length CDR3 domains will have an increased chance of binding to exactly the same epitope. In picking clones based on NGS data it is preferred to reduce the number of such redundant clones in the selected pool.

Non-classic VHH which have the same V and J germlines as conventional IgG: VHH lineage groups that share the same naïve B-cell origin (same V and J assignment) with conventional IgG1, are indicated as recognizing the same or a similar epitope whether being a VHH antibody or an IgG1 antibody. In the 507 library there are 2 out of 81 sequences that are shared by VHH2/VHH3/VH, about 2.5% of the clones.

Non-classic VHH which have unique sequence signatures—conserved Trp118 substituted with Arg118 and or lower hydrophobicity profile in FR3: Trp 118 can be found in each of the NBL501, NBL504 and NBL602 libraries, with a percentage up to 3%. See, FIG. 41.

Overall, the data described above suggest the following clone selection rules:
1. If a single animal is immunized, pick the VHH sequences shared by VHH2 and VHH3. If the VHVL is investigated, pick those shared between VH and VHH.
2. Convergent motif or sequence signature: different animals in the same experimental group could convergently generate the same motif or sequence signature through the same VDJ assignment. Paratope coded by these motifs or sequence signatures may target the functional epitopes. If multiple animals are immunized, pick convergent sequences shared between animals.
3. FR2 hydrophilic region: for most of VHH antibodies, FR2 has unique amino acids substitutions for conventional IgG: 37Phe/Tyr, 44Glu, 45Arg, and 47Gly/Leu/Phe.
4. Non-classic VHH which have unique sequence signatures: conserved Trp118 substituted with Arg118 and or lower hydrophobicity profile in FR4.
5. Classical VHH have higher affinity than nonclassical. When picking clones, we should prefer picking classical VHHs. Nonclassic VHH which do not contain FR2 signatures.
6. Avoiding picking clones with odd number of cysteines in the sequence: We have picked one clone for synthesis with 3 cysteines. It failed to express. Several screened clones with 3 cysteines have below average expression.
7. In conventional antibodies, people found continues residues of positive or negative charges in CDR3 will cause folding issue. In VHH, we have picked one clone with 3 Rs in CDR3, the clone failed to express. Several screened clones with three continue positive charges (K or R or mix of them) have below average expression. Avoid picking clones with 3 or more continue positive charges in CDR3.
8. To avoid clones with positive charge at N-terminus. We picked such two clones and both of them failed to express. Almost no screened clones with positive charge at the n-terminus.
9. Some alpaca has VHH with long CDR2 (17 aa instead of 8/9), clones with such long CDR2 appear to have high binging affinity.
10. For some projects, CDR3 length has positive correlation with binding affinity, pick long CDR3 clusters with priority.
11. For the related cluster with a similar CDR3 length, avoid picking too many redundant candidates as we found that homologus CDR3 at a similar length lead to binding to a similar epitopes.
12. Convergent motif or sequence signature: different animals in the same experimental group could convergently generate the same motif or sequence signature through the same VDJ assignment. Paratope coded by these motifs or sequence signatures may target the functional epitopes.
13. Novel canonical binding loop structure: the hypermutation hotspots residing at key-sites to determine the canonical loop structures create an interesting potential to diversify the VHH structural repertoire. Crystallographic studies accentuate that the CDR1 and CDR2 loops of camel VHHs often deviate from the known canonical structures of the conventional VH. Sequence-based new Ag-binding loop conformation prediction should support further grouping the lineage (Laura S. Mitchell, Lucy J. Colwell, Comparative analysis of nanobody sequence and structure data, Proteins. 2018; 86:697-706).

REFERENCES

Daley L P, Kutzler M A, et al. Effector functions of camelid heavy-chain antibodies in immunity to West Nile virus. Clin. Vaccine Immunol. 17:239-46, 2010.

McCoy L E, et al. Potent and broad neutralization of HIV-1 by a llama antibody elicited by immunization. J. Exp. Med. 2012.

Cristina Basilico, et al. Four individually druggable MET hotspots mediate HGF-driven tumor progression, The Journal of Clinical Investigation, Volume 124 Number 7 July, 2014.

Basvan der Woninga, et al. DNA immunization combined with scFv phage display identifies antagonistic GCGR specific antibodies and reveals new epitopes on the small extracellular loops, MABS, VOL. 8, NO. 6, 1126-1135, 2016.

Laura M. Griffin et al. Analysis of heavy and light chain sequences of conventional camelid antibodies from *Camelus dromedarius* and *Camelus bactrianus* species, Journal of Immunological Methods Volume 405, Pages 35-46, March 2014.

Adhdi Arbabi-Ghahroudi, et al. camelid single-Domain Antibodies: Historical Perspective and Future Outlook, Frontiers in Immunology, Vol 8, 2017.

Viet Khong Nguyen, et al. Camel heavy-chain antibodies: diverse germline VHH and specific mechanism enlarge the antigen-binding repertoire The EMBO Journal Vol. 19 No. 5 2000

Mehdi Arbabi-Ghahroudi. Camelid Single-Domain Antibodies: Historical Perspective and Future Outlook. Front. Immunol., 20 Nov. 2017.

Nguyen V K, et al. Heavy-chain antibodies in Camelidae; a case of evolutionary innovation. Immunogenetics 54:39-47, 2002.

Conrath K E, et al. Emergence and evolution of functional heavy-chain antibodies in Camelidae. Dev Comp Immunol 27:87-103, 2003.

Nick Deschacht, et al. A Novel Promiscuous Class of Camelid Single-Domain Antibody Contributes to the Antigen-Binding Repertoire, The Journal of Immunology. 184(10) 5696-5704, May 2010.

Cortez-Retamozo V, et al. Efficient tumor targeting by single-domain antibody fragments of camels. Int J Cancer. 98(3):456-62, 2002.

Alex Klarenbeek, et al. Camelid Ig V genes reveal significant human homology not seen in therapeutic target genes, providing for a powerful therapeutic antibody platform, mAbs 7:4, 693-706; 2015.

Tomoyuki Igawa, et al. Engineering the variable region of therapeutic IgG antibodies. mAbs 3:3, 243-252; 2011.

Laura S. Mitchell, Lucy J. Colwell, Comparative analysis of nanobody sequence and structure data, Proteins. 2018; 86:697-706.

Maass D R, Sepulveda J, Pernthaner A, Shoemaker C B. Alpaca (*Lama pacos*) as a convenient source of recombinant camelid heavy chain antibodies (VHHs). J Immunol Methods. 2007; 324(1-2):13-25.

---

What is claimed is:

1. A method generating a camelid antibody specific for an antigen, comprising:
    a) enriching and proliferating B-cells from immunized camelids specific to the antigen;
    b) generating antibody NGS libraries comprising $VHH^2$, $VHH^3$, and $VH^1$ chain sequences from the antigen-specific B-cells;
    c) grouping antibody sequences of $VHH^2$, $VHH^3$, and $VH^1$ chain in the NGS libraries by lineages;
    d) subgrouping the lineages in step c) by one or more VHH unique features selected from a group consisting of
        i) FR2 hydrophilic region,
        ii) extended CDR1,
        iii) extra disulfide bond between CDR1-CDR3 or FR2-CDR3,
        iv) extra disulfide bond within CDR3,
        v) long CDR3 (12 amino acids or more),
        vi) extra disulfide bond within CDR1,
        vii) non-classic VHH which have the same V and J germlines as conventional IgG1,
        viii) non-classic VHH which have predetermined sequence signatures,
        ix) predetermined novel canonical binding loop structure, and
        x) convergent motif or sequence signature among the individuals of the immunized camelids;
        xi) long CDR2 (14-17 amino acids);
        xii) absence of 3 or more continuing positive charges in CDR3;
        xiii) absence of positive charge at N-terminus;
        xiv even number of cysteines in the sequence; and
        xv) 2-4 amino acid motifs in the CDR regions, wherein the motif is identified from the 3D structures of a ligand/receptor complex;
    e) ranking the lineages from step d) by one or more lineage priority factors;
    f) selecting a representative sequence from a lineage comprising a $VHH^2$ or $VHH^3$ with a top ranking from step e) in the NGS library; and
    g) testing an antibody comprising the selected sequence from step f) to determine if the antibody binds to the antigen or portion thereof.

2. The method for generating a camelid antibody according to claim 1, wherein minimal CDR3 distance of a specific CDR3 is equal or less than 1 among the group of CDR3s from a lineage, wherein minimal CDR3 distance of a specific CDR3 is the smallest hamming distance of such CDR3 comparing with all other CDR3 of the same length.

3. The method for generating a camelid antibody according to claim 1, wherein the lineage priority factors are selected from a group consisting of lineages from high to low sequences abundancy, lineages from high to low amplification factor, lineages sequences abundancy change during immunization course, lineages sequences abundancy change before and after depleting certain unwanted B cells, lineages which share the same naïve B-cell origin between VHH and $VH^1$, avoidance of developability liability sequences, and a combination thereof.

4. The method for generating a camelid antibody according to claim 1, wherein first top 100 lineages of $VHH^2$, and $VHH^3$ are chosen in step f).

5. The method for generating a camelid antibody according to claim 1, wherein the antibody in step g) is expressed by prokaryotic or eukaryotic cells.

6. The method for generating a camelid antibody according to claim 1, further comprising monitoring immune responses of camelid antibodies IgG2 (HcAb), IgG3 (HcAb) and IgG1 (conventional IgG).

7. The method for generating a camelid antibody according to claim 1, further comprising repeating steps f) an g) to optimize a sequence within the same lineage group of the selected $VHH^2$ or $VHH^3$ heavy chain only antibodies.

8. The method for generating a camelid antibody according to claim 1, wherein the antigen is a complex immunogen, further comprising:
    using an antibody which has been determined in step g) to bind with the complex immunogen to identify individual antigens included in the complex immunogen by protein array, cells/tissue antigen cDNA library, or mass spectrometry-based immunoprecipitation.

9. The method according to claim 1, wherein the camelid antibody is humanized.

* * * * *

SEQUENCE LISTING

```
<160> NUMBER OF SEQ ID NOS: 147

<210> SEQ ID NO 1
<211> LENGTH: 120
<212> TYPE: PRT
<213> ORGANISM: alpaca

<400> SEQUENCE: 1

Gln Val Gln Leu Val Glu Ser Gly Gly Gly Leu Val Gln Ala Gly Gly
1               5                   10                  15

Ser Leu Arg Leu Ser Cys Ala Ala Ser Gly Ala Val Ser Ser Ile Asn
            20                  25                  30

Ala Met Gly Trp Tyr Arg Gln Thr Pro Glu Lys Val Arg Lys Leu Val
        35                  40                  45

Ala Thr Met Gly Ser Gly Gly Asn Thr Tyr Tyr Ala Asp Ser Val Lys
    50                  55                  60

Gly Arg Phe Thr Ile Ser Arg Asp Tyr Ala Lys Asn Thr Val Ala Leu
65                  70                  75                  80

Gln Met Asn Asn Leu Ile Pro Glu Asp Thr Ala Val Tyr Tyr Cys Ala
                85                  90                  95

Ala Asp Lys Phe Gly Ala Asp Ile His Glu Val Asp Tyr Trp Gly Lys
            100                 105                 110

Gly Thr Leu Val Thr Val Ser Ser
        115                 120

<210> SEQ ID NO 2
<211> LENGTH: 118
<212> TYPE: PRT
<213> ORGANISM: alpaca

<400> SEQUENCE: 2

Gln Val Gln Leu Val Glu Ser Gly Gly Gly Leu Val Gln Ala Gly Gly
1               5                   10                  15
```

-continued

Ser Leu Arg Leu Ser Cys Ala Ala Ser Ile Ser Ile Arg Ile Asn
            20                  25                  30

Ala Met Gly Trp Tyr Arg Gln Ala Pro Gly Lys Glu Arg Glu Leu Val
            35                  40                  45

Ala Val Ile Ser Ser Pro Asn Lys Thr Leu Tyr Ala Asp Ser Val Lys
50                      55                  60

Gly Arg Phe Thr Ile Ser Lys Asp Asn Tyr Thr Asn Thr Leu Tyr Leu
65                  70                  75                  80

Gln Met Asn Ser Leu Lys Pro Glu Asp Thr Ala Met Tyr Tyr Cys Ser
                85                  90                  95

Ala Trp Arg Ile Gly Val Asp Thr Thr Asp Tyr Tyr Gly Gln Gly Thr
            100                 105                 110

Gln Val Thr Val Ser Ser
            115

<210> SEQ ID NO 3
<211> LENGTH: 126
<212> TYPE: PRT
<213> ORGANISM: alpaca

<400> SEQUENCE: 3

Gln Val Gln Leu Val Glu Ser Gly Gly Gly Leu Val Gln Pro Gly Gly
1               5                   10                  15

Ser Leu Arg Leu Ser Cys Ala Ala Ser Gly Ile Thr Leu Asp Tyr Tyr
            20                  25                  30

Ala Ile Gly Trp Phe Arg Gln Ala Pro Gly Lys Glu Arg Glu Gly Val
            35                  40                  45

Ser Cys Ile Ser Ser Ser Gly Gly Ser Thr Asn Tyr Ala Asp Ser Val
50                      55                  60

Lys Gly Arg Phe Thr Met Ser Arg Asp Asn Ala Lys Asn Thr Val Tyr
65                  70                  75                  80

Leu Gln Met Asn Ser Leu Lys Pro Glu Asp Thr Ala Val Tyr Tyr Cys
                85                  90                  95

Ala Ala Asp Ile His Cys Ser Gly Tyr Val Leu Phe Ser Pro Ser Asp
            100                 105                 110

Phe Gly Asn Trp Gly Gln Gly Thr Gln Val Thr Val Ser Ser
            115                 120                 125

<210> SEQ ID NO 4
<211> LENGTH: 120
<212> TYPE: PRT
<213> ORGANISM: alpaca

<400> SEQUENCE: 4

Glu Val Gln Val Val Glu Ser Gly Gly Gly Leu Val Gln Ala Gly Gly
1               5                   10                  15

Ser Leu Arg Leu Ser Cys Val Pro Ser Gly Ile Ser Ser Ile Tyr
            20                  25                  30

Ala Met Gly Trp Tyr Arg Gln Ala Leu Gly Pro Glu Arg Glu Leu Val
            35                  40                  45

Ala Ala Gln Thr Leu Gly Gly Gly Thr Tyr Tyr Ala Asn Pro Val Lys
50                      55                  60

Gly Arg Phe Thr Ile Tyr Arg Asp Asn Asp Lys Asn Thr Leu Tyr Leu
65                  70                  75                  80

Gln Met Asn Asn Leu Lys Pro Glu Asp Thr Ala Met Tyr Tyr Cys Ala
                85                  90                  95

Thr Pro Gly Glu His Trp Gly Ser Ser Asp Val Thr Asn Trp Gly Gln
            100                 105                 110

Gly Thr Gln Val Thr Val Ser Ser
        115                 120

<210> SEQ ID NO 5
<211> LENGTH: 119
<212> TYPE: PRT
<213> ORGANISM: alpaca

<400> SEQUENCE: 5

Glu Val Gln Val Val Glu Ser Gly Gly Gly Leu Val Gln Ala Gly Gly
1               5                   10                  15

Ser Leu Arg Leu Ser Cys Ala Ala Ser Gly Gly Ile Ser Gly Asp Asp
            20                  25                  30

His Met Gly Trp Tyr Arg Gln Ala Pro Gly Lys Ala Gln Glu Arg
        35                  40                  45

Asp Leu Val Ala Ala Phe Ser Asn Val Gly Lys Ala Tyr Tyr Ala Asp
    50                  55                  60

Ser Val Lys Gly Arg Phe Thr Ile Ser Arg Asp Asn His Asn Asn Thr
65                  70                  75                  80

Leu Tyr Leu Gln Met Asn Ser Leu Lys Pro Asp Asp Thr Ala Met Tyr
                85                  90                  95

Tyr Cys Ala Ala Trp Ser Pro Arg His Pro Thr Tyr Tyr Gly Gln Gly
            100                 105                 110

Thr Gln Val Thr Val Ser Ser
        115

<210> SEQ ID NO 6
<211> LENGTH: 122
<212> TYPE: PRT
<213> ORGANISM: alpaca

<400> SEQUENCE: 6

Gln Val Gln Leu Val Glu Ser Gly Gly Gly Leu Val Gln Ala Gly Gly
1               5                   10                  15

Ser Leu Arg Leu Ser Cys Ala Ala Ser Gly Ser Ala Asp Ser Ile Pro
            20                  25                  30

Ala Met Gly Trp Tyr Arg Gln Ala Pro Gly Lys Glu Arg Glu Tyr Leu
        35                  40                  45

Ala Ala Ile Ser Ser Gly Thr Asn Thr Tyr Tyr Ala Ser Ser Ala Lys
    50                  55                  60

Gly Arg Phe Ala Ile Ser Arg Asn Asn Ala Asn Asn Thr Leu Tyr Leu
65                  70                  75                  80

Gln Met Asn Ser Leu Lys Pro Glu Asp Thr Ala Met Tyr Tyr Cys Ala
                85                  90                  95

Thr Cys Ser Ser Tyr Tyr Tyr Cys Ser Gly Pro Tyr Val Arg Ser Trp
            100                 105                 110

Gly Gln Gly Thr Gln Val Thr Val Ser Ser
        115                 120

<210> SEQ ID NO 7
<211> LENGTH: 121
<212> TYPE: PRT
<213> ORGANISM: alpaca

<400> SEQUENCE: 7

Gln Val Gln Leu Val Glu Ser Gly Gly Gly Leu Val Gln Pro Gly Gly

```
              1               5                  10                 15
            Ser Leu Thr Leu Ser Cys Ala Ala Ser Gly Phe Thr Phe Ser Ser Tyr
                            20                  25                 30

Tyr Met Ser Trp Val Arg Gln Ala Pro Gly Lys Gly Pro Glu Trp Val
                            35                  40                 45

Ser Ile Ile Ser Thr Gly Gly Ala Ser Thr Val Tyr Thr Asp Ser Val
                            50                  55                 60

Lys Gly Arg Phe Thr Ala Ser Arg Asp Asn Ala Lys Asn Thr Leu Tyr
             65                 70                  75                 80

Leu Gln Met Asn Ser Leu Lys Pro Glu Asp Thr Ala Leu Tyr Tyr Cys
                            85                  90                 95

Val Arg Gly Asn Ser Arg Ser Gly Leu Ile Pro Arg Ala Tyr Trp Gly
                           100                 105                110

Gln Gly Thr Gln Val Thr Val Ser Ser
                           115                 120
```

<210> SEQ ID NO 8
<211> LENGTH: 115
<212> TYPE: PRT
<213> ORGANISM: alpaca

<400> SEQUENCE: 8

```
            Gln Val Gln Leu Val Glu Ser Gly Gly Gly Leu Val Gln Ala Gly Gly
             1               5                  10                 15

Ser Leu Arg Leu Ser Cys Val Ala Ser Gly Ile Val Phe Arg Leu Asn
                            20                  25                 30

Ala Met Gly Trp Phe Arg Gln Ala Pro Gly Arg Glu Arg Glu Leu Val
                            35                  40                 45

Ala Thr Ile Ala Ser Gly Gly Trp Ala Tyr Tyr Gly Asp Thr Met Ser
                            50                  55                 60

Gly Arg Val Thr Ile Ser Arg Asp Asn Asp Lys Asn Thr Leu Tyr Leu
             65                 70                  75                 80

Glu Met Asn Ser Leu Lys Pro Glu Asp Ser Ala Met Tyr Tyr Cys Ser
                            85                  90                 95

Ala Gly Gly Ala Arg Pro His Ser Trp Gly Gln Gly Thr Gln Val Thr
                           100                 105                110

Val Ser Ser
                           115
```

<210> SEQ ID NO 9
<211> LENGTH: 115
<212> TYPE: PRT
<213> ORGANISM: alpaca

<400> SEQUENCE: 9

```
            Glu Val Gln Val Val Glu Ser Gly Gly Gly Leu Val Gln Ala Gly Gly
             1               5                  10                 15

Ser Leu Arg Leu Ser Cys Val Ala Ser Gly Phe Thr Phe Ser Val Ala
                            20                  25                 30

Ala Met Arg Trp Tyr Arg Gln Ala Pro Gly Lys Gln Arg Glu Trp Val
                            35                  40                 45

Ala Ser Ala Phe Ser Asp Gly Asn Leu His Tyr Glu Asp Phe Val Lys
                            50                  55                 60

Gly Arg Phe Thr Ile Ser Arg Asp Asp Ala Lys Asn Thr Leu Tyr Leu
             65                 70                  75                 80

Gln Met Asp Ser Leu Lys Pro Glu Asp Thr Ala Val Tyr Tyr Cys Asn
```

```
                85                  90                  95
Ala Gly Thr Pro Ser Arg Ala Tyr Trp Gly Gln Gly Thr Gln Val Thr
            100                 105                 110

Val Ser Ser
        115

<210> SEQ ID NO 10
<211> LENGTH: 124
<212> TYPE: PRT
<213> ORGANISM: alpaca

<400> SEQUENCE: 10

Gln Val Lys Leu Glu Glu Ser Gly Gly Gly Leu Val Gln Ala Gly Gly
1               5                   10                  15

Ser Leu Arg Leu Ser Cys Val Ala Ser Gly Ser Ile Phe Ser Ile Asn
            20                  25                  30

Ala Met Gly Trp Tyr Arg Arg Ala Pro Gly Lys Glu Arg Glu Leu Val
        35                  40                  45

Ala Ser Ile Ser Ser Asp Gly Ser Ile Tyr Tyr Ala Asp Ser Val Lys
    50                  55                  60

Gly Arg Phe Thr Ile Ser Arg Asp Asn Ala Lys Asn Thr Leu Tyr Leu
65                  70                  75                  80

Gln Met Asn Ser Leu Lys Pro Glu Asp Thr Ala Met Tyr Asp Cys Ala
                85                  90                  95

Ala Leu Gly Val Val Asn Val Gly Val Arg Pro Thr Leu Glu Tyr Ile
            100                 105                 110

Tyr Trp Gly Gln Gly Thr Gln Val Thr Val Ser Ser
        115                 120

<210> SEQ ID NO 11
<211> LENGTH: 124
<212> TYPE: PRT
<213> ORGANISM: alpaca

<400> SEQUENCE: 11

Gln Val Gln Leu Val Glu Ser Gly Gly Gly Leu Val Gln Ala Gly Gly
1               5                   10                  15

Ser Leu Arg Leu Ser Cys Ala Val Phe Gly Asn Thr Gly Ala Ile His
            20                  25                  30

Ala Met Ala Trp Tyr Arg Gln Ala Pro Gly Lys Gln Arg Glu Val
        35                  40                  45

Ala Arg Ile Ser Phe Gly Asp Gly Arg Thr Val Tyr Gly Asp Ser Val
    50                  55                  60

Lys Gly Arg Phe Thr Ile Ser Gly Asp Ala Lys Asn Thr Met Tyr
65                  70                  75                  80

Leu Gln Met Asn Ile Leu Lys Ala Glu Asp Thr Ala Glu Tyr Tyr Cys
                85                  90                  95

Asn Ala Val Phe Leu Gly Ile Gly Pro Thr Gly Arg Phe Glu Tyr Glu
            100                 105                 110

Tyr Trp Gly Gln Gly Thr Gln Val Thr Val Ser Ser
        115                 120

<210> SEQ ID NO 12
<211> LENGTH: 120
<212> TYPE: PRT
<213> ORGANISM: alpaca

<400> SEQUENCE: 12
```

```
Gln Val Gln Leu Val Glu Thr Gly Gly Gly Leu Val Gln Ala Gly Gly
1               5                   10                  15

Ser Leu Arg Leu Ser Cys Ala Ala Ser Gly Ala Val Ser Ser Ile Asn
            20                  25                  30

Ala Met Gly Trp Tyr Arg Gln Thr Pro Glu Lys Val Arg Lys Leu Val
        35                  40                  45

Ala Thr Met Gly Ser Gly Gly Asn Thr Tyr Tyr Ala Asp Ser Val Lys
    50                  55                  60

Gly Arg Phe Thr Ile Ser Arg Asp Tyr Ala Lys Asn Thr Val Ala Leu
65                  70                  75                  80

Gln Met Asn Asn Leu Ile Pro Glu Asp Thr Ala Val Tyr Tyr Cys Ala
            85                  90                  95

Ala Asp Lys Phe Gly Ala Asp Ile His Glu Val Asp Tyr Trp Gly Lys
        100                 105                 110

Gly Thr Leu Val Thr Val Ser Ser
            115                 120

<210> SEQ ID NO 13
<211> LENGTH: 123
<212> TYPE: PRT
<213> ORGANISM: alpaca

<400> SEQUENCE: 13

Gln Val Gln Leu Val Glu Ser Gly Gly Gly Leu Val Gln Ala Gly Gly
1               5                   10                  15

Ser Leu Arg Leu Ser Cys Ala Ala Ser Gly Leu Thr Phe Ser Asp Phe
            20                  25                  30

Ala Met Gly Trp Phe Arg Gln Ala Pro Gly Lys Glu Arg Glu Phe Val
        35                  40                  45

Ala Ala Ile Ser Trp Ser Gly Gly Gln Thr Tyr Asn Val Glu Ser Ala
    50                  55                  60

Lys Gly Arg Phe Thr Ile Ser Arg Asp Asn Ala Lys Asn Thr Val Tyr
65                  70                  75                  80

Leu Gln Met Asn Lys Leu Lys Pro Asp Asp Thr Ala Val Tyr Tyr Cys
            85                  90                  95

Ala Ala Ser Thr Met Val Val Thr Thr Val Ala Ala Asp Tyr Lys Tyr
        100                 105                 110

Trp Gly Gln Gly Thr Gln Val Thr Val Ser Ser
            115                 120

<210> SEQ ID NO 14
<211> LENGTH: 129
<212> TYPE: PRT
<213> ORGANISM: alpaca

<400> SEQUENCE: 14

Glu Val Gln Val Val Glu Ser Gly Gly Gly Leu Val Lys Thr Gly Asp
1               5                   10                  15

Ser Leu Arg Leu Ser Cys Ala Ala Ser Gly Gly Thr Ile Ser Gly Tyr
            20                  25                  30

Glu Met Gly Trp Phe Arg Gln Ala Pro Gly Lys Glu Arg Glu Phe Val
        35                  40                  45

Ala Gly Ile Ser Arg Asn Gly Arg Ser Thr Gly Tyr Ser Asp Ser Ala
    50                  55                  60

Lys Asp Arg Phe Thr Ile Ser Arg Asp Asn Ala Lys Asn Thr Val Tyr
65                  70                  75                  80
```

```
Leu Gln Met Asn Ser Leu Lys Pro Glu Asp Thr Ala Val Tyr Tyr Cys
                85                  90                  95

Ala Ala Gly Leu Lys Ala Asp Tyr Gly Asp Ser Tyr Val Asp Thr Ser
            100                 105                 110

Thr Arg Asn Tyr Asn Tyr Trp Gly Gln Gly Thr Gln Val Thr Val Ser
        115                 120                 125

Ser
```

<210> SEQ ID NO 15
<211> LENGTH: 125
<212> TYPE: PRT
<213> ORGANISM: alpaca

<400> SEQUENCE: 15

```
Gln Val Gln Leu Val Glu Ser Gly Gly Gly Leu Val Gln Ala Gly Gly
1               5                   10                  15

Ser Leu Arg Leu Ser Cys Ala Ala Ser Gly Gly Thr Phe Ser Arg Cys
            20                  25                  30

Thr Met Gly Trp Phe Arg Gln Ala Pro Gly Lys Glu Arg Glu Phe Val
            35                  40                  45

Ala Ala Ile Ser Trp Gly Gly Ser Ser Thr Tyr Tyr Ala Asp Ser Val
        50                  55                  60

Glu Gly Arg Phe Thr Ile Ser Arg Asp Asn Thr Lys Asn Thr Val Tyr
65                  70                  75                  80

Leu Gln Met Asp Ser Leu Lys Ser Glu Asp Thr Ala Val Tyr Tyr Cys
                85                  90                  95

Ala Ala Asp Tyr Asn Arg Leu Gln Ile Gly Gln Arg Ser Arg Asp Tyr
            100                 105                 110

Asp Tyr Trp Gly Gln Gly Thr Gln Val Thr Val Ser Ser
        115                 120                 125
```

<210> SEQ ID NO 16
<211> LENGTH: 125
<212> TYPE: PRT
<213> ORGANISM: alpaca

<400> SEQUENCE: 16

```
Gln Val Gln Leu Val Glu Ser Gly Gly Gly Leu Val Gln Ala Gly Gly
1               5                   10                  15

Ser Leu Arg Leu Ser Cys Ala Ala Ser Gly Gly Thr Phe Ser Arg Thr
            20                  25                  30

Thr Met Ala Trp Phe Arg Gln Ala Pro Gly Lys Glu Arg Glu Phe Val
            35                  40                  45

Ala Ala Ile Ser Trp Ala Gly Ser Ser Thr Val Tyr Ala Asp Ser Val
        50                  55                  60

Lys Gly Arg Phe Thr Ile Ser Arg Asp Asn Ala Lys Asn Thr Val Tyr
65                  70                  75                  80

Leu Tyr Met Asn Ser Leu Lys Pro Glu Asp Thr Ala Val Tyr Tyr Cys
                85                  90                  95

Ala Gly Arg Pro Phe Gly Leu Gln Leu Asp Thr His Gln Ala Asp Tyr
            100                 105                 110

Asn Ile Trp Gly Gln Gly Thr Gln Val Thr Val Ser Ser
        115                 120                 125
```

<210> SEQ ID NO 17
<211> LENGTH: 124

```
<212> TYPE: PRT
<213> ORGANISM: alpaca

<400> SEQUENCE: 17

Gln Val Gln Leu Val Glu Ser Gly Gly Gly Ser Ala Gln Ala Gly Gly
1               5                   10                  15

Ser Leu Arg Leu Ser Cys Thr Ala Ser Gly Arg Pro Phe Ser Ile Tyr
            20                  25                  30

Asp Met Gly Trp Phe Arg Gln Ala Pro Gly Lys Glu Arg Glu Ser Val
        35                  40                  45

Ala Val Ile Asn Leu Ser Arg Gly Asn Thr Tyr Tyr Ala Asp Ser Val
    50                  55                  60

Lys Gly Arg Phe Thr Ile Ser Leu Asp Ser Ala Lys Asn Thr Val Tyr
65                  70                  75                  80

Leu Gln Met Asn Ser Leu Lys Pro Glu Asp Thr Ala Val Tyr Ser Cys
                85                  90                  95

Gly Val Asp Arg Arg Gln Tyr Gly Leu Gly Ile Pro Pro Leu Ala Asp
            100                 105                 110

Tyr Trp Gly Gln Gly Thr Gln Val Thr Val Ser Ser
        115                 120

<210> SEQ ID NO 18
<211> LENGTH: 125
<212> TYPE: PRT
<213> ORGANISM: alpaca

<400> SEQUENCE: 18

Arg Gly Ala Gly Val Glu Ser Gly Gly Gly Leu Val Gln Ala Gly Gly
1               5                   10                  15

Ser Leu Ser Leu Ser Cys Ala Ala Ser Gly Leu Thr Phe Ser Asn Tyr
            20                  25                  30

Ala Met Ala Trp Phe Arg Gln Ala Pro Gly Lys Glu Arg Glu Phe Val
        35                  40                  45

Ala Gly Ile Asn Trp Lys Gly Asp Arg Thr Tyr Tyr Thr Asp Ser Val
    50                  55                  60

Lys Gly Arg Phe Thr Ile Ser Arg Asp Asn Ala Lys Asn Ser Thr Tyr
65                  70                  75                  80

Leu Gln Met Asn Ser Leu Lys Pro Asp Asp Thr Ala Val Tyr Tyr Cys
                85                  90                  95

Val Ala Asp Tyr Arg Val Trp Gly Thr Arg Ile Ala Gly Thr Lys Tyr
            100                 105                 110

Asp Ser Trp Gly Gln Gly Thr Gln Val Thr Val Ser Ser
        115                 120                 125

<210> SEQ ID NO 19
<211> LENGTH: 128
<212> TYPE: PRT
<213> ORGANISM: alpaca

<400> SEQUENCE: 19

Gln Val Gln Leu Val Glu Ser Gly Gly Gly Leu Val Gln Ala Gly Gly
1               5                   10                  15

Ser Leu Thr Leu Ser Cys Ala Ala Ser Gly Arg Thr Phe Asn Ser Tyr
            20                  25                  30

Ala Met Gly Trp Phe Arg Gln Ala Pro Gly Lys Glu Arg Glu Phe Val
        35                  40                  45

Ala Ala Ile Ser Gln Asn Gly Gly Ser Gln Gly Tyr Ala Glu Ala Val
```

```
                    50                  55                  60

Lys Asp Arg Phe Thr Ile Ser Arg Asp Asn Thr Asn Lys Val Val Ala
 65                  70                  75                  80

Leu Gln Met Asn Ser Leu Lys Pro Glu Asp Thr Ala Ala Tyr Tyr Cys
                     85                  90                  95

Ala Ala Asp Gly Asp Ala Ser Asp Arg Ser Tyr Ala Pro Pro Arg Asp
                100                 105                 110

Tyr Lys Tyr Glu Tyr Trp Gly Gln Gly Thr Gln Val Thr Val Ser Ser
            115                 120                 125

<210> SEQ ID NO 20
<211> LENGTH: 123
<212> TYPE: PRT
<213> ORGANISM: alpaca

<400> SEQUENCE: 20

Glu Val Gln Val Val Glu Ser Gly Gly Gly Leu Val Gln Ala Gly Gly
  1               5                  10                  15

Ser Leu Arg Leu Ser Cys Thr Ala Ser Gly Arg Thr Phe Ser Asn Tyr
                 20                  25                  30

Ala Met Gly Trp Phe Arg Gln Ala Pro Gly Lys Glu Arg Glu Phe Val
             35                  40                  45

Ala Ser Val Thr Trp Gly Gly Ser Gly Thr Phe Tyr Ala Asp Ser Val
         50                  55                  60

Lys Gly Arg Phe Thr Ile Ser Arg Asp Asn Ile Lys Asn Thr Val Tyr
 65                  70                  75                  80

Leu Gln Met Asn Ser Leu Lys Pro Glu Asp Thr Ala Val Tyr Tyr Cys
                 85                  90                  95

Ala Ala Asp Asn Val Gly Asp Ser Trp Tyr Ser Asp Ser Tyr Lys Tyr
            100                 105                 110

Trp Gly Gln Gly Thr Gln Val Thr Val Ser Ser
        115                 120

<210> SEQ ID NO 21
<211> LENGTH: 126
<212> TYPE: PRT
<213> ORGANISM: alpaca

<400> SEQUENCE: 21

Glu Val Gln Leu Gln Glu Ser Gly Gly Gly Leu Val Gln Ala Gly Gly
  1               5                  10                  15

Ser Leu Arg Leu Ser Cys Ala Ala Ser Gly Arg Ser Phe Ser Gly Tyr
                 20                  25                  30

Ala Met Ala Trp Phe Arg Gln Ala Pro Gly Lys Glu Arg Glu Phe Val
             35                  40                  45

Ala Ala Val Asn Trp Asn Gly Ser Thr Tyr Tyr Ala Asp Ser Val
         50                  55                  60

Lys Gly Arg Phe Thr Ile Ser Arg Asp Asn Ala Lys Asp Thr Val Tyr
 65                  70                  75                  80

Leu Gln Met Asn Ser Leu Lys Pro Glu Asp Thr Ala Val Tyr Tyr Cys
                 85                  90                  95

Asn Ala Arg Pro Thr Phe Gly Ala Tyr Tyr Ser Asp Tyr Lys Ser Gly
            100                 105                 110

Val Asp Tyr Trp Gly Gln Gly Thr Gln Val Thr Val Ser Ser
        115                 120                 125
```

```
<210> SEQ ID NO 22
<211> LENGTH: 119
<212> TYPE: PRT
<213> ORGANISM: alpaca

<400> SEQUENCE: 22

Glu Val Gln Leu Val Glu Ser Gly Gly Gly Leu Val Gln Pro Gly Ala
1               5                   10                  15

Ser Leu Arg Leu Ser Cys Thr Ala Ser Gly Ser Ile Phe Ser Ile Tyr
            20                  25                  30

Ala Met Gly Trp Tyr Arg Gln Ala Pro Gly Lys Gln Arg Glu Leu Val
        35                  40                  45

Ala Tyr Ile Thr Ser Gly Gly Ser Thr Thr Tyr Ala Asp Ser Val Lys
    50                  55                  60

Gly Arg Phe Thr Ile Ser Arg Asp Asn Ala Lys Asn Thr Val Tyr Leu
65                  70                  75                  80

Gln Met Asn Ser Leu Lys Pro Glu Asp Thr Ala Val Tyr Tyr Cys Asn
                85                  90                  95

Arg Gly Asn Tyr Tyr Arg Asp Tyr Lys Pro Glu Phe Trp Gly Gln Gly
            100                 105                 110

Thr Gln Val Thr Val Ser Ser
        115

<210> SEQ ID NO 23
<211> LENGTH: 125
<212> TYPE: PRT
<213> ORGANISM: alpaca

<400> SEQUENCE: 23

Glu Val Gln Val Val Glu Ser Gly Gly Gly Leu Val Gln Pro Gly Gly
1               5                   10                  15

Ser Leu Arg Leu Ser Cys Ala Ala Ser Gly Phe Thr Leu Asp His Tyr
            20                  25                  30

Asp Ile Gly Trp Phe Arg Gln Ala Pro Gly Lys Glu Arg Glu Ala Val
        35                  40                  45

Ser Cys Ile Ser Ser Ser Asp Gly Arg Thr Tyr Tyr Glu Asp Ser Val
    50                  55                  60

Lys Gly Arg Phe Thr Ile Ser Arg Asp Asn Ala Lys Asn Thr Val Tyr
65                  70                  75                  80

Leu Gln Met Asn Asn Leu Lys Pro Glu Asp Thr Ala Leu Tyr Arg Cys
                85                  90                  95

Thr Thr Glu Val Ala Cys Tyr Ser Asp Tyr Lys Ser Thr Gln Ile Ser
            100                 105                 110

Arg Ile Trp Gly Gln Gly Thr Gln Val Thr Val Ser Ser
        115                 120                 125

<210> SEQ ID NO 24
<211> LENGTH: 122
<212> TYPE: PRT
<213> ORGANISM: alpaca

<400> SEQUENCE: 24

Glu Val Gln Val Val Glu Ser Gly Gly Gly Leu Val Gln Pro Gly Gly
1               5                   10                  15

Ser Leu Arg Leu Ser Cys Ala Val Ser Gly Arg Gly Phe Ser Glu His
            20                  25                  30

Ala Met Gly Trp Tyr Arg Gln Ser Pro Gly Lys Gln Arg Glu Phe Val
        35                  40                  45
```

```
Ala Gly Val Thr Ser Tyr Gly Thr Asn Tyr Ala Asp Ser Val Lys
        50                  55                  60

Gly Arg Phe Thr Ile Ser Arg Asp Asn Val Asn Thr Val Phe Leu
 65                  70                  75                  80

Gln Met Asn Ser Leu Lys Pro Glu Asp Thr Ala Val Tyr Tyr Cys Asn
                85                  90                  95

Tyr Lys Arg Gly His Tyr Pro Asp Gly Val Ser Thr Tyr Glu Tyr Trp
            100                 105                 110

Gly Gln Gly Thr Gln Val Thr Val Ser Ser
            115                 120
```

<210> SEQ ID NO 25
<211> LENGTH: 122
<212> TYPE: PRT
<213> ORGANISM: alpaca

<400> SEQUENCE: 25

```
Glu Val Gln Val Val Glu Ser Gly Gly Ser Val Gln Pro Gly Gly
 1               5                  10                  15

Ser Leu Arg Leu Ser Cys Ala Ala Ser Gly Arg Gly Phe Thr Glu His
                20                  25                  30

Ala Met Gly Trp Tyr Arg Gln Ser Pro Gly Lys Glu Arg Glu Phe Val
            35                  40                  45

Ala Gly Ile Ser Ser Gly Ser Thr Tyr Tyr Ala Asp Ser Val Lys
        50                  55                  60

Gly Arg Phe Thr Val Ser Arg Asp Ser Ala Gly Asn Thr Val Ala Leu
 65                  70                  75                  80

Gln Met Asp Ser Leu Lys Pro Glu Asp Thr Ala Val Tyr Tyr Cys Ser
                85                  90                  95

Tyr Lys Arg Gly Arg Tyr Pro Asp Gly Val Ser Thr Leu Glu Tyr Trp
            100                 105                 110

Gly Gln Gly Thr Gln Val Thr Val Ser Ser
            115                 120
```

<210> SEQ ID NO 26
<211> LENGTH: 121
<212> TYPE: PRT
<213> ORGANISM: alpaca

<400> SEQUENCE: 26

```
Gln Val Gln Leu Val Glu Ser Gly Gly Leu Val Gln Pro Gly Gly
 1               5                  10                  15

Ser Leu Arg Leu Ser Cys Val Ala Ser Gly Phe Thr Phe Ser Ser Tyr
                20                  25                  30

Trp Met Tyr Trp Val Arg Gln Ala Pro Gly Lys Gly Leu Glu Trp Val
            35                  40                  45

Ser Ala Ile Asp Thr Thr Gly Gly Ser Thr Ala Tyr Thr His Ser Val
        50                  55                  60

Lys Gly Arg Phe Thr Ile Ser Arg Asp Asn Ala Arg Asn Thr Leu Tyr
 65                  70                  75                  80

Leu Gln Met Asn Asn Leu Lys Ser Glu Asp Thr Ala Val Tyr Tyr Cys
                85                  90                  95

Ala Asn Ser Thr Tyr Phe Asn Asp Pro Glu Tyr Asp Arg Trp Gly
            100                 105                 110

Gln Gly Thr Gln Val Thr Val Ser Ser
            115                 120
```

<210> SEQ ID NO 27
<211> LENGTH: 124
<212> TYPE: PRT
<213> ORGANISM: alpaca

<400> SEQUENCE: 27

Gln Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Ser Asn Tyr
            20                  25                  30

Ala Met Thr Trp Tyr Arg Gln Ala Pro Gly Lys Glu Arg Glu Leu Val
        35                  40                  45

Ala Ala Ile Ser Ser Ala Gly Tyr Thr Thr Thr Tyr Ala Gly Ser Val
    50                  55                  60

Lys Gly Arg Phe Thr Ile Ser Arg Asp Asn Ala Lys Asn Thr Val Tyr
65                  70                  75                  80

Leu Gln Met Asn Ser Leu Asn Pro Glu Asp Thr Ala Val Tyr Tyr Cys
                85                  90                  95

Asn Ala Gly Arg Leu Ser Tyr Gly Ser Tyr Tyr Pro Asn Asp Asp
            100                 105                 110

Tyr Trp Gly Gln Gly Thr Gln Val Thr Val Ser Ser
        115                 120

<210> SEQ ID NO 28
<211> LENGTH: 125
<212> TYPE: PRT
<213> ORGANISM: alpaca

<400> SEQUENCE: 28

Glu Val Gln Val Val Glu Ser Gly Gly Gly Leu Val Gln Ala Gly Gly
1               5                   10                  15

Ser Leu Arg Leu Ser Cys Ala Val Ser Gly Arg Thr Phe Ser Ser Tyr
            20                  25                  30

Val Met Gly Trp Phe Arg Gln Ala Pro Gly Lys Glu Arg Asp Phe Val
        35                  40                  45

Ala Ala Ile Ser Arg Ser Gly Gly Arg Thr Trp Tyr Ala Asp Ser Val
    50                  55                  60

Lys Gly Arg Phe Thr Ile Ser Phe Asp Asn Ala Lys Asn Thr Val Tyr
65                  70                  75                  80

Leu Gln Met Asn Ser Leu Lys Pro Glu Asp Thr Ala Ser Tyr Tyr Cys
                85                  90                  95

Asn Thr Asp Tyr Thr Phe Ala Lys Leu Thr Ala Pro Asp Arg Arg Asn
            100                 105                 110

Asp Asp Trp Gly Gln Gly Thr Gln Val Thr Val Ser Ser
        115                 120                 125

<210> SEQ ID NO 29
<211> LENGTH: 118
<212> TYPE: PRT
<213> ORGANISM: alpaca

<400> SEQUENCE: 29

Glu Val Gln Val Val Glu Ser Gly Gly Gly Leu Val Gln Ala Gly Gly
1               5                   10                  15

Ser Leu Arg Leu Ser Cys Ala Ala Ser Gly Asp Thr Ile Phe Ile Ser
            20                  25                  30

```
Ala Met Gly Trp Tyr Arg Gln Ala Pro Gly Lys Glu Arg Glu Leu Val
        35                  40                  45

Ala Ala Ile Thr Ser Gly Ser Thr Tyr Tyr Ala Asp Ser Val Lys
50                  55                  60

Gly Arg Phe Thr Ile Ser Arg Asp Asn Ala Lys Asn Thr Val Tyr Leu
65                  70                  75                  80

Gln Met Asn Ser Leu Lys Pro Glu Asp Thr Ala Val Tyr Tyr Cys Asn
                85                  90                  95

Ala Asp Thr Ile Ala Thr Met Thr Asp Asp Tyr Trp Gly Gln Gly Thr
                100                 105                 110

Gln Val Thr Val Ser Ser
            115
```

<210> SEQ ID NO 30
<211> LENGTH: 125
<212> TYPE: PRT
<213> ORGANISM: alpaca

<400> SEQUENCE: 30

```
Gln Val Gln Leu Val Glu Ser Gly Gly Gly Val Val Gln Pro Gly Gly
1               5                   10                  15

Ser Leu Thr Leu Ser Cys Ala Ala Ser Gly Ser Ser Phe Ser Ser Tyr
                20                  25                  30

Ala Met Ser Trp Tyr Arg Gln Ala Pro Gly Lys Glu Arg Glu Leu Val
        35                  40                  45

Ala Ala Met Thr Ala Pro Gly Gly Asp Ile Tyr Tyr Ala Asp Ser Val
50                  55                  60

Lys Gly Arg Phe Thr Ile Ser Arg Asp Asn Ala Arg Asn Ala Val Tyr
65                  70                  75                  80

Leu Arg Met Asn Ser Leu Lys Pro Glu Asp Thr Ala Met Tyr Tyr Cys
                85                  90                  95

Asn Ala Thr Arg Pro Arg Asp Asp Tyr Tyr Thr Gly Gly Phe Leu
                100                 105                 110

Tyr Tyr Trp Gly Gln Gly Thr Gln Val Thr Val Ser Ser
        115                 120                 125
```

<210> SEQ ID NO 31
<211> LENGTH: 123
<212> TYPE: PRT
<213> ORGANISM: alpaca

<400> SEQUENCE: 31

```
Gln Val Gln Leu Val Glu Ser Gly Gly Gly Leu Val Gln Ala Gly Gly
1               5                   10                  15

Ser Leu Arg Leu Ser Cys Ala Ala Ser Gly Arg Thr Phe Ser Ser Tyr
                20                  25                  30

Gly Met Gly Trp Phe Arg Gln Ala Pro Gly Lys Glu Arg Glu Phe Val
        35                  40                  45

Ala Ala Val Asn Trp Ser Asn Ser Ala Tyr Tyr Ala Asp Ser Val
50                  55                  60

Lys Asp Arg Phe Thr Ile Ser Ser Asp Asn Ala Lys Ser Thr Ile Tyr
65                  70                  75                  80

Leu Gln Met Asn Ser Leu Lys Pro Glu Asp Thr Ala Val Tyr Tyr Cys
                85                  90                  95

Arg Pro Tyr Ser Asp Tyr Val Thr Tyr Asp Pro Asp Tyr Asp Tyr
                100                 105                 110
```

```
Trp Gly Gln Gly Thr Gln Val Thr Val Ser Ser
        115                 120
```

<210> SEQ ID NO 32
<211> LENGTH: 123
<212> TYPE: PRT
<213> ORGANISM: alpaca

<400> SEQUENCE: 32

```
Gln Val Gln Leu Val Glu Ser Gly Gly Gly Leu Val Gln Ala Gly Gly
1               5                   10                  15

Ser Leu Arg Leu Ser Cys Ala Ala Ser Gly Arg Asn Phe Ser Ser Tyr
            20                  25                  30

Ala Met Gly Trp Phe Arg Gln Ala Pro Gly Lys Glu Arg Val Phe Val
        35                  40                  45

Ala Thr Ile Asn Trp Lys Gly Val Ser Thr Tyr Tyr Ala Pro Ser Val
    50                  55                  60

Lys Gly Arg Phe Thr Ile Ser Arg Asp Asn Ala Lys Asn Thr Val Tyr
65                  70                  75                  80

Leu Gln Met Asn Ser Leu Lys Pro Glu Asp Thr Ala Val Tyr Tyr Cys
                85                  90                  95

Asn Thr Asp Pro Asp Tyr Ser Asp Tyr Asp Met Tyr Val Arg Ser
            100                 105                 110

Trp Gly Gln Gly Thr Gln Val Thr Val Ser Ser
        115                 120
```

<210> SEQ ID NO 33
<211> LENGTH: 124
<212> TYPE: PRT
<213> ORGANISM: alpaca

<400> SEQUENCE: 33

```
Arg Gly Ala Gly Val Glu Ser Gly Gly Gly Leu Val Gln Ala Gly Asp
1               5                   10                  15

Ser Leu Arg Leu Ser Cys Ala Ala Ser Gly Arg Thr Phe Ser Thr Tyr
            20                  25                  30

Ala Thr Gly Trp Phe Arg Gln Ala Pro Gly Lys Glu Arg Glu Val Val
        35                  40                  45

Ala Ala Ile Ser Trp Asn Gly Gly Asn Thr Tyr Tyr Ala Ala Ser Gly
    50                  55                  60

Lys Gly Arg Phe Thr Ile Ser Arg Asp Asn Ala Lys Asn Thr Val Tyr
65                  70                  75                  80

Leu Gln Met Asn Ser Leu Lys Pro Glu Asp Thr Ala Val Tyr Tyr Cys
                85                  90                  95

Ala Ala Thr Asn Ser Asn Thr Asp Trp Arg Thr Tyr Thr Glu Tyr Asn
            100                 105                 110

Tyr Trp Gly Gln Gly Thr Gln Val Thr Val Ser Ser
        115                 120
```

<210> SEQ ID NO 34
<211> LENGTH: 126
<212> TYPE: PRT
<213> ORGANISM: alpaca

<400> SEQUENCE: 34

```
Gln Val Gln Leu Val Glu Thr Gly Gly Gly Leu Val Gln Ala Gly Gly
1               5                   10                  15

Ser Leu Arg Leu Ser Cys Ala Ala Ser Gly Arg Thr Phe Ser Ser Tyr
```

```
                 20                  25                  30

Ala Met Gly Trp Phe Arg Gln Ala Pro Gly Lys Glu Arg Asp Phe Val
            35                  40                  45

Ala Gly Ile Ser Gly Ser Gly Asn Thr Pro Tyr Ala Glu Ser Val
 50                  55                  60

Lys Gly Arg Phe Thr Ile Ser Arg Asp Asn Ala Lys Asn Thr Val Ala
 65                  70                  75                  80

Leu Gln Met Asn Ser Leu Lys Pro Glu Asp Thr Ala Val Tyr Tyr Cys
                85                  90                  95

Ala Ala Lys Phe Thr Ser Ser Phe Tyr Tyr Arg Ser Pro Arg Glu
            100                 105                 110

Tyr Ser Ser Trp Gly Gln Gly Thr Gln Val Thr Val Ser Ser
            115                 120                 125

<210> SEQ ID NO 35
<211> LENGTH: 127
<212> TYPE: PRT
<213> ORGANISM: alpaca

<400> SEQUENCE: 35

Gln Val Gln Leu Val Glu Ser Gly Gly Gly Leu Val Gln Pro Gly Gly
 1               5                  10                  15

Ser Leu Arg Leu Ser Cys Ala Ala Ser Gly Phe Thr Phe Ser Ser Tyr
            20                  25                  30

Val Met Ser Trp Val Arg Gln Ala Pro Gly Lys Gly Leu Glu Trp Val
            35                  40                  45

Ser Ala Ile Asn Ser Gly Gly Ser Ser Ser Tyr Pro Glu Ser Val
 50                  55                  60

Lys Asp Arg Phe Thr Val Ser Arg Asp Asn Ala Lys Asn Thr Leu Tyr
 65                  70                  75                  80

Leu Gln Met Asn Ser Leu Lys Pro Glu Asp Thr Ala Val Tyr Phe Cys
                85                  90                  95

Ala Ala Lys Asn Val Pro Gly Phe Tyr Tyr Ser Asp Tyr Ala Asn His
            100                 105                 110

Glu Tyr Asp Tyr Trp Gly Gln Gly Thr Gln Val Thr Val Ser Ser
            115                 120                 125

<210> SEQ ID NO 36
<211> LENGTH: 124
<212> TYPE: PRT
<213> ORGANISM: alpaca

<400> SEQUENCE: 36

Gln Val Gln Leu Val Glu Thr Gly Gly Gly Leu Val Gln Ala Gly Gly
 1               5                  10                  15

Ser Leu Arg Leu Ser Cys Ala Val Ser Gly Asp Thr Ile Phe Thr Ile
            20                  25                  30

Ala Ala Ala Trp Tyr Arg Gln Val Pro Gly Lys Glu Arg Glu Leu Val
            35                  40                  45

Ala Ala Ile Thr Ser Gly Gly Ala Thr Arg Tyr Ala Asp Ser Val Lys
 50                  55                  60

Gly Arg Phe Thr Ile Ser Arg Asp Asn Ala Lys Asn Thr Val Ala Leu
 65                  70                  75                  80

Gln Met Asn Ser Leu Lys Pro Glu Asp Thr Ala Val Tyr Tyr Cys Asn
                85                  90                  95

Ala Pro Lys Gly Gly Ser Tyr Tyr Phe Pro Ala Val Gly Gly Tyr Asp
```

```
                100               105               110
Tyr Trp Gly Gln Gly Thr Gln Val Thr Val Ser Ser
        115                 120

<210> SEQ ID NO 37
<211> LENGTH: 121
<212> TYPE: PRT
<213> ORGANISM: alpaca

<400> SEQUENCE: 37

Gln Val Gln Leu Val Glu Thr Gly Gly Gly Leu Val Gln Ala Gly Gly
1               5                   10                  15

Ser Leu Arg Leu Ser Cys Ala Ala Ser Gly Asp Thr Ile Phe Ile Ser
            20                  25                  30

Ser Met Ala Trp Tyr Arg Gln Ala Pro Gly Lys Glu Arg Glu Leu Val
        35                  40                  45

Ala Ser Ile Asp Ser Asp Asp Ile Ile Tyr Tyr Ala Ala Thr Val Lys
    50                  55                  60

Gly Arg Phe Thr Ile Ser Arg Asp Asn Asp Lys Pro Thr Met Tyr Leu
65                  70                  75                  80

Gln Met Asp Thr Leu Gln Pro Glu Asp Thr Ala Val Tyr Tyr Cys Arg
                85                  90                  95

Val Glu Ser Gln Asp Tyr Tyr Phe Asp Tyr Asp Arg Asp Ser Trp Gly
            100                 105                 110

Gln Gly Thr Gln Val Thr Val Ser Ser
        115                 120

<210> SEQ ID NO 38
<211> LENGTH: 117
<212> TYPE: PRT
<213> ORGANISM: alpaca

<400> SEQUENCE: 38

Glu Val Gln Val Val Glu Ser Gly Gly Gly Leu Val Gln Pro Gly Gly
1               5                   10                  15

Ser Leu Arg Leu Ser Cys Ala Ala Ser Gly Phe Ala Phe Ser Thr Tyr
            20                  25                  30

Gly Met His Trp Val Arg Gln Ala Pro Gly Lys Ala Val Glu Trp Val
        35                  40                  45

Ser Ala Ile Asp Asp Ile Gly Ala Tyr Ile Tyr Tyr Ala Asp Ser Val
    50                  55                  60

Lys Gly Arg Phe Thr Ile Ser Arg Asp Asn Ala Lys Asn Thr Leu Tyr
65                  70                  75                  80

Leu Gln Met Asn Ser Leu Lys Pro Glu Asp Thr Ala Leu Tyr Tyr Cys
                85                  90                  95

Ala Thr Gly Tyr Trp Tyr Thr Pro Gly Asp Trp Gly Gln Gly Thr Gln
            100                 105                 110

Val Thr Val Ser Ser
        115

<210> SEQ ID NO 39
<211> LENGTH: 116
<212> TYPE: PRT
<213> ORGANISM: alpaca

<400> SEQUENCE: 39

Gln Val Gln Leu Val Glu Ser Gly Gly Gly Leu Val Gln Pro Gly Glu
1               5                   10                  15
```

Ser Leu Arg Leu Ser Cys Ala Ala Ser Gly Phe Thr Phe Ser Ser Tyr
            20                  25                  30

Val Met Asn Trp Tyr Arg Gln Ala Pro Gly Lys Glu Arg Glu Leu Val
        35                  40                  45

Ala Ala Ile Asp Asn Val Gly Gly Ser Thr Asn Tyr Ala Asp Ser Val
    50                  55                  60

Lys Gly Arg Phe Thr Ile Tyr Arg Asp Asn Ala Lys Asn Thr Val Tyr
65                  70                  75                  80

Leu Gln Met Asn Ser Leu Lys Ser Glu Asp Thr Ala Val Tyr Tyr Cys
                85                  90                  95

Asn Ala Lys Arg Tyr Trp Tyr Asp Tyr Trp Gly Gln Gly Thr Gln Val
            100                 105                 110

Thr Val Ser Ser
        115

<210> SEQ ID NO 40
<211> LENGTH: 127
<212> TYPE: PRT
<213> ORGANISM: alpaca

<400> SEQUENCE: 40

Gln Val Gln Leu Val Glu Ser Gly Gly Gly Ser Val Gln Pro Gly Gly
1               5                   10                  15

Ser Leu Arg Leu Ser Cys Ala Val Ser Gly Phe Thr Leu Asp Tyr Tyr
            20                  25                  30

Asp Ile Gly Trp Phe Arg Gln Ala Pro Gly Lys Glu Arg Asp Trp Ile
        35                  40                  45

Ser Cys Ile Ser Ser Ser Asp Gly Ser Gln Tyr Tyr Ala Asp Ser Val
    50                  55                  60

Lys Asp Arg Phe Phe Ile Ser Arg Asp Asn Ala Lys Asn Thr Val Tyr
65                  70                  75                  80

Leu Gln Met Asn Ser Leu Glu Pro Gly Asp Thr Ala Val Tyr Tyr Cys
                85                  90                  95

Ala Ala Asp Phe Asp Thr Tyr Arg Phe Cys Ser Gly Phe Gly Pro Asp
            100                 105                 110

Ala Tyr Ser Ser Trp Gly Gln Gly Thr Gln Val Ile Val Ser Ser
        115                 120                 125

<210> SEQ ID NO 41
<211> LENGTH: 117
<212> TYPE: PRT
<213> ORGANISM: alpaca

<400> SEQUENCE: 41

Gln Val Gln Leu Val Glu Ser Gly Gly Gly Leu Val Gln Ala Gly Gly
1               5                   10                  15

Ser Leu Arg Leu Ser Cys Ala Ala Ser Gly Arg Thr Phe Ser Gly Tyr
            20                  25                  30

Thr Met Gly Trp Phe Arg Arg Ala Pro Gly Lys Glu Arg Glu Leu Ile
        35                  40                  45

Ala Asn Ile Leu Trp Asn Ser Ala Arg Arg Tyr Tyr Ala Asp Ser Val
    50                  55                  60

Lys Gly Arg Phe Thr Ile Ser Arg Asp Asn Ala Met Asn Thr Val Asp
65                  70                  75                  80

Leu Gln Met Asn Ser Leu Lys Pro Glu Asp Thr Ala Val Tyr Tyr Cys
                85                  90                  95

Ala Val Leu Val Asp Ser Thr Tyr Arg Phe Ser Asn Gln Gly Thr Gln
            100                 105                 110

Val Thr Val Ser Ser
        115

<210> SEQ ID NO 42
<211> LENGTH: 121
<212> TYPE: PRT
<213> ORGANISM: alpaca

<400> SEQUENCE: 42

Glu Val Gln Leu Val Glu Thr Gly Gly Gly Leu Val Gln Ala Gly Gly
1               5                   10                  15

Ser Leu Arg Leu Ala Cys Glu Val Ser Gly Arg Thr Phe Ser Ser Tyr
            20                  25                  30

Ala Met Gly Trp Phe Arg Gln Ala Pro Gly Arg Glu Arg Glu Phe Val
        35                  40                  45

Ala Ser Ile Arg Val Ser Gly Ile Thr Asp Tyr Ala Asp Ser Val
    50                  55                  60

Lys Gly Arg Phe Thr Ile Ser Arg Asp Asn Ala Lys Asp Thr Val Tyr
65                  70                  75                  80

Leu Gln Met Ile Asn Leu Lys Pro Glu Asp Thr Ala Val Tyr Tyr Cys
                85                  90                  95

Asn Ala Asp Ile Ser Arg Tyr Arg Phe Ser Arg Gly Asp Tyr Trp Gly
            100                 105                 110

Lys Gly Thr Leu Val Thr Val Ser Ser
        115                 120

<210> SEQ ID NO 43
<211> LENGTH: 124
<212> TYPE: PRT
<213> ORGANISM: alpaca

<400> SEQUENCE: 43

Gln Val Gln Leu Val Glu Ser Gly Gly Gly Thr Val Gln Ala Gly Gly
1               5                   10                  15

Ser Leu Arg Leu Ser Cys Ala Ala Ser Gly Leu Thr Phe Gly Ser Tyr
            20                  25                  30

Ala Met Glu Trp Tyr Arg Gln Ala Pro Gly Lys Glu Arg Glu Leu Val
        35                  40                  45

Ala Thr Ile Ser Ser Gly Gly Asn Thr His Tyr Leu Ala Ser Val Lys
    50                  55                  60

Gly Arg Phe Thr Ile Ser Arg Asp Asn Asp Lys Asn Thr Leu Tyr Leu
65                  70                  75                  80

Gln Met Asn Ser Leu Lys Pro Glu Asp Thr Ala Val Tyr Tyr Cys Ala
                85                  90                  95

Ala Lys Tyr Gly Trp Thr Gly Ile Trp Tyr Ala Pro Ser Asp Tyr Val
            100                 105                 110

His Leu Gly Pro Gly Thr Gln Val Thr Val Ser Ser
        115                 120

<210> SEQ ID NO 44
<211> LENGTH: 125
<212> TYPE: PRT
<213> ORGANISM: alpaca

<400> SEQUENCE: 44

Gln Val Gln Leu Val Glu Ser Gly Gly Gly Leu Val Gln Ala Gly Asp
1               5                   10                  15

Ser Leu Arg Leu Ser Cys Ala Ala Ser Gly Asp Asn Phe Ser Arg Tyr
            20                  25                  30

Thr Phe Gly Trp Phe Arg Gln Ala Pro Gly Lys Glu Arg Glu Phe Val
        35                  40                  45

Ala Val Ile Asn Trp Ser Gly Ser Tyr Thr Tyr Val Ala Asp Ser Val
    50                  55                  60

Ala Gly Arg Phe Thr Met Ser Arg Asp Asn Ala Lys His Leu Val Tyr
65                  70                  75                  80

Leu Gln Met Asp Ser Leu Asn Thr Gly Asp Thr Ala Val Tyr Tyr Cys
            85                  90                  95

Ala Ala His Trp Asp Tyr Gly Ser Ser Ser Arg Arg Gln Arg Glu Tyr
        100                 105                 110

Asp Tyr Trp Gly Gln Gly Thr Gln Val Ile Val Ser Ser
        115                 120                 125

<210> SEQ ID NO 45
<211> LENGTH: 125
<212> TYPE: PRT
<213> ORGANISM: alpaca

<400> SEQUENCE: 45

Gln Val Gln Leu Val Glu Ser Gly Gly Gly Leu Val Gln Ala Gly Gly
1               5                   10                  15

Ser Leu Arg Leu Ser Cys Ala Ala Ser Gly Arg Thr Ser Ser Arg Tyr
            20                  25                  30

Val Met Gly Trp Phe Arg Gln Ser Pro Gly Lys Glu Arg Glu Phe Val
        35                  40                  45

Ala Ala Ile Ser Ala Asn Gly Arg Ser Thr Asn Tyr Ala Gly Ser Val
    50                  55                  60

Asn Gly Arg Phe Lys Ile Ser Arg Asp Gly Ala Lys Asp Lys Val Asp
65                  70                  75                  80

Leu Gln Met Asn Ser Leu Lys Pro Glu Asp Thr Ala Val Tyr Phe Cys
            85                  90                  95

Ala Thr Asn Met Ala Phe Ser Ser Ser Asn Phe Pro Ala Asn Tyr
        100                 105                 110

Asp Val Trp Gly Gln Gly Thr Gln Val Thr Val Ser Ser
        115                 120                 125

<210> SEQ ID NO 46
<211> LENGTH: 127
<212> TYPE: PRT
<213> ORGANISM: alpaca

<400> SEQUENCE: 46

Gln Val Gln Leu Ala Glu Ser Gly Gly Gly Leu Val Gln Ala Gly Asp
1               5                   10                  15

Ser Leu Arg Leu Ser Cys Ala Ala Ser Gly Arg Ser Val Ser Ser Tyr
            20                  25                  30

Ala Met Gly Trp Phe Arg Gln Ala Pro Gly Lys Glu Arg Glu Phe Val
        35                  40                  45

Ala Ala Ile Ser Trp Ser Gly Glu Ser Thr His Tyr Ala Asp Ser Val
    50                  55                  60

Lys Gly Arg Phe Thr Ile Ser Arg Asp Asn Ala Glu Asn Thr Val Tyr
65                  70                  75                  80

```
Leu Gln Met Asn Ser Leu Lys Pro Glu Asp Thr Ala Val Tyr Tyr Cys
                 85                  90                  95

Ala Ser Tyr Leu Ser Gly His Tyr Tyr Phe Gly Ile Gly Arg Asp Pro
            100                 105                 110

Pro Phe Gly Ser Trp Gly Gln Gly Thr Gln Val Thr Val Ser Ser
        115                 120                 125

<210> SEQ ID NO 47
<211> LENGTH: 116
<212> TYPE: PRT
<213> ORGANISM: alpaca

<400> SEQUENCE: 47

Arg Val Gln Leu Val Glu Ser Gly Gly Gly Leu Val Gln Pro Gly Gly
1               5                   10                  15

Ser Leu Arg Leu Ser Cys Thr Ala Ser Gly Leu Pro Leu Asn Thr Ala
            20                  25                  30

Ala Met Ser Trp Tyr Arg Gln Thr Pro Gly Lys Glu Arg Glu Leu Val
        35                  40                  45

Ala Ser Ile Ser Ile Thr Gly Asp Ser Thr Thr Tyr Ala Asp Ser Val
    50                  55                  60

Lys Gly Arg Phe Thr Ile Ser Arg Asp Asn Val Lys Asn Ile Val Tyr
65                  70                  75                  80

Leu Gln Met Asp Ile Leu Lys Pro Glu Asp Thr Ala Val Tyr Tyr Cys
                85                  90                  95

Thr Arg Ala Pro Trp Asp Tyr Lys Tyr Trp Gly Gln Gly Thr Gln Val
            100                 105                 110

Thr Val Ser Ser
        115

<210> SEQ ID NO 48
<211> LENGTH: 124
<212> TYPE: PRT
<213> ORGANISM: alpaca

<400> SEQUENCE: 48

Gln Val Gln Leu Val Glu Ser Gly Gly Gly Leu Val Gln Val Gly Gly
1               5                   10                  15

Ser Leu Arg Leu Ser Cys Val Ala Ser Gly Leu Thr Phe Ser Asn Tyr
            20                  25                  30

Ala Met Gly Trp Phe Arg Gln Ala Pro Gly Lys Glu Arg Glu Phe Val
        35                  40                  45

Thr Ala Ile Asn Trp Ser Gly Ala Ile Lys Asn Tyr Gly Asp Ser Ala
    50                  55                  60

Lys Gly Arg Phe Thr Ile Ser Arg Asp Asn Ala Leu Asn Met Leu Tyr
65                  70                  75                  80

Leu Gln Met Asn Arg Leu Lys Pro Glu Asp Thr Ala Val Tyr Tyr Cys
                85                  90                  95

Ala Ala Arg Gln Gly Asn Met Gly Asp Leu Val Val Lys Ser Gly Asp
            100                 105                 110

Tyr Trp Gly Gln Gly Thr Gln Val Thr Val Ser Ser
        115                 120

<210> SEQ ID NO 49
<211> LENGTH: 125
<212> TYPE: PRT
<213> ORGANISM: alpaca
```

-continued

<400> SEQUENCE: 49

Gln Val Gln Leu Val Glu Ser Gly Gly Gly Ser Val Gln Ala Gly Gly
1               5                   10                  15

Ser Leu Arg Leu Ser Cys Ala Ala Ser Gly Arg Thr Phe Gly Arg His
            20                  25                  30

Val Met Ala Trp Phe Arg Gln Ala Pro Gly Arg Glu Arg Glu Phe Val
        35                  40                  45

Ala Ala Ile Ser Gly Asn Gly Arg Val Thr Asn Tyr Ala Leu Ser Met
    50                  55                  60

Lys Gly Arg Phe Thr Ile Ser Arg Asp Asn Ala Asn Asp Met Val Tyr
65                  70                  75                  80

Leu Gln Met Asp Gly Leu Lys Pro Glu Asp Thr Ala Val Tyr Ser Cys
                85                  90                  95

Ala Thr Arg Met Ala Phe Asp Ser Asp Ser Asn Phe Pro Ala Thr Tyr
            100                 105                 110

Asp Val Trp Gly Gln Gly Thr Gln Val Thr Val Ser Ser
        115                 120                 125

<210> SEQ ID NO 50
<211> LENGTH: 125
<212> TYPE: PRT
<213> ORGANISM: alpaca

<400> SEQUENCE: 50

Gln Val Gln Leu Thr Glu Ser Gly Gly Gly Leu Val Gln Ala Gly Ala
1               5                   10                  15

Ser Leu Arg Leu Ser Cys Val Ala Ser Pro Asp Thr Pro Ser Thr Tyr
            20                  25                  30

Thr Ile Ala Trp Phe Arg Arg Ala Pro Gly Lys Glu Arg Asp Phe Val
        35                  40                  45

Ala Asn Ile Ala Arg Ala Gly Thr Thr Ile Tyr Ala Asp Ser Val
    50                  55                  60

Lys Gly Arg Phe Thr Ile Ser Lys Asp Asn Ala Arg Asn Thr Val Tyr
65                  70                  75                  80

Leu Gln Met Asn Asn Leu Thr Pro Ala Asp Thr Ala Ile Tyr Tyr Cys
                85                  90                  95

Ala Ala Tyr Ser Pro Gly Ser Ile Ile Ala Arg Asp Ser Thr Gln Tyr
            100                 105                 110

Arg Tyr Trp Gly Gln Gly Thr Arg Val Thr Val Ser Glu
        115                 120                 125

<210> SEQ ID NO 51
<211> LENGTH: 124
<212> TYPE: PRT
<213> ORGANISM: alpaca

<400> SEQUENCE: 51

Gln Val Gln Leu Val Glu Ser Gly Gly Gly Leu Val Gln Ala Gly Glu
1               5                   10                  15

Ser Leu Arg Leu Ser Cys Val Ala Ser Gly Arg Thr Phe Ser Ser Tyr
            20                  25                  30

Ala Met Gly Trp Phe Arg Gln Ala Pro Gly Gln Glu Arg Glu Phe Val
        35                  40                  45

Ala Arg Ile Ser Arg Arg Gly Thr Asn Thr Tyr Tyr Ala Asp Ser Val
    50                  55                  60

Arg Gly Arg Phe Thr Ile Ser Arg Asp Asn Ala Lys Asn Thr Val Tyr

```
                65                  70                  75                  80
Leu Gln Met Asn Ser Leu Lys Pro Glu Asp Thr Ala Val Tyr Tyr Cys
                    85                  90                  95

Ala Ala Asp Arg Ser Asp Val Phe Glu Lys Asp Pro Gly Tyr Tyr Asp
                    100                 105                 110

Tyr Trp Gly Gln Gly Ala Gln Val Thr Val Ser Ser
                    115                 120
```

<210> SEQ ID NO 52
<211> LENGTH: 116
<212> TYPE: PRT
<213> ORGANISM: alpaca

<400> SEQUENCE: 52

```
Glu Val Gln Leu Val Glu Ser Gly Gly Gly Leu Val Gln Pro Gly Gly
1               5                   10                  15

Ser Leu Arg Leu Ser Cys Thr Ala Ser Gly Phe Thr Leu Ser Thr Ser
                20                  25                  30

Pro Val Ser Trp Ala Arg Gln Ala Pro Gly Lys Gly Pro Glu Trp Leu
                35                  40                  45

Ala Gly Ile Tyr Ser Asp Gly Arg Thr Ser Asn Leu Val Ser Leu Arg
            50                  55                  60

Gly Arg Phe Thr Ile Ser Arg Asp Asn Ala Lys Asn Thr Val Tyr Leu
65                  70                  75                  80

Gln Met Asn Ser Leu Leu Pro Glu Asp Thr Ala Leu Tyr Tyr Cys Ala
                85                  90                  95

Ile Gly Ala Ala Val Gly Gly Leu Arg Gly Gln Gly Thr Gln Val
                100                 105                 110

Thr Val Ser Ser
        115
```

<210> SEQ ID NO 53
<211> LENGTH: 128
<212> TYPE: PRT
<213> ORGANISM: alpaca

<400> SEQUENCE: 53

```
Gln Val Ser Leu Val Glu Ser Gly Gly Gly Leu Val Gln Ala Gly Gly
1               5                   10                  15

Ser Leu Arg Leu Ser Cys Ala Ala Ser Gly Arg Thr Phe Arg Arg Ser
                20                  25                  30

Ala Met Gly Trp Phe Arg Arg Pro Gly Lys Glu Arg Glu Phe Val
                35                  40                  45

Ala Ala Ile Thr Ser Ser Gly Gly Ser Ile Tyr Asp Pro Asp Ile Ala
            50                  55                  60

Lys Asp Arg Phe Thr Ile Ser Arg Asp Asn Ser Lys Thr Ser Val Tyr
65                  70                  75                  80

Leu Gln Met Asn Asn Leu Lys Pro Glu Asp Thr Ala Val Tyr Tyr Cys
                85                  90                  95

Ser Leu Lys Thr Thr Tyr Ser Gly Gly Pro Tyr Asp Tyr Thr Lys Gly
                100                 105                 110

Pro Glu Tyr Asp Tyr Trp Gly Gln Gly Thr Gln Val Thr Val Ser Ser
                115                 120                 125
```

<210> SEQ ID NO 54
<211> LENGTH: 120
<212> TYPE: PRT

```
<213> ORGANISM: alpaca

<400> SEQUENCE: 54

Gln Val Gln Leu Val Glu Ser Gly Gly Gly Leu Val Arg Ala Gly Gly
1               5                   10                  15

Ser Leu Arg Leu Ser Cys Ala Ala Ser Gly Arg Ala Phe Ser Ser Tyr
                20                  25                  30

Pro Met Gly Trp Phe Arg Arg Ala Pro Gly Lys Glu Arg Glu Phe Val
            35                  40                  45

Ala Ala Ile Ser Leu Ser Gly Ser Lys Gln Tyr Tyr Val Asp Ser Val
        50                  55                  60

Lys Gly Arg Phe Thr Ile Ser Arg Asp Asn Ala Lys Asn Thr Val Ser
65                  70                  75                  80

Leu Gln Met Asn Ser Leu Lys Pro Glu Asp Thr Ala Val Tyr Tyr Cys
                85                  90                  95

Ala Ala Leu Lys Asp Gly Glu Pro Pro Ala Val Asp Tyr Trp Gly Gln
            100                 105                 110

Gly Thr Gln Val Thr Val Ser Ser
            115                 120

<210> SEQ ID NO 55
<211> LENGTH: 126
<212> TYPE: PRT
<213> ORGANISM: alpaca

<400> SEQUENCE: 55

Gln Val Glu Leu Val Glu Ser Gly Gly Ala Leu Val Gln Ala Gly Gly
1               5                   10                  15

Ser Leu Lys Leu Ser Cys Val Asp Ser Gly Arg Ser Phe Ser Ser Tyr
                20                  25                  30

Val Val Ala Trp Phe Arg Gln Ala Pro Gly Lys Glu Arg Glu Phe Val
            35                  40                  45

Ala Arg Val Ser Ala Ser Gly Ala Ile Arg Thr Tyr Ala Asp Ser Val
        50                  55                  60

Arg Gly Arg Phe Thr Ile Ser Arg Asp Asn Thr Lys Ala Thr Val Tyr
65                  70                  75                  80

Leu Gln Met Asn Ser Leu Lys Ser Glu Asp Thr Ala Val Phe Phe Cys
                85                  90                  95

Ala Ala Gly Gly Val Ser Thr Ala Val His Pro Phe Lys Pro Thr Ser
            100                 105                 110

Tyr Asp Phe Trp Gly Gly Gly Thr Gln Val Thr Val Ser Val
            115                 120                 125

<210> SEQ ID NO 56
<211> LENGTH: 120
<212> TYPE: PRT
<213> ORGANISM: alpaca

<400> SEQUENCE: 56

Gln Val Gln Leu Val Glu Ser Gly Gly Gly Leu Val Gln Pro Gly Gly
1               5                   10                  15

Ser Leu Arg Leu Ser Cys Ala Ala Ser Glu Ser Ile Arg Ser Ile Tyr
                20                  25                  30

Ala Met Gly Trp Tyr Arg Gln Ala Pro Gly Lys Gln Arg Glu Leu Val
            35                  40                  45

Ala Leu Val Thr Asp Asp Gly Ser Thr Asp Tyr Val Asp Ser Val Lys
        50                  55                  60
```

Gly Arg Phe Thr Val Ser Arg Asp Ser Ala Lys Asn Thr Val Tyr Leu
65                  70                  75                  80

Gln Met Asn Ser Leu Lys Pro Glu Asp Thr Ala Val Tyr His Cys Tyr
                85                  90                  95

Val Glu Gly Ser Thr His Tyr Asp Pro Val Arg Glu Tyr Trp Gly Lys
            100                 105                 110

Gly Thr Leu Val Thr Val Ser Ser
        115                 120

<210> SEQ ID NO 57
<211> LENGTH: 124
<212> TYPE: PRT
<213> ORGANISM: alpaca

<400> SEQUENCE: 57

Gln Val Gln Leu Val Glu Ser Gly Gly Gly Leu Val Gln Ala Gly Gly
1               5                   10                  15

Ser Leu Arg Leu Ser Cys Leu Phe Ser Gly Thr Phe Gly Ile Tyr Gly
            20                  25                  30

Met Gly Trp Phe Arg Gln Ala Pro Gly Lys Ala Arg Glu Phe Val Ala
        35                  40                  45

Gly Val Ser Arg His Gly Leu Thr Thr Gln Tyr Ala Asp Ser Val Lys
    50                  55                  60

Gly Arg Phe Thr Ile Ser Arg Asp Asn Ala Lys Asn Thr Met Tyr Leu
65                  70                  75                  80

Gln Met Asn Ser Leu Lys Pro Glu Asp Thr Ala Asp Tyr Tyr Cys Ala
                85                  90                  95

Arg Ser Arg Leu Ser Ala Ser Leu Leu Val Thr Ala Ser Asp Tyr Asp
            100                 105                 110

Tyr Trp Gly Gln Gly Thr Gln Val Thr Val Ser Ser
        115                 120

<210> SEQ ID NO 58
<211> LENGTH: 122
<212> TYPE: PRT
<213> ORGANISM: alpaca

<400> SEQUENCE: 58

Gln Val Gln Leu Val Glu Ser Gly Gly Gly Leu Val Gln Ala Gly Asp
1               5                   10                  15

Ser Leu Arg Leu Ser Cys Thr Ala Ser Gly Thr Thr Phe Asp Arg Tyr
            20                  25                  30

His Met Gly Trp Phe Arg Gln Ala Pro Gly Met Glu Arg His Val Val
        35                  40                  45

Ala His Ile Ser Trp Ser Gly Ala Asn Thr Tyr Val Ala Asp Ser Met
    50                  55                  60

Lys Gly Arg Phe Thr Ile Ser Arg Asp Asn Ala Lys Asn Thr Ala Tyr
65                  70                  75                  80

Leu Gln Ile Asn Asn Leu Lys Phe Glu Asp Thr Ala Leu Tyr Tyr Cys
                85                  90                  95

Ala Ala Gly Ser Tyr Leu Ala Val Pro Gly Ser Arg Asp Tyr Trp
            100                 105                 110

Gly Gln Gly Thr Gln Val Thr Val Ser Ser
        115                 120

<210> SEQ ID NO 59

```
<211> LENGTH: 118
<212> TYPE: PRT
<213> ORGANISM: alpaca

<400> SEQUENCE: 59
```

| Gln | Val | Gln | Leu | Val | Glu | Ser | Gly | Gly | Gly | Leu | Val | Gln | Pro | Gly | Gly |
|---|---|---|---|---|---|---|---|---|---|---|---|---|---|---|---|
| 1 | | | | 5 | | | | | 10 | | | | | 15 | |

| Ser | Leu | Arg | Leu | Ser | Cys | Ala | Ala | Ser | Gly | Tyr | Ser | Leu | Ser | Phe | Tyr |
| | | | 20 | | | | | 25 | | | | | 30 | | |

| Ala | Met | Gly | Trp | Tyr | Arg | Gln | Ser | Pro | Gly | Lys | Gln | Arg | Glu | Val | Val |
| | | 35 | | | | | 40 | | | | | 45 | | | |

| Ala | Arg | Ile | Ala | Gly | Pro | Gly | Val | Thr | Asn | Tyr | Ala | Asp | Ser | Val | Met |
| 50 | | | | | 55 | | | | | 60 | | | | | |

| Gly | Arg | Phe | Thr | Ile | Ser | Arg | Asp | Asn | Ala | Lys | Asn | Met | Val | Tyr | Leu |
| 65 | | | | | 70 | | | | | 75 | | | | | 80 |

| Gln | Met | Asn | Ser | Leu | Glu | Pro | Glu | Asp | Thr | Ala | Val | Tyr | Tyr | Cys | Asn |
| | | | | 85 | | | | | 90 | | | | | 95 | |

| Ala | Gly | Gly | Thr | Arg | Trp | Ser | Val | Gly | Asp | Tyr | Trp | Gly | Lys | Gly | Thr |
| | | | | 100 | | | | | 105 | | | | | 110 | |

| Leu | Val | Thr | Val | Ser | Ser |
|---|---|---|---|---|---|
| | | | 115 | | |

```
<210> SEQ ID NO 60
<211> LENGTH: 121
<212> TYPE: PRT
<213> ORGANISM: alpaca

<400> SEQUENCE: 60
```

| Gln | Val | Gln | Leu | Val | Glu | Ser | Gly | Gly | Gly | Leu | Val | Gln | Ala | Gly | Asp |
|---|---|---|---|---|---|---|---|---|---|---|---|---|---|---|---|
| 1 | | | | 5 | | | | | 10 | | | | | 15 | |

| Ser | Leu | Arg | Leu | Ser | Cys | Ala | Ala | Ser | Gly | Arg | Thr | Phe | Ser | Ser | Tyr |
| | | | 20 | | | | | 25 | | | | | 30 | | |

| Ala | Met | Ala | Trp | Phe | Arg | Arg | Pro | Pro | Gly | Lys | Ala | Arg | Glu | Phe | Val |
| | | 35 | | | | | 40 | | | | | 45 | | | |

| Ala | Leu | Ile | Arg | Trp | Ser | Asn | Gly | Arg | Thr | Ala | Val | Val | Asp | Ser | Val |
| 50 | | | | | 55 | | | | | 60 | | | | | |

| Lys | Gly | Arg | Phe | Thr | Ala | Ser | Arg | Asp | Asn | Ala | Lys | Asn | Thr | Gly | Tyr |
| 65 | | | | | 70 | | | | | 75 | | | | | 80 |

| Leu | Gln | Met | Asp | Ser | Leu | Lys | Ser | Glu | Asp | Thr | Ala | Val | Tyr | Tyr | Cys |
| | | | | 85 | | | | | 90 | | | | | 95 | |

| Ala | Ala | Cys | Asp | Gln | Ala | Leu | Asp | Pro | Pro | Arg | Cys | Asn | Asp | Trp | Gly |
| | | | 100 | | | | | 105 | | | | | 110 | | |

| Gln | Gly | Thr | Gln | Val | Thr | Val | Ser | Ser |
|---|---|---|---|---|---|---|---|---|
| | | | 115 | | | | | 120 |

```
<210> SEQ ID NO 61
<211> LENGTH: 122
<212> TYPE: PRT
<213> ORGANISM: alpaca

<400> SEQUENCE: 61
```

| Gln | Val | Gln | Leu | Val | Glu | Ser | Gly | Gly | Gly | Leu | Val | Gln | Ala | Gly | Gly |
|---|---|---|---|---|---|---|---|---|---|---|---|---|---|---|---|
| 1 | | | | 5 | | | | | 10 | | | | | 15 | |

| Ser | Leu | Arg | Leu | Ser | Cys | Ala | Ala | Ser | Gly | Arg | Thr | Phe | Thr | Thr | Tyr |
| | | | 20 | | | | | 25 | | | | | 30 | | |

| Pro | Met | Gly | Trp | Phe | Arg | Gln | Ala | Pro | Gly | Lys | Glu | Arg | Gln | Phe | Val |
| | | 35 | | | | | 40 | | | | | 45 | | | |

```
Ala Ala Ile Ser Gly Asn Gly Asp Ser Ile Asp Tyr Ala Asp Ser Val
     50                  55                  60

Lys Gly Arg Phe Thr Ile Ser Arg Asp Asn Ala Lys Asn Thr Leu Tyr
 65                  70                  75                  80

Leu Gln Met Asn Ser Leu Lys Pro Glu Asp Ala Ala Leu Tyr Tyr Cys
                 85                  90                  95

Asn Ala Val Ile Thr His Asp Tyr Thr Arg Pro Leu Phe Ala Ser Trp
                100                 105                 110

Gly Gln Gly Thr Gln Val Thr Val Ser Ser
            115                 120

<210> SEQ ID NO 62
<211> LENGTH: 122
<212> TYPE: PRT
<213> ORGANISM: alpaca

<400> SEQUENCE: 62

Arg Val Gln Leu Val Glu Ser Gly Gly Leu Val Gln Ala Gly Gly
  1               5                  10                  15

Ala Leu Arg Leu Ser Cys Val Gly Ser Gly Phe Thr Phe Arg Asp Thr
                 20                  25                  30

Ala Met Ala Trp Phe Arg Gln Ser Pro Gly Lys Glu Arg Glu Phe Val
             35                  40                  45

Ala Gly Phe Ser Ile Leu Ser Arg Tyr Ala Asp Ser Val Lys Gly Arg
         50                  55                  60

Phe Thr Ile Ser Arg Asp Asn Asp Lys Asn Thr Val Tyr Leu Gln Met
 65                  70                  75                  80

Asn Ser Leu Lys Pro Glu Asp Thr Ala Val Tyr Tyr Cys Ala Ala Gly
                 85                  90                  95

Asp Gly Thr Ile Ala Ser Val Leu Thr Thr Ser Gly Val Asn Phe Trp
                100                 105                 110

Gly Gln Gly Thr Gln Val Thr Val Ser Ser
            115                 120

<210> SEQ ID NO 63
<211> LENGTH: 24
<212> TYPE: DNA
<213> ORGANISM: Artificial Sequence
<220> FEATURE:
<223> OTHER INFORMATION: NGS sequencing primer

<400> SEQUENCE: 63
gcagtggctg caggtgtcca ctcg                                      24

<210> SEQ ID NO 64
<211> LENGTH: 24
<212> TYPE: DNA
<213> ORGANISM: Artificial Sequence
<220> FEATURE:
<223> OTHER INFORMATION: NGS sequencing primer

<400> SEQUENCE: 64
gcaggtcccc aaggtgtcct gtcc                                      24

<210> SEQ ID NO 65
<211> LENGTH: 18
<212> TYPE: DNA
<213> ORGANISM: Artificial Sequence
<220> FEATURE:
<223> OTHER INFORMATION: NGS sequencing primer
```

<400> SEQUENCE: 65
ggtggtcctg gctgctct                                                  18

<210> SEQ ID NO 66
<211> LENGTH: 21
<212> TYPE: DNA
<213> ORGANISM: Artificial Sequence
<220> FEATURE:
<223> OTHER INFORMATION: NGS sequencing primer

<400> SEQUENCE: 66
ttgtggtttt ggtgtcttgg g                                              21

<210> SEQ ID NO 67
<211> LENGTH: 21
<212> TYPE: DNA
<213> ORGANISM: Artificial Sequence
<220> FEATURE:
<223> OTHER INFORMATION: NGS sequencing primer

<400> SEQUENCE: 67
ggggtcttcg ctgtggtgcg c                                              21

<210> SEQ ID NO 68
<211> LENGTH: 4
<212> TYPE: PRT
<213> ORGANISM: alpaca

<400> SEQUENCE: 68

Ala Asp Tyr Lys
1

<210> SEQ ID NO 69
<211> LENGTH: 16
<212> TYPE: PRT
<213> ORGANISM: alpaca

<400> SEQUENCE: 69

Ala Ala Ser Thr Met Val Val Thr Thr Val Ala Ala Asp Tyr Lys Tyr
1               5                   10                  15

<210> SEQ ID NO 70
<211> LENGTH: 22
<212> TYPE: PRT
<213> ORGANISM: alpaca

<400> SEQUENCE: 70

Ala Ala Gly Leu Lys Ala Asp Tyr Gly Asp Ser Tyr Val Asp Thr Ser
1               5                   10                  15

Thr Arg Asn Tyr Asn Tyr
            20

<210> SEQ ID NO 71
<211> LENGTH: 18
<212> TYPE: PRT
<213> ORGANISM: alpaca

<400> SEQUENCE: 71

Ala Ala Asp Tyr Asn Arg Leu Gln Ile Gly Gln Arg Ser Arg Asp Tyr
1               5                   10                  15

Asp Tyr

<210> SEQ ID NO 72

```
<211> LENGTH: 18
<212> TYPE: PRT
<213> ORGANISM: alpaca

<400> SEQUENCE: 72

Ala Gly Arg Pro Phe Gly Leu Gln Leu Asp Thr His Gln Ala Asp Tyr
1               5                   10                  15
Asn Ile

<210> SEQ ID NO 73
<211> LENGTH: 17
<212> TYPE: PRT
<213> ORGANISM: alpaca

<400> SEQUENCE: 73

Gly Val Asp Arg Arg Gln Tyr Gly Leu Gly Ile Pro Pro Leu Ala Asp
1               5                   10                  15
Tyr

<210> SEQ ID NO 74
<211> LENGTH: 18
<212> TYPE: PRT
<213> ORGANISM: alpaca

<400> SEQUENCE: 74

Val Ala Asp Tyr Arg Val Trp Gly Thr Arg Ile Ala Gly Thr Lys Tyr
1               5                   10                  15
Asp Ser

<210> SEQ ID NO 75
<211> LENGTH: 21
<212> TYPE: PRT
<213> ORGANISM: alpaca

<400> SEQUENCE: 75

Ala Ala Asp Gly Asp Ala Ser Asp Arg Ser Tyr Ala Pro Pro Arg Asp
1               5                   10                  15
Tyr Lys Tyr Glu Tyr
            20

<210> SEQ ID NO 76
<211> LENGTH: 16
<212> TYPE: PRT
<213> ORGANISM: alpaca

<400> SEQUENCE: 76

Ala Ala Asp Asn Val Gly Asp Ser Trp Tyr Ser Asp Tyr Lys Tyr
1               5                   10                  15

<210> SEQ ID NO 77
<211> LENGTH: 19
<212> TYPE: PRT
<213> ORGANISM: alpaca

<400> SEQUENCE: 77

Asn Ala Arg Pro Thr Phe Gly Ala Tyr Tyr Ser Asp Tyr Lys Ser Gly
1               5                   10                  15
Val Asp Tyr

<210> SEQ ID NO 78
<211> LENGTH: 13
<212> TYPE: PRT
```

<213> ORGANISM: alpaca

<400> SEQUENCE: 78

Asn Arg Gly Asn Tyr Tyr Arg Asp Tyr Lys Pro Glu Phe
1               5                   10

<210> SEQ ID NO 79
<211> LENGTH: 18
<212> TYPE: PRT
<213> ORGANISM: alpaca

<400> SEQUENCE: 79

Thr Thr Glu Val Ala Cys Tyr Ser Asp Tyr Lys Ser Thr Gln Ile Ser
1               5                   10                  15

Arg Ile

<210> SEQ ID NO 80
<211> LENGTH: 16
<212> TYPE: PRT
<213> ORGANISM: alpaca

<400> SEQUENCE: 80

Asn Tyr Lys Arg Gly His Tyr Pro Asp Gly Val Ser Thr Tyr Glu Tyr
1               5                   10                  15

<210> SEQ ID NO 81
<211> LENGTH: 16
<212> TYPE: PRT
<213> ORGANISM: alpaca

<400> SEQUENCE: 81

Ser Tyr Lys Arg Gly Arg Tyr Pro Asp Gly Val Ser Thr Leu Glu Tyr
1               5                   10                  15

<210> SEQ ID NO 82
<211> LENGTH: 14
<212> TYPE: PRT
<213> ORGANISM: alpaca

<400> SEQUENCE: 82

Ala Asn Ser Thr Tyr Phe Asn Asp Asp Pro Glu Tyr Asp Arg
1               5                   10

<210> SEQ ID NO 83
<211> LENGTH: 17
<212> TYPE: PRT
<213> ORGANISM: alpaca

<400> SEQUENCE: 83

Asn Ala Gly Arg Leu Ser Tyr Gly Gly Ser Tyr Tyr Pro Asn Asp Asp
1               5                   10                  15

Tyr

<210> SEQ ID NO 84
<211> LENGTH: 18
<212> TYPE: PRT
<213> ORGANISM: alpaca

<400> SEQUENCE: 84

Asn Thr Asp Tyr Thr Phe Ala Lys Leu Thr Ala Pro Asp Arg Arg Asn
1               5                   10                  15

Asp Asp

<210> SEQ ID NO 85
<211> LENGTH: 12
<212> TYPE: PRT
<213> ORGANISM: alpaca

<400> SEQUENCE: 85

Asn Ala Asp Thr Ile Ala Thr Met Thr Asp Asp Tyr
1               5                   10

<210> SEQ ID NO 86
<211> LENGTH: 18
<212> TYPE: PRT
<213> ORGANISM: alpaca

<400> SEQUENCE: 86

Asn Ala Thr Arg Pro Arg Asp Asp Tyr Tyr Tyr Thr Gly Gly Phe Leu
1               5                   10                  15

Tyr Tyr

<210> SEQ ID NO 87
<211> LENGTH: 16
<212> TYPE: PRT
<213> ORGANISM: alpaca

<400> SEQUENCE: 87

Arg Pro Tyr Ser Asp Tyr Val Thr Tyr Asp Pro Asp Asp Tyr Asp Tyr
1               5                   10                  15

<210> SEQ ID NO 88
<211> LENGTH: 16
<212> TYPE: PRT
<213> ORGANISM: alpaca

<400> SEQUENCE: 88

Asn Thr Asp Pro Asp Tyr Ser Asp Tyr Asp Asp Met Tyr Val Arg Ser
1               5                   10                  15

<210> SEQ ID NO 89
<211> LENGTH: 17
<212> TYPE: PRT
<213> ORGANISM: alpaca

<400> SEQUENCE: 89

Ala Ala Thr Asn Ser Asn Thr Asp Trp Arg Thr Tyr Thr Glu Tyr Asn
1               5                   10                  15

Tyr

<210> SEQ ID NO 90
<211> LENGTH: 19
<212> TYPE: PRT
<213> ORGANISM: alpaca

<400> SEQUENCE: 90

Ala Ala Lys Phe Thr Ser Ser Phe Tyr Tyr Arg Ser Pro Arg Glu
1               5                   10                  15

Tyr Ser Ser

<210> SEQ ID NO 91
<211> LENGTH: 20
<212> TYPE: PRT
<213> ORGANISM: alpaca

<400> SEQUENCE: 91

-continued

Ala Ala Lys Asn Val Pro Gly Phe Tyr Tyr Ser Asp Tyr Ala Asn His
1               5                   10                  15

Glu Tyr Asp Tyr
            20

<210> SEQ ID NO 92
<211> LENGTH: 18
<212> TYPE: PRT
<213> ORGANISM: alpaca

<400> SEQUENCE: 92

Asn Ala Pro Lys Gly Gly Ser Tyr Tyr Phe Pro Ala Val Gly Gly Tyr
1               5                   10                  15

Asp Tyr

<210> SEQ ID NO 93
<211> LENGTH: 15
<212> TYPE: PRT
<213> ORGANISM: alpaca

<400> SEQUENCE: 93

Arg Val Glu Ser Gln Asp Tyr Tyr Phe Asp Tyr Asp Arg Asp Ser
1               5                   10                  15

<210> SEQ ID NO 94
<211> LENGTH: 10
<212> TYPE: PRT
<213> ORGANISM: alpaca

<400> SEQUENCE: 94

Ala Thr Gly Tyr Trp Tyr Thr Pro Gly Asp
1               5                   10

<210> SEQ ID NO 95
<211> LENGTH: 9
<212> TYPE: PRT
<213> ORGANISM: alpaca

<400> SEQUENCE: 95

Asn Ala Lys Arg Tyr Trp Tyr Asp Tyr
1               5

<210> SEQ ID NO 96
<211> LENGTH: 20
<212> TYPE: PRT
<213> ORGANISM: alpaca

<400> SEQUENCE: 96

Ala Ala Asp Phe Asp Thr Tyr Arg Phe Cys Ser Gly Phe Gly Pro Asp
1               5                   10                  15

Ala Tyr Ser Ser
            20

<210> SEQ ID NO 97
<211> LENGTH: 10
<212> TYPE: PRT
<213> ORGANISM: alpaca

<400> SEQUENCE: 97

Ala Val Leu Val Asp Ser Thr Tyr Arg Phe
1               5                   10

```
<210> SEQ ID NO 98
<211> LENGTH: 14
<212> TYPE: PRT
<213> ORGANISM: alpaca

<400> SEQUENCE: 98

Asn Ala Asp Ile Ser Arg Tyr Arg Phe Ser Arg Gly Asp Tyr
1               5                   10

<210> SEQ ID NO 99
<211> LENGTH: 17
<212> TYPE: PRT
<213> ORGANISM: alpaca

<400> SEQUENCE: 99

Ala Ile Gly Ala Pro Asp Pro Phe Asn Tyr Ser Gly Trp Arg Arg Asn
1               5                   10                  15

Leu

<210> SEQ ID NO 100
<211> LENGTH: 16
<212> TYPE: PRT
<213> ORGANISM: alpaca

<400> SEQUENCE: 100

Ala Ile Gly Ile Ser Pro His Tyr Gly Ser Asp Trp Tyr Ala Leu Arg
1               5                   10                  15

<210> SEQ ID NO 101
<211> LENGTH: 13
<212> TYPE: PRT
<213> ORGANISM: alpaca

<400> SEQUENCE: 101

Ala Ile Gly Leu Ser Pro Gly Tyr Arg Asp Pro Asn Leu
1               5                   10

<210> SEQ ID NO 102
<211> LENGTH: 13
<212> TYPE: PRT
<213> ORGANISM: alpaca

<400> SEQUENCE: 102

Ala Ile Gly Leu Ser Pro Gly Tyr Ser Asp Pro Asn Leu
1               5                   10

<210> SEQ ID NO 103
<211> LENGTH: 13
<212> TYPE: PRT
<213> ORGANISM: alpaca

<400> SEQUENCE: 103

Ala Leu Gly Ala Met Arg Glu Gly Val Tyr Ser Asp Leu
1               5                   10

<210> SEQ ID NO 104
<211> LENGTH: 13
<212> TYPE: PRT
<213> ORGANISM: alpaca

<400> SEQUENCE: 104

Ala Val Gly Ala Pro Leu Val Ser Ser Pro Tyr Arg Ser
1               5                   10
```

```
<210> SEQ ID NO 105
<211> LENGTH: 15
<212> TYPE: PRT
<213> ORGANISM: alpaca

<400> SEQUENCE: 105

Ala Val Gly Ala Trp Tyr Glu Lys Arg Lys Lys Glu Lys Gly Leu
1               5                   10                  15

<210> SEQ ID NO 106
<211> LENGTH: 17
<212> TYPE: PRT
<213> ORGANISM: alpaca

<400> SEQUENCE: 106

Ala Val Gly Ile Val Val Pro Tyr Ser Glu Asp Ala Trp Tyr Ser Thr
1               5                   10                  15

Leu

<210> SEQ ID NO 107
<211> LENGTH: 15
<212> TYPE: PRT
<213> ORGANISM: alpaca

<400> SEQUENCE: 107

Gly Ile Gly Arg Trp Tyr Asp Gln Arg Lys Lys Glu Glu Gly Leu
1               5                   10                  15

<210> SEQ ID NO 108
<211> LENGTH: 16
<212> TYPE: PRT
<213> ORGANISM: alpaca

<400> SEQUENCE: 108

Asn Ala Ala Pro Trp Gly Ser Tyr His Pro Gln Thr Asp Ile Val Ser
1               5                   10                  15

<210> SEQ ID NO 109
<211> LENGTH: 17
<212> TYPE: PRT
<213> ORGANISM: alpaca

<400> SEQUENCE: 109

Asn Ala Ala Pro Trp Gly Ser Tyr Ser Pro Gly Pro Gly Asp Ile Ala
1               5                   10                  15

Ser

<210> SEQ ID NO 110
<211> LENGTH: 14
<212> TYPE: PRT
<213> ORGANISM: alpaca

<400> SEQUENCE: 110

Asn Gly Ala Pro Trp Gly Asp His Ala Pro Val Val Gly Ser
1               5                   10

<210> SEQ ID NO 111
<211> LENGTH: 14
<212> TYPE: PRT
<213> ORGANISM: alpaca

<400> SEQUENCE: 111

Asn Gly Ala Pro Trp Gly Asp Ile Ala Pro Val Ala Val Ser
1               5                   10
```

```
<210> SEQ ID NO 112
<211> LENGTH: 15
<212> TYPE: PRT
<213> ORGANISM: alpaca

<400> SEQUENCE: 112

Asn Pro Ala Pro Trp Gly Asp Tyr Thr Ala Thr Asp Phe His Ser
1               5                   10                  15

<210> SEQ ID NO 113
<211> LENGTH: 9
<212> TYPE: PRT
<213> ORGANISM: alpaca

<400> SEQUENCE: 113

Gln Leu Gly Ile His Pro Gly Ala Phe
1               5

<210> SEQ ID NO 114
<211> LENGTH: 13
<212> TYPE: PRT
<213> ORGANISM: alpaca

<400> SEQUENCE: 114

Gln Val Gly Arg Tyr Val Ser Gly Val Asp Tyr Gln Pro
1               5                   10

<210> SEQ ID NO 115
<211> LENGTH: 13
<212> TYPE: PRT
<213> ORGANISM: alpaca

<400> SEQUENCE: 115

Gln Val Gly Arg Tyr Val Ser Gly Val Tyr Tyr Gln Pro
1               5                   10

<210> SEQ ID NO 116
<211> LENGTH: 14
<212> TYPE: PRT
<213> ORGANISM: alpaca

<400> SEQUENCE: 116

Val Ile Gly Arg Gly Gly Tyr Ala Met Gly Asp Arg Arg Leu
1               5                   10

<210> SEQ ID NO 117
<211> LENGTH: 14
<212> TYPE: PRT
<213> ORGANISM: alpaca

<400> SEQUENCE: 117

Val Ile Gly Arg Arg Gly Tyr Ala Met Gly Asp Arg Thr Leu
1               5                   10

<210> SEQ ID NO 118
<211> LENGTH: 14
<212> TYPE: PRT
<213> ORGANISM: alpaca

<400> SEQUENCE: 118

Val Val Gly Arg Arg Gly Tyr Ala Met Gly Ser Arg Gln Leu
1               5                   10
```

<210> SEQ ID NO 119
<211> LENGTH: 127
<212> TYPE: PRT
<213> ORGANISM: alpaca

<400> SEQUENCE: 119

Gln Val Gln Leu Val Glu Ser Gly Gly Gly Leu Val Gln Ala Gly Gly
1               5                   10                  15

Ser Leu Arg Leu Ser Cys Ala Ala Ser Gly Phe Thr Phe Asp Asp Tyr
            20                  25                  30

Thr Val Gly Trp Phe Arg Gln Ala Pro Gly Lys Glu Arg Glu Gly Val
        35                  40                  45

Ser Cys Ile Asn Asn Gly Asp Asp Ser Thr Tyr Tyr Ala Asp Ser Val
    50                  55                  60

Lys Gly Arg Phe Thr Ile Ser Ser Asp Asn Ala Lys Asn Thr Val Tyr
65                  70                  75                  80

Leu Gln Met Asn Ser Leu Arg Pro Glu Asp Thr Ala Val Tyr Tyr Cys
                85                  90                  95

Ala Val Tyr Ile Trp Cys Thr Val Ala Ala Gly Ile Gly Ser Leu Gly
            100                 105                 110

Asp Leu Gly Ser Trp Gly Gln Gly Thr Gln Val Thr Val Ser Ser
        115                 120                 125

<210> SEQ ID NO 120
<211> LENGTH: 131
<212> TYPE: PRT
<213> ORGANISM: alpaca

<400> SEQUENCE: 120

Gln Val Gln Leu Val Glu Ser Gly Gly Gly Leu Val Gln Pro Gly Gly
1               5                   10                  15

Ser Leu Arg Leu Ser Cys Ala Ala Thr Gly Phe Thr Ser Asp Tyr Tyr
            20                  25                  30

Ala Leu Gly Trp Phe Arg Gln Ala Pro Gly Lys Glu Arg Glu Gly Val
        35                  40                  45

Ser Cys Ile Ser Ser Arg Gly Gly Asp Gly Thr Ile Tyr Tyr Ala Asp
    50                  55                  60

Ser Val Lys Gly Arg Phe Thr Ile Ser Arg Asp Tyr Ala Lys Asn Thr
65                  70                  75                  80

Val Tyr Leu Gln Met Asn Ser Leu Lys Pro Glu Asp Thr Gly Val Tyr
                85                  90                  95

Tyr Cys Ala Ala Asp Leu Arg Val Pro Val Glu Glu Met Cys Val Met
            100                 105                 110

Ala Asp Asn Tyr Gly Met Asp Tyr Trp Gly Lys Gly Thr Pro Val Thr
        115                 120                 125

Val Ser Ser
    130

<210> SEQ ID NO 121
<211> LENGTH: 119
<212> TYPE: PRT
<213> ORGANISM: alpaca

<400> SEQUENCE: 121

Gln Val Gln Leu Val Glu Ser Gly Gly Gly Leu Val Gln Pro Gly Gly
1               5                   10                  15

Ser Leu Arg Leu Ser Cys Val Val Ser Arg Ser Ile Ser Ser Met Asn
            20                  25                  30

-continued

Ser Met Gly Trp Tyr Arg Gln Ala Pro Gly Lys Gln Arg Glu Met Val
                35                  40                  45

Ala Val Met Tyr Ser Gly Asp Ser Thr Leu Tyr Ala Asp Ser Val Lys
 50                  55                  60

Gly Arg Phe Thr Ile Ser Arg Asp Asn Ala Lys Asn Thr Val Tyr Leu
 65                  70                  75                  80

Gln Met Asn Ser Leu Lys Pro Glu Asp Thr Ala Val Tyr Phe Cys Lys
                85                  90                  95

Gly Glu Asp Trp Thr Thr Pro Val Arg Ser Asp Tyr Trp Gly Gln Gly
                100                 105                 110

Thr Gln Val Thr Val Ser Ser
            115

<210> SEQ ID NO 122
<211> LENGTH: 130
<212> TYPE: PRT
<213> ORGANISM: alpaca

<400> SEQUENCE: 122

Glu Val Gln Val Val Glu Ser Gly Gly Gly Leu Val Gln Pro Gly Gly
 1               5                   10                  15

Ser Leu Arg Leu Ser Cys Ala Ala Ser Gly Phe Thr Leu Asp Tyr Tyr
                20                  25                  30

Tyr Ile Gly Trp Phe Arg Gln Ala Pro Gly Lys Glu Arg Glu Gly Val
                35                  40                  45

Ser Cys Ile Ser Ser Ser Asp Gly Ser Thr Asp Tyr Ala Asp Ser Val
 50                  55                  60

Lys Gly Arg Phe Ala Ile Ser Arg Asp Asn Ala Lys Lys Thr Val Tyr
 65                  70                  75                  80

Leu Gln Met Asn Ser Leu Lys Pro Glu Asp Thr Ala Val Tyr Tyr Cys
                85                  90                  95

Ala Ala Glu Gly Ser Trp Asn Phe Asp Ala Met Arg Pro Cys Ser Ile
                100                 105                 110

Gln Glu Ala Asp Phe Gly Ser Trp Gly Gln Gly Thr Gln Val Thr Val
            115                 120                 125

Ser Ser
    130

<210> SEQ ID NO 123
<211> LENGTH: 119
<212> TYPE: PRT
<213> ORGANISM: alpaca

<400> SEQUENCE: 123

Gln Val Gln Leu Val Glu Ser Gly Gly Gly Leu Val Glu Pro Gly Gly
 1               5                   10                  15

Ser Leu Arg Leu Ser Cys Pro Leu Ser Gly Leu Gly Phe Ser Pro Asn
                20                  25                  30

His Met Cys Trp Tyr Arg Gln Ser Pro Gly Lys Leu Arg Glu Met Val
                35                  40                  45

Ala Cys Ile Thr Ser Gly Gly Ser Pro Asn Tyr Ser Asp Thr Ala Lys
 50                  55                  60

Gly Arg Phe Thr Ile Ser Arg Asp Arg Thr Asn Thr Val Tyr Leu
 65                  70                  75                  80

Gln Met Asp Ser Leu Lys Pro Asp Asp Thr Ala Ile Tyr Tyr Leu Lys
                85                  90                  95

Ala Glu Asp Trp Thr Thr Thr Pro Arg Ser Asp Tyr Trp Gly Gln Gly
            100                 105                 110

Thr Gln Val Thr Val Ser Ser
        115

<210> SEQ ID NO 124
<211> LENGTH: 116
<212> TYPE: PRT
<213> ORGANISM: alpaca

<400> SEQUENCE: 124

Gln Val Gln Leu Val Glu Ser Gly Gly Gly Leu Val Gln Val Gly Gly
1               5                   10                  15

Ser Leu Lys Leu Thr Cys Ala Ala Ser Gly Ser Ile Ser Arg Ile Ala
            20                  25                  30

Val Gly Trp Tyr Arg Gln Ile Pro Gly Lys Gln Arg Glu Leu Val Ala
        35                  40                  45

Arg Val Ser Ser Gly Gly Ile Leu Trp Tyr Asp Ser Val Lys Gly
    50                  55                  60

Arg Phe Ile Ile Thr Arg Asp Asn Ala Lys Asn Met Val Tyr Leu Gln
65                  70                  75                  80

Met Asp Ser Leu Arg Pro Glu Asp Thr Ala Val Tyr Phe Cys Arg Gly
            85                  90                  95

Ser Asp Ser Asp Arg Phe Leu Gly Ser Trp Gly Gln Gly Thr Gln Val
            100                 105                 110

Thr Val Ser Ser
        115

<210> SEQ ID NO 125
<211> LENGTH: 127
<212> TYPE: PRT
<213> ORGANISM: alpaca

<400> SEQUENCE: 125

Gln Val Gln Leu Val Glu Ser Gly Gly Gly Leu Val Gln Ala Gly Gly
1               5                   10                  15

Ser Leu Arg Leu Ser Cys Ala Ala Ser Gly Phe Asn Phe Asn Asn Tyr
            20                  25                  30

Val Ile Gly Trp Phe Arg Gln Ala Pro Gly Lys Glu Arg Glu Gly Val
        35                  40                  45

Ser Cys Phe Thr Ser Ala Asp Asn Arg Thr Tyr Tyr Ala Gly Ser Val
    50                  55                  60

Glu Gly Arg Phe Thr Ile Ser Ser Asp Asn Thr Lys Asn Thr Gly Tyr
65                  70                  75                  80

Leu Gln Met Asn Ser Leu Lys Leu Glu Asp Glu Ala Val Tyr Ser Cys
            85                  90                  95

Ser Val Arg Val Tyr Arg Cys Thr Gly Arg Lys Cys Cys Asp Pro Leu
            100                 105                 110

Gly Met Asp Tyr Trp Gly Lys Gly Thr Pro Val Thr Val Ser Ser
            115                 120                 125

<210> SEQ ID NO 126
<211> LENGTH: 132
<212> TYPE: PRT
<213> ORGANISM: alpaca

<400> SEQUENCE: 126

```
Gln Val Gln Leu Val Glu Ser Gly Gly Gly Leu Val Gln Pro Gly Gly
1               5                   10                  15

Ser Leu Arg Leu Ser Cys Ile Ala Ser Gly Ile Asp Leu Arg Asp Leu
            20                  25                  30

Thr Ile Gly Trp Phe Arg Gln Ala Pro Gly Lys Glu Arg Glu Gly Val
        35                  40                  45

Ser Phe Ile Ser Val Ser Gly Asp Thr Tyr Tyr Ala Glu Ser Val
50                  55                  60

Lys Gly Arg Phe Thr Ile Ser Arg Asp Ser His Ser Thr Ala Tyr
65                  70                  75                  80

Leu Gln Met Asn Asn Leu Lys Pro Asp Asp Thr Ala Val Tyr Tyr Cys
                85                  90                  95

Ala Ala Asp Lys Thr Asp Ile Gly Phe Trp Met Leu Val Gly Gly Asp
                100                 105                 110

Gly Gly Gly Gly Val His Tyr Asp Tyr Trp Gly Gln Gly Thr Gln Val
                115                 120                 125

Thr Val Ser Ser
        130
```

<210> SEQ ID NO 127
<211> LENGTH: 115
<212> TYPE: PRT
<213> ORGANISM: alpaca

<400> SEQUENCE: 127

```
Gln Val Gln Leu Val Glu Ser Gly Gly Gly Leu Val Gln Pro Gly Gly
1               5                   10                  15

Ser Leu Arg Leu Ser Cys Thr Ile Ser Gly Phe Thr Phe Asp Arg Phe
            20                  25                  30

Pro Met Thr Trp Tyr Arg Gln Val Pro Gly Met Glu Arg Glu Leu Val
        35                  40                  45

Ala Arg Val Ser Thr Thr Gly Leu Thr Glu Tyr Phe Ala Asn Ala Leu
50                  55                  60

Glu Gly Arg Phe Thr Ala Ser Arg Asp Asn Ala Lys Asn Thr Gly Tyr
65                  70                  75                  80

Leu Gln Met Asn Asp Leu Lys Pro Gly Asp Thr Ala Val Tyr Tyr Cys
                85                  90                  95

Asn Val Val Pro Pro Leu Arg Gln Trp Gly Gln Gly Thr Gln Val Thr
                100                 105                 110

Val Ser Ser
        115
```

<210> SEQ ID NO 128
<211> LENGTH: 131
<212> TYPE: PRT
<213> ORGANISM: alpaca

<400> SEQUENCE: 128

```
Gln Val Gln Leu Val Glu Ser Gly Gly Gly Ser Val Gln Pro Gly Gly
1               5                   10                  15

Ser Leu Arg Leu Ser Cys Ala Ala Ser Gly Phe Thr Leu Ser Asn Tyr
            20                  25                  30

Ala Val His Trp Phe Arg Gln Ala Pro Gly Lys Glu Arg Glu Gly Val
        35                  40                  45

Ser Ser Ile Ala Ile Ile Asp Asp Thr Tyr Tyr Gly Glu Ser Val Lys
50                  55                  60
```

Gly Arg Phe Thr Ile Ser Arg Asp Asn Asp Ala Asn Ala Val Tyr Leu
65                  70                  75                  80

Gln Met Asn Ser Leu Lys Pro Glu Asp Thr Ala Ile Tyr Tyr Cys Ala
            85                  90                  95

Ala Asp Arg Thr Asp Ile Ala Phe Trp Leu Gln Val Gly Gly Asp Gly
        100                 105                 110

Gly Ser Gly Arg His Tyr Asp Tyr Trp Gly Gln Gly Thr Gln Val Thr
        115                 120                 125

Val Ser Ser
        130

<210> SEQ ID NO 129
<211> LENGTH: 119
<212> TYPE: PRT
<213> ORGANISM: alpaca

<400> SEQUENCE: 129

Glu Val Gln Val Val Glu Ser Gly Gly Gly Leu Val Gln Pro Gly Gly
1               5                   10                  15

Ser Leu Thr Leu Ser Cys Ala Ala Ser Arg Gly Ile Phe Thr Phe Asn
            20                  25                  30

Ala Met Gly Trp Tyr Arg Gln Ala Pro Gly Lys Gln Arg Glu Val Val
        35                  40                  45

Val His Phe Thr Ser Gly Asp Ser Glu Phe Trp Ala Asp Ser Val Lys
    50                  55                  60

Gly Arg Phe Thr Ile Ser Arg Asp Ser Arg Lys Asn Thr Val Tyr Leu
65                  70                  75                  80

Tyr Met Asn Asn Leu Gln Pro Glu Asp Thr Ala Val Tyr Tyr Cys Lys
            85                  90                  95

Ala Glu Asp Trp Thr Thr Ser Pro Arg Thr Asp Tyr Trp Gly Gln Gly
        100                 105                 110

Thr Gln Val Thr Val Ser Ser
        115

<210> SEQ ID NO 130
<211> LENGTH: 247
<212> TYPE: PRT
<213> ORGANISM: Artificial Sequence
<220> FEATURE:
<223> OTHER INFORMATION: Cetuximab

<400> SEQUENCE: 130

Gln Val Gln Leu Lys Gln Ser Gly Pro Gly Leu Val Gln Pro Ser Gln
1               5                   10                  15

Ser Leu Ser Ile Thr Cys Thr Val Ser Gly Phe Ser Leu Thr Asn Tyr
            20                  25                  30

Gly Val His Trp Val Arg Gln Ser Pro Gly Lys Gly Leu Glu Trp Leu
        35                  40                  45

Gly Val Ile Trp Ser Gly Gly Asn Thr Asp Tyr Asn Thr Pro Phe Thr
    50                  55                  60

Ser Arg Leu Ser Ile Asn Lys Asp Asn Ser Lys Ser Gln Val Phe Phe
65                  70                  75                  80

Lys Met Asn Ser Leu Gln Ser Asn Asp Thr Ala Ile Tyr Tyr Cys Ala
            85                  90                  95

Arg Ala Leu Thr Tyr Tyr Asp Tyr Glu Phe Ala Tyr Trp Gly Gln Gly
        100                 105                 110

Thr Leu Val Thr Val Ser Ala Gly Gly Gly Gly Ser Gly Gly Gly Gly

```
                     115                 120                 125
Ser Gly Gly Gly Ser Gly Gly Gly Ala Ser Asp Ile Leu Leu
    130                 135             140

Thr Gln Ser Pro Val Ile Leu Ser Val Ser Pro Gly Glu Arg Val Ser
145                 150                 155                 160

Phe Ser Cys Arg Ala Ser Gln Ser Ile Gly Thr Asn Ile His Trp Tyr
                165                 170                 175

Gln Gln Arg Thr Asn Gly Ser Pro Arg Leu Leu Ile Lys Tyr Ala Ser
            180                 185                 190

Glu Ser Ile Ser Gly Ile Pro Ser Arg Phe Ser Gly Ser Gly Ser Gly
        195                 200                 205

Thr Asp Phe Thr Leu Ser Ile Asn Ser Val Glu Ser Glu Asp Ile Ala
    210                 215                 220

Asp Tyr Tyr Cys Gln Gln Asn Asn Asn Trp Pro Thr Thr Phe Gly Ala
225                 230                 235                 240

Gly Thr Lys Leu Glu Leu Lys
                245

<210> SEQ ID NO 131
<211> LENGTH: 119
<212> TYPE: PRT
<213> ORGANISM: alpaca

<400> SEQUENCE: 131

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Arg Ser Ser
            20                  25                  30

Ala Met Ser Trp Ala Arg Gln Ala Pro Gly Lys Gly Leu Glu Trp Val
        35                  40                  45

Ser Asp Ile Tyr Pro Asp Gly Arg Thr Asp Tyr Ala Asp Ser Ile Lys
    50                  55                  60

Gly Arg Phe Thr Met Ser Arg Asp Asn Ala Lys Asn Thr Val Tyr Leu
65                  70                  75                  80

Leu Met Asp Ser Leu Lys Pro Glu Asp Thr Ala Val Tyr His Cys Gln
                85                  90                  95

Val Gly Arg Tyr Val Ser Gly Val Tyr Tyr Gln Pro Arg Gly Gln Gly
            100                 105                 110

Thr Gln Val Thr Val Ser Ser
        115

<210> SEQ ID NO 132
<211> LENGTH: 120
<212> TYPE: PRT
<213> ORGANISM: alpaca

<400> SEQUENCE: 132

Gln Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Ser Ser Ser
            20                  25                  30

Ala Met Ser Trp Ala Arg Gln Ala Pro Gly Lys Gly Leu Glu Cys Val
        35                  40                  45

Ser Asp Ile Tyr Pro Asp Gly Thr Ser Tyr Ala Asp Ser Met Lys
    50                  55                  60

Gly Arg Phe Thr Ile Ser Arg Asp Asn Thr Arg Asn Thr Met Tyr Leu
```

```
            65                   70                   75                   80

Gln Met Asn Val Leu Lys Pro Glu Asp Thr Ala Thr Tyr Tyr Cys Val
                85                   90                   95

Ile Gly Arg Gly Gly Tyr Ala Met Gly Asp Arg Arg Leu Arg Gly Gln
                100                  105                  110

Gly Thr Gln Val Thr Val Ser Ser
            115                  120
```

<210> SEQ ID NO 133
<211> LENGTH: 120
<212> TYPE: PRT
<213> ORGANISM: alpaca

<400> SEQUENCE: 133

```
Glu Val Gln Leu Val Glu Ser Gly Gly Gly Leu Val Gln Pro Gly Gly
1               5                   10                  15

Ser Leu Arg Leu Ser Cys Ala Ala Ser Gly Ser Ile Ser Ser Ile Tyr
            20                  25                  30

Ala Met Gly Trp Tyr Arg Gln Ala Pro Gly Lys Leu Arg Glu Leu Val
        35                  40                  45

Ala Ala Ile Thr Thr Gly Gly Ser Thr Phe Tyr Arg Asp Ser Val Lys
    50                  55                  60

Gly Arg Phe Thr Ile Ser Arg Asp Asn Val Ala Asn Thr Val Tyr Leu
65                  70                  75                  80

Gln Met Asn Ser Leu Lys Pro Glu Asp Thr Ala Val Tyr His Cys Asn
                85                  90                  95

Gly Ala Pro Trp Gly Asp Ile Ala Pro Val Ala Val Ser Trp Gly Gln
                100                 105                 110

Gly Thr Gln Val Thr Val Ser Ser
            115                  120
```

<210> SEQ ID NO 134
<211> LENGTH: 119
<212> TYPE: PRT
<213> ORGANISM: alpaca

<400> SEQUENCE: 134

```
Gln Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Ser Pro Ser
            20                  25                  30

Ala Met Ser Trp Ala Arg Gln Ala Pro Gly Lys Gly Leu Glu Trp Val
        35                  40                  45

Ser Gly Ile Tyr Ser Asp Gly Ser Thr Tyr Tyr Arg Asp Ser Val Lys
    50                  55                  60

Gly Arg Phe Thr Ile Ser Arg Asp Asn Ala Arg Asn Met Val Tyr Leu
65                  70                  75                  80

Gln Met Asn Ser Leu Lys Pro Glu Asp Thr Ala Val Tyr Tyr Cys Ala
                85                  90                  95

Leu Gly Ala Met Arg Glu Gly Val Tyr Ser Asp Leu Leu Gly Gln Gly
                100                 105                 110

Thr Gln Val Thr Val Ser Ser
            115
```

<210> SEQ ID NO 135
<211> LENGTH: 120
<212> TYPE: PRT

-continued

<213> ORGANISM: alpaca

<400> SEQUENCE: 135

Gln Val Gln Leu Val Glu Ser Gly Gly Gly Leu Val Gln Pro Gly Gly
1               5                   10                  15

Ser Leu Arg Leu Ser Cys Ala Ala Ser Gly Ser Ile Phe Ser Ile Tyr
            20                  25                  30

Ala Met Gly Trp Tyr Arg Gln Ala Pro Gly Lys Gln Arg Gly Leu Val
        35                  40                  45

Ala Ala Ile Thr Ser Gly Gly Asp Thr Phe Tyr Ala Asp Ser Val Lys
    50                  55                  60

Gly Arg Phe Thr Ile Ser Arg Asp Asn Ala Arg Asn Thr Val Tyr Leu
65                  70                  75                  80

Gln Met Asn Asn Leu Lys Ser Glu Asp Thr Ala Val Tyr Asp Cys Asn
                85                  90                  95

Gly Ala Pro Trp Gly Asp His Ala Pro Leu Val Ala Ser Trp Gly Gln
            100                 105                 110

Gly Thr Gln Val Thr Val Ser Ser
        115                 120

<210> SEQ ID NO 136
<211> LENGTH: 117
<212> TYPE: PRT
<213> ORGANISM: alpaca

<400> SEQUENCE: 136

Gln Val Gln Leu Val Glu Ser Gly Gly Gly Leu Val His Pro Gly Gly
1               5                   10                  15

Ser Leu Arg Leu Asp Cys Ala Val Ser Glu Arg Ile Ala Ser Phe Asn
            20                  25                  30

Val Met Gly Trp Tyr Arg Gln Ala Pro Gly Gln Gln Arg Glu Val Val
        35                  40                  45

Ala Thr Ile Thr Ser Val Gly Arg Thr Tyr Tyr Ala Asp Ser Val Lys
    50                  55                  60

Gly Arg Phe Thr Ile Ala Lys Asp Asn Asp Lys Asn Thr Tyr Leu Gln
65                  70                  75                  80

Met Asn Ser Leu Lys Pro Glu Asp Thr Ala Val Tyr Tyr Cys Lys Ala
                85                  90                  95

Val Ile Val Gly Thr Tyr Asp Thr Glu Tyr Trp Gly Gln Gly Thr Leu
            100                 105                 110

Val Thr Val Ser Ser
        115

<210> SEQ ID NO 137
<211> LENGTH: 117
<212> TYPE: PRT
<213> ORGANISM: alpaca

<400> SEQUENCE: 137

Gln Val Gln Leu Val Glu Ser Gly Gly Gly Leu Val His Pro Gly Gly
1               5                   10                  15

Ser Leu Arg Leu Ala Cys Ala Ala Ser Glu Arg Ile Leu Ser Phe Asn
            20                  25                  30

Val Met Gly Trp Tyr Arg Gln Ala Pro Gly Gln Gln Arg Glu Val Val
        35                  40                  45

Ala Thr Ile Thr Ser Val Gly Arg Thr Tyr Tyr Ala Asp Ser Val Lys
    50                  55                  60

Gly Arg Phe Thr Ile Phe Lys Asp Asn Gly Lys Asn Thr Tyr Leu Gln
65                  70                  75                  80

Met Ser Ser Leu Lys Pro Glu Asp Thr Ala Val Tyr Tyr Cys Lys Ala
                85                  90                  95

Val Thr Val Gly Asp Val Asp Thr Glu Tyr Trp Gly Gln Gly Thr Gln
            100                 105                 110

Val Thr Val Ser Ser
        115

<210> SEQ ID NO 138
<211> LENGTH: 20
<212> TYPE: PRT
<213> ORGANISM: Homo sapiens

<400> SEQUENCE: 138

Ser Phe Val Leu Asn Trp Tyr Arg Met Ser Pro Ser Asn Gln Thr Asp
1               5                   10                  15

Lys Leu Ala Ala
            20

<210> SEQ ID NO 139
<211> LENGTH: 19
<212> TYPE: PRT
<213> ORGANISM: Homo sapiens

<400> SEQUENCE: 139

Tyr Leu Cys Gly Ala Ile Ser Leu Ala Pro Lys Ala Gln Ile Lys Glu
1               5                   10                  15

Ser Leu Arg

<210> SEQ ID NO 140
<211> LENGTH: 39
<212> TYPE: PRT
<213> ORGANISM: Homo sapiens

<400> SEQUENCE: 140

Ser Phe Val Leu Asn Trp Tyr Arg Met Ser Pro Ser Asn Gln Thr Asp
1               5                   10                  15

Lys Leu Ala Ala Tyr Leu Cys Gly Ala Ile Ser Leu Ala Pro Lys Ala
            20                  25                  30

Gln Ile Lys Glu Ser Leu Arg
        35

<210> SEQ ID NO 141
<211> LENGTH: 32
<212> TYPE: PRT
<213> ORGANISM: Homo sapiens

<400> SEQUENCE: 141

Ala Phe Thr Val Thr Val Pro Lys Asp Leu Tyr Val Lys Asn Ile Ile
1               5                   10                  15

Gln Phe Val His Gly Ser Tyr Gly Gly Ala Asp Tyr Lys Arg Ile Thr
            20                  25                  30

<210> SEQ ID NO 142
<211> LENGTH: 4
<212> TYPE: PRT
<213> ORGANISM: Artificial Sequence
<220> FEATURE:
<223> OTHER INFORMATION: PD1:PDL1 screening peptide 2

<400> SEQUENCE: 142

Asp Tyr Lys Arg
1

<210> SEQ ID NO 143
<211> LENGTH: 5
<212> TYPE: PRT
<213> ORGANISM: Artificial Sequence
<220> FEATURE:
<223> OTHER INFORMATION: 5 aa PD-1 screeing peptide

<400> SEQUENCE: 143

Ala Asp Tyr Lys Arg
1 5

<210> SEQ ID NO 144
<211> LENGTH: 14
<212> TYPE: PRT
<213> ORGANISM: Artificial Sequence
<220> FEATURE:
<223> OTHER INFORMATION: polar peptide contact PD-1:PD-L1 complex
<220> FEATURE:
<221> NAME/KEY: MISC_FEATURE
<222> LOCATION: (2)..(3)
<223> OTHER INFORMATION: X can be any amino acid
dipeptide can be longer than 2 amino acids
<220> FEATURE:
<221> NAME/KEY: MISC_FEATURE
<222> LOCATION: (5)..(6)
<223> OTHER INFORMATION: X can be any amino acid
dipeptide can be longer than 2 amino acids
<220> FEATURE:
<221> NAME/KEY: MISC_FEATURE
<222> LOCATION: (8)..(9)
<223> OTHER INFORMATION: X can be any amino acid
dipeptide can be longer than 2 amino acids

<400> SEQUENCE: 144

Phe Xaa Xaa Asp Xaa Xaa Gln Xaa Xaa Ala Asp Tyr Lys Arg
1 5 10

<210> SEQ ID NO 145
<211> LENGTH: 14
<212> TYPE: PRT
<213> ORGANISM: alpaca

<400> SEQUENCE: 145

Asn Gly Ala Pro Trp Gly Asp His Ala Pro Leu Val Ala Ser
1 5 10

<210> SEQ ID NO 146
<211> LENGTH: 12
<212> TYPE: PRT
<213> ORGANISM: alpaca

<400> SEQUENCE: 146

Lys Ala Val Ile Val Gly Thr Tyr Asp Thr Glu Tyr
1 5 10

<210> SEQ ID NO 147
<211> LENGTH: 12
<212> TYPE: PRT
<213> ORGANISM: alpaca

<400> SEQUENCE: 147

Lys Ala Lys Thr Val Gly Asp Val Asp Thr Glu Tyr
1 5 10